US011675478B2

(12) United States Patent
Dong et al.

(10) Patent No.: US 11,675,478 B2
(45) Date of Patent: Jun. 13, 2023

(54) METHOD FOR DISPLAYING PAGE ELEMENTS AND ELECTRONIC DEVICE

(71) Applicant: Honor Device Co., Ltd., Shenzhen (CN)

(72) Inventors: Feng Dong, Shenzhen (CN); Jiawei Weng, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/633,945

(22) PCT Filed: Aug. 7, 2020

(86) PCT No.: PCT/CN2020/107807
§ 371 (c)(1),
(2) Date: Feb. 8, 2022

(87) PCT Pub. No.: WO2021/027725
PCT Pub. Date: Feb. 18, 2021

(65) Prior Publication Data
US 2022/0365661 A1  Nov. 17, 2022

(30) Foreign Application Priority Data

Aug. 9, 2019 (CN) .......................... 201910736105.6

(51) Int. Cl.
G06F 3/04817 (2022.01)
G06F 3/0482 (2013.01)
G06F 3/0488 (2022.01)

(52) U.S. Cl.
CPC ........ *G06F 3/04817* (2013.01); *G06F 3/0482* (2013.01); *G06F 3/0488* (2013.01); *G06F 2203/04806* (2013.01)

(58) Field of Classification Search
None
See application file for complete search history.

(56) References Cited

U.S. PATENT DOCUMENTS 9,448,633 B2  9/2016  Rodgers
9,891,805 B2  2/2018  Matsuda
(Continued)

FOREIGN PATENT DOCUMENTS

CN  103842952 A  6/2014
CN  104216548 A  12/2014
(Continued)

OTHER PUBLICATIONS

Anonymous,"How to achieve the focus-like glowing effect when clicking the application icon on android desktop", website:"https://www.zhihu.com/question/23951585",May 29, 2014.

*Primary Examiner* — Ryan Barrett
(74) *Attorney, Agent, or Firm* — Womble Bond Dickinson (US) LLP

(57) ABSTRACT

A page element display method and an electronic device (100 or 1500) are provided. The method includes: The electronic device (100 or 1500) displays a first interface, where the first interface includes a first page element (1401); the electronic device (100 or 1500) detects a first operation performed by a user on the first page element (1402); the electronic device (100 or 1500) adjusts a size of the first page element in response to the first operation (1403); and the electronic device (100 or 1500) automatically displays a second interface after adjusting the size of the first page element. The method helps to enhance an effect of feedback from the electronic device (100 or 1500) to the user when the user performs the operation.

19 Claims, 45 Drawing Sheets

(56) References Cited

U.S. PATENT DOCUMENTS

| | | | |
|---|---|---|---|
| 10,122,838 B2 | 11/2018 | Shuttleworth et al. | |
| 10,203,868 B2 | 2/2019 | Bauer et al. | |
| 11,054,988 B2 | 7/2021 | Wang | |
| 2002/0089552 A1* | 7/2002 | Wasko | G06F 3/0481 |
| | | | 715/861 |
| 2011/0138309 A1 | 6/2011 | Skidmore et al. | |
| 2014/0310643 A1 | 10/2014 | Karmanenko et al. | |
| 2015/0082211 A1 | 3/2015 | Lee | |
| 2016/0342302 A1* | 11/2016 | Wang | G06F 3/04886 |
| 2017/0308275 A1* | 10/2017 | Sowden | G06F 3/04817 |
| 2018/0101283 A1 | 4/2018 | Lee et al. | |

FOREIGN PATENT DOCUMENTS

| | | |
|---|---|---|
| CN | 104574483 A | 4/2015 |
| CN | 105373328 A | 3/2016 |
| CN | 105607857 A | 5/2016 |
| CN | 105912312 A | 8/2016 |
| CN | 106055210 A | 10/2016 |
| CN | 106371692 A | 2/2017 |
| CN | 106569708 A | 4/2017 |
| CN | 107272992 A | 10/2017 |
| CN | 107315516 A | 11/2017 |
| CN | 107632874 A | 1/2018 |
| CN | 108701001 A | 10/2018 |
| CN | 110569095 A | 12/2019 |
| CN | 110569095 B | 8/2021 |
| EP | 1933229 A1 | 6/2008 |
| JP | 2019040622 A | 3/2019 |
| KR | 20050112300 A * | 11/2005 |
| RU | 2013130740 A | 1/2015 |
| WO | 2014098207 A1 | 6/2014 |
| WO | 2017027526 A1 | 2/2017 |

* cited by examiner

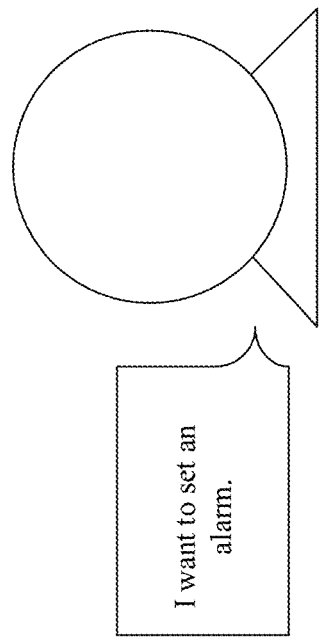
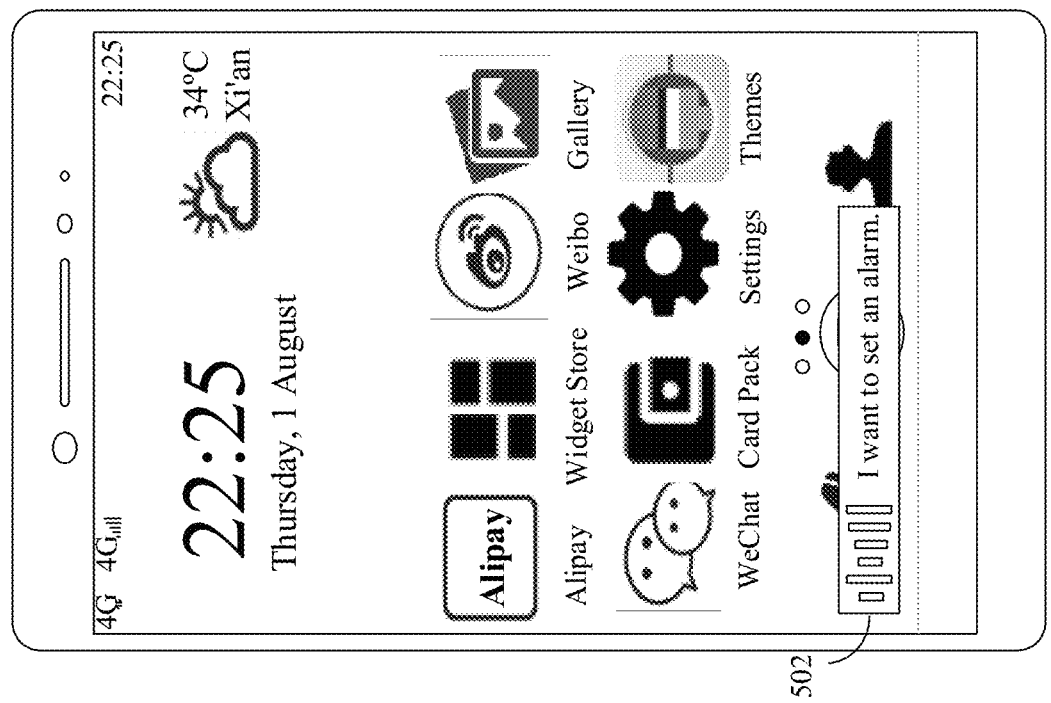
FIG. 5(b)

METHOD FOR DISPLAYING PAGE ELEMENTS AND ELECTRONIC DEVICE

This application is a national stage of International Application No. PCT/CN2020/107807, filed on Aug. 7, 2020, which claims priority to Chinese Patent Application No. 201910736105.6, filed on Aug. 9, 2019. All the aforementioned applications are hereby incorporated by reference in their entireties.

FIELD

This application relates to the electronic device field, and more specifically, to a page element display method and an electronic device.

BACKGROUND

In a process of using an electronic device, a user usually encounters a case of no response to an operation, for example, after an icon of an application (application, APP) is tapped, the icon does not give any feedback. This causes the user to have a feeling of waiting. A long wait may even cause the user to doubt whether a current operation is performed by the user. As a result, operation experience fails to meet an expectation.

SUMMARY

This application provides a page element display method and an electronic device, helping to enhance an effect of feedback from an electronic device to a user when the user performs an operation.

According to a first aspect, a page element display method is provided. The method is applied to an electronic device. The method includes: The electronic device displays a first interface, where the first interface includes a first page element, and a size of the first page element is a first size; the electronic device detects a first operation performed by a user on the first page element; in response to the first operation, the electronic device zooms out the first page element from the first size to a second size, and restores the first page element from the second size to the first size; and the electronic device automatically displays a second interface after the first page element is restored from the second size to the first size, where the second interface is associated with the first page element.

In this embodiment of this application, after the electronic device detects an operation of tapping a page element by the user, the electronic device may control the page element to be reduced in size based on a specific proportion. Changing a size of the page element upon detecting the user operation helps to enhance feedback from the electronic device for the user operation, to enhance a prompt effect of the electronic device for the user operation.

In some possible implementations, that the second interface is associated with the first page element may be understood as that the second interface is a new interface displayed by the electronic device after the first operation is performed on the first page element.

For example, the first interface is a desktop of the electronic device, the first page element is an icon of an application on the desktop, and the second interface may be a display interface of the application.

For example, the first interface may be a negative-one-screen interface of the electronic device or a display interface of a drop-down list, the first page element may be a notification widget in the negative-one-screen interface or the display interface of the drop-down list, and the second interface may be a new interface displayed by the electronic device after detecting the first operation performed by the user on the first page element, where the second interface may include a page element different from that in the first interface.

For example, the first interface is a display interface of task widgets of the electronic device, the first page element is one of the plurality of task widgets, and the second interface may be a display interface of an application corresponding to the task widget.

With reference to the first aspect, in some implementations of the first aspect, the first page element includes any one of an application icon, a notification widget, and a task widget.

In this embodiment of this application, after the electronic device detects an operation of tapping the icon, the notification widget, or the task widget by the user, the electronic device may control the icon, the notification widget, or the task widget to be reduced in size based on a specific proportion. Changing a size of the icon, the notification widget, or the task widget upon detecting the user operation helps to enhance feedback from the electronic device for the user operation, to enhance a prompt effect of the electronic device for the user operation.

With reference to the first aspect, in some implementations of the first aspect, the notification widget includes either of a notification widget in a drop-down list and a notification widget on a negative one screen.

With reference to the first aspect, in some implementations of the first aspect, the zooming out the first page element from the first size to a second size, and restoring the first page element from the second size to the first size includes: by simulating a spring, zooming out the first page element from the first size to the second size, and restoring the first page element from the second size to the first size.

In this embodiment of this application, when detecting the first operation performed by the user on the first page element, the electronic device may simulate spring characteristics. Natural mechanics may be simulated in the first operation (for example, pressing), thereby helping to strengthen a sense of naturalness for the user.

With reference to the first aspect, in some implementations of the first aspect, a first mass spring is simulated when the first page element is an application icon; or a second mass spring is simulated when the first page element is a notification widget; or a third mass spring is simulated when the first page element is a task widget; where the first mass spring, the second mass spring, and the third mass spring have a same mass, and are in descending order of stiffness and in descending order of damping.

In this embodiment of this application, the electronic device simulates natural mechanics, and defines different tapping effects for different page elements.

This helps to strengthen a sense of naturalness for the user and enhance feedback from the electronic device for the user operation, to enhance a prompt effect of the electronic device for the user operation.

In some possible implementations, the first mass spring, the second mass spring, and the third mass spring have a same mass, and are in descending order of stiffness, in descending order of damping, and in descending order of initial velocities.

In some possible implementations, the first mass spring, the second mass spring, and the third mass spring have a same mass and same stiffness, and are in ascending order of damping.

With reference to the first aspect, in some implementations of the first aspect, the second size is K times the first size when the first page element is an icon; or the second size is L times the first size when the first page element is a notification widget; or the second size is M times the first size when the first page element is a task widget, where $0<K\leq L\leq M<1$.

In this embodiment of this application, after the electronic device detects an operation of tapping a page element by the user, the electronic device may control different page elements to be reduced in size based on different proportions, and different page elements provide different visual experience for the user. This helps to enhance feedback from the electronic device for the user operation, to enhance a prompt effect of the electronic device for the user operation.

With reference to the first aspect, in some implementations of the first aspect, when the first page element is an icon, duration for zooming out the first page element from the first size to the second size is first duration N; when the first page element is a notification widget, duration for zooming out the first page element from the first size to the second size is second duration P; or when the first page element is a task widget, duration for zooming out the first page element from the first size to the second size is third duration Q, where $100\ \text{ms}\leq N\leq P\leq Q\leq 250\ \text{ms}$.

In this embodiment of this application, after the electronic device detects an operation of tapping a page element by the user, the electronic device may control different page elements to zoom out to the second size in different lengths of time, and different page elements provide different visual experience for the user. This helps to enhance feedback from the electronic device for the user operation, to enhance a prompt effect of the electronic device for the user operation.

With reference to the first aspect, in some implementations of the first aspect, the automatically displaying a second interface includes: when the first page element is restored from the second size to the first size, smoothly transiting a display interface of the electronic device from the first interface to the second interface.

In this embodiment of this application, when the first page element is restored to the initial size, the electronic device smoothly transits the display interface from the first interface to the second interface. In this way, not only a prompt effect of the electronic device for the user operation is enhanced, but also visual experience of the user can be improved.

With reference to the first aspect, in some implementations of the first aspect, the smoothly transiting a display interface of the electronic device from the first interface to the second interface includes: when the first page element is restored from the second size to the first size, displaying, by the electronic device, the second interface; or when the first page element is restored from the second size to the first size, after a first time period, displaying, by the electronic device, the second interface.

With reference to the first aspect, in some implementations of the first aspect, the first operation is an operation of touching the first page element by a finger of the user, and the zooming out the first page element from the first size to a second size includes: when detecting that the finger of the user touches the first page element, starting to zoom out the first page element from the first size to the second size; or when detecting that the finger of the user leaves the first page element, starting to zoom out the first page element from the first size to the second size.

In this embodiment of this application, the electronic device may determine, based on a status of the finger of the user on a screen, to zoom out and restore the first page element. This helps to enhance feedback from the electronic device for the user operation, to enhance a prompt effect of the electronic device for the user operation.

With reference to the first aspect, in some implementations of the first aspect, the in response to the first operation, zooming out, by the electronic device, the first page element from the first size to a second size, and restoring the first page element from the second size to the first size includes: in response to the first operation, zooming out, by the electronic device, the first page element from the first size to the second size; when the first page element is restored from the second size to a third size, detecting, by the electronic device, a second operation performed by the user on the first page element, where the third size is greater than the second size and less than the first size; and in response to the second operation, zooming out, by the electronic device, the first page element from the third size to the second size, and restoring the first page element from the second size to the first size.

In this embodiment of this application, for operations quickly performed by the user on the first page element, the electronic device can quickly respond to the user operations. This reduces a waiting delay of the user for the operations, and enhances a prompt effect of the electronic device for the user operations. In addition, as the electronic device responds quickly, consistency between mind and hand of the user can be achieved, and an expectation of the user for the operations is met.

According to a second aspect, an apparatus is provided. The apparatus is included in an electronic device. The apparatus has a function of implementing behaviors of the electronic device in any one of the foregoing aspect or the possible implementations of the foregoing aspect. The function may be implemented by hardware, or may be implemented by executing corresponding software by hardware. The hardware or software includes one or more modules or units corresponding to the foregoing function.

According to a third aspect, an electronic device is provided, including one or more processors, a memory, one or more applications, and one or more computer programs. The one or more computer programs are stored in the memory, and the one or more computer programs include instructions. When being executed by the electronic device, the instructions cause the electronic device to perform the page element display method in any possible implementation of any aspect described above.

According to a fourth aspect, this solution provides an electronic device, including one or more processors and one or more memories. The one or more memories are coupled to the one or more processors. The one or more memories are configured to store computer program code. The computer program code includes computer instructions. When being executed by the one or more processors, the computer instructions cause the electronic device to perform the page element display method in any possible implementation of any aspect described above.

According to a fifth aspect, this solution provides a computer storage medium, including computer instructions. When being run on an electronic device, the computer instructions cause the electronic device to perform the page element display method in any possible implementation of any aspect described above.

According to a sixth aspect, this solution provides a computer program product. When being run on an electronic device, the computer program product causes the electronic device to perform the page element display method in any possible design of any aspect described above.

According to a seventh aspect, this solution provides a chip system. The chip system includes at least one processor. Program instructions being executed by the at least one processor cause functions of the electronic device in any possible method of the first aspect to be implemented.

DESCRIPTION OF EMBODIMENTS

Terms used in the following embodiments are merely intended to describe specific embodiments, but are not intended to limit this application. As used in the specification of this application and the appended claims, singular expression forms "one", "a", "the", "the foregoing", and "this" are intended to also include an expression form such as "one or more", unless otherwise specified in the context. It should be further understood that, in the following embodiments of this application, "at least one" and "one or more" mean "one, two, or more than two". The term "and/or" is used to describe an association relationship between associated objects, and indicates that three relationships may exist. For example, A and/or B may represent the following cases: Only A exists, both A and B exist, and only B exists, where each of A and B may be singular or plural. The character "/" generally indicates an "or" relationship between associated objects.

Referring to "an embodiment" or "some embodiments" or the like described in this specification means that one or more embodiments of this application include a specific feature, structure, or characteristic described with reference to the embodiment. Therefore, expressions such as "in an embodiment", "in some embodiments", "in some other embodiments", and "in some different embodiments" appearing in different places in this specification do not necessarily indicate reference to a same embodiment, but mean "one or more but not all embodiments", unless otherwise specified in another way. The terms "include", "comprise", and "have", and variants thereof all mean "including but not limited to", unless otherwise specified in another way.

The following describes an electronic device, a user interface used for such an electronic device, and embodiments for using such an electronic device. In some embodiments, the electronic device may be a portable electronic device that further includes another function such as a personal digital assistant function and/or a music player function, for example, a mobile phone, a tablet computer, or a wearable electronic device with a wireless communication function (such as a smartwatch). An example embodiment of the portable electronic device includes but is not limited to a portable electronic device with iOS®, Android®, Microsoft®, or another operating system. In one embodiment, the foregoing portable electronic device may be another portable electronic device, such as a laptop (Laptop) computer. It should be further understood that, in some other embodiments, the foregoing electronic device may alternatively be a desktop computer rather than a portable electronic device.

Figure 1:
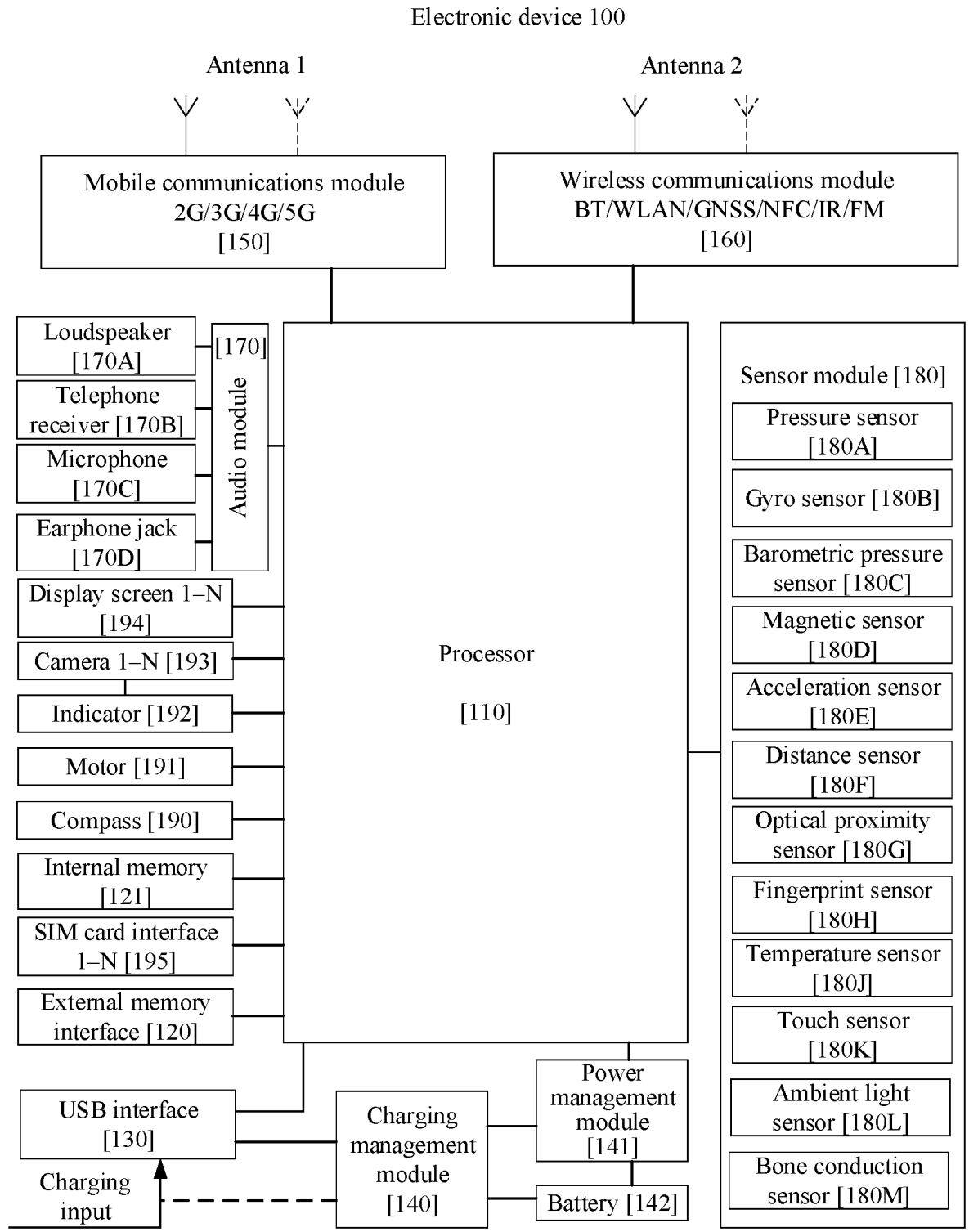
FIG. 1 is a schematic structural diagram of hardware of an electronic device according to an embodiment of this application.

For example, FIG. 1 is a schematic structural diagram of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a loudspeaker 170A, a telephone receiver 170B, a microphone 170C, an earphone jack 170D, a sensor module 180, a compass 190, a motor 191, an indicator 192, a camera 193, a display screen 194, a subscriber identity module (subscriber identification module, SIM) card interface 195, and the like.

It can be understood that the structure illustrated in this embodiment of this application does not constitute a specific limitation on the electronic device 100. In some other embodiments of this application, the electronic device 100 may include more or fewer components than those shown in the figure, or combine some components, or split some components, or have a different component arrangement. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. In some embodiments, the electronic device 101 may also include one or more processors 110. The controller may generate an operation control signal based on an instruction operation code and a time sequence signal, to complete control of instruction fetch and instruction execution. In some other embodiments, a memory may be further disposed in the processor 110, to store an instruction and data. For example, the memory in the processor 110 may be a cache. The memory may store an instruction or data that is recently used or cyclically used by the processor 110. If the processor 110 needs to use the instruction or the data again, the processor 110 may directly invoke the instruction or the data from the memory. This avoids repeated access, and reduces a waiting time of the processor 110, to improve efficiency of data processing or instruction execution of the electronic device 101.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface, and/or a USB interface or the like. The USB interface 130 is an interface conforming to a USB standard specification, and may be specifically a mini USB interface, a micro USB interface, a USB type C interface, or the like. The USB interface 130 may be used to connect a charger to charge the electronic device 101, or may be used to transmit data between the electronic device 101 and a peripheral device. The USB interface 130 may also be used to connect an earphone, to play audio through the earphone.

It can be understood that an interface connection relationship, between the modules, illustrated in this embodiment of this application is merely an example for description, and does not constitute a limitation on a structure of the electronic device 100. In some other embodiments of this application, the electronic device 100 may alternatively use an interface connection manner different from that in the foregoing embodiment, or a combination of interface connection manners.

The charging management module 140 is configured to receive a charging input from the charger. The charger may be a wireless charger, or may be a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the electronic device 100. When the charging management module 140 is charging the battery 142, power may be further supplied to the electronic device by using the power management module 141.

The power management module 141 is configured to connect the battery 142, the charging management module 140, and the processor 110. The power management module 141 receives an input from the battery 142 and/or the charging management module 140, and supplies power to the processor 110, the internal memory 121, an external memory, the display screen 194, the camera 193, the wireless communications module 160, and the like. The power management module 141 may be further configured to monitor parameters such as a battery capacity, a quantity of battery cycles, and a battery health status (leakage and impedance). In some other embodiments, the power management module 141 may be alternatively disposed in the processor 110. In some other embodiments, the power management module 141 and the charging management module 140 may be alternatively disposed in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover a single communication frequency band or communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution including 2G, 3G, 4G, 5G, or the like, applied to the electronic device 100. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and transmit the processed electromagnetic wave to the modem processor for demodulation. The mobile communications module 150 may further amplify a signal modulated by the modem processor, and convert the amplified signal to an electromagnetic wave for radiation by using the antenna 1. In some embodiments, at least some of function modules of the mobile communications module 150 may be disposed in the processor 110. In some embodiments, at least some of function modules of the mobile communications module 150 may be disposed in a same component as at least some of modules of the processor 110.

The wireless communications module 160 may provide wireless communication solutions including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like, applied to the electronic device 100. The wireless communications module 160 may be one or more components integrating at least one communications processor module. The wireless communications module 160 receives an electromagnetic wave by using the antenna 2, performs frequency modulation and filtering processing on an electromagnetic wave signal, and sends the processed signal to the processor 110. The wireless communications module 160 may further receive a to-be-sent signal from the processor 110, perform frequency modulation and amplification on the signal, and convert the frequency-modulated and amplified signal to an electromagnetic wave for radiation by using the antenna 2.

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation, and is used for graphics rendering. The processor 110 may include one or more GPUs that execute a program instruction to generate or change display information.

The display screen 194 is configured to display an image, a video, and the like. The display screen 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a mini light-emitting diode (mini light-emitting diode, mini LED), a micro LED, a micro OLED, a quantum dot light emitting diode (quantum dot light emitting diode, QLED), or the like. In some embodiments, the electronic device 100 may include one or more display screens 194.

In some embodiments of this application, when the display panel uses a material such as an OLED, an AMOLED, or an FLED, the display screen 194 in FIG. 1 can be bent. Herein, that the display screen 194 can be bent means that the display screen can be bent into any angle at any part of the display screen, and may remain the angle. For example, the display screen 194 may be folded in half along a middle part of the display screen and a right half covers a left half, or the display screen may be folded in half along a middle part of the display screen and an upper half covers a lower half.

The display screen 194 of the electronic device 100 may be a flexible screen. Currently, much attention is paid to flexible screens due to unique characteristics and tremendous potential of flexible screens. Compared with conventional screens, flexible screens are characterized by strong flexibility and bendability, can provide a bendability-based new interaction manner for users, and can meet more requirements of users on electronic devices. For an electronic device having a foldable display screen, the foldable display screen on the electronic device may switch between a small screen in a folded form and a large screen in an unfolded form at any time. Therefore, a screen split function is used by users more frequently on electronic devices having foldable display screens.

The electronic device 100 may implement a camera function by using the ISP, the camera 193, the video codec, the GPU, the display screen 194, the application processor, and the like.

The ISP is configured to process data fed back by the camera 193. For example, during photographing, a shutter is opened, light is transferred to a photosensitive element of the camera through a lens, an optical signal is converted to an electrical signal, and the photosensitive element of the camera transfers the electrical signal to the ISP for processing, and the electrical signal is converted to an image visible to a naked eye. The ISP may further perform algorithm optimization on an image noise, luminance, and complexion. The ISP may further optimize parameters such as an exposure and a color temperature of a shooting scenario. In some embodiments, the ISP may be disposed in the camera 193.

The camera 193 is configured to capture a still image or a video. For an object, an optical image is generated by using the lens, and is projected onto the photosensitive element.

The photosensitive element may be a charge coupled device (charge coupled device, CCD) or a complementary metal-oxide-semiconductor (complementary metal-oxide-semiconductor, CMOS) phototransistor. The photosensitive element converts an optical signal to an electrical signal, and then transfers the electrical signal to the ISP, to convert the electrical signal to a digital image signal. The ISP outputs the digital image signal to the DSP for processing. The DSP converts the digital image signal to an image signal in a standard format such as RGB or YUV. In some embodiments, the electronic device 100 may include one or more cameras 193.

The digital signal processor is configured to process a digital signal, and in addition to a digital image signal, may further process another type of digital signal. For example, when the electronic device 100 performs frequency channel selection, the digital signal processor is configured to perform Fourier transform and the like on frequency channel energy.

The video codec is configured to compress or decompress a digital video. The electronic device 100 can support one or more types of video codecs. In this way, the electronic device 100 can play or record videos in encoding formats, for example, moving picture experts group (moving picture experts group, MPEG)-1, MPEG-2, MPEG-3, and MPEG-4.

The NPU is a neural-network (neural-network, NN) computing processor that quickly processes input information by emulating a biological neural network structure, for example, by emulating a mode of transfer between human-brain neurons, and may further perform self-learning constantly. The NPU may be used to implement applications such as intelligent cognition of the electronic device 100, for example, image recognition, facial recognition, speech recognition, and text understanding.

The external memory interface 120 may be configured to connect an external storage card, for example, a micro SD card, to extend a storage capability of the electronic device 100. The external storage card communicates with the processor 110 through the external memory interface 120, to implement a data storage function, for example, store a file such as a music file or a video file in the external storage card.

The internal memory 121 may be configured to store one or more computer programs, and the one or more computer programs include instructions. The processor 110 may run the instructions stored in the internal memory 121, and the electronic device 101 performs a page element display method provided in some embodiments of this application, and various applications, data processing, and the like. The internal memory 121 may include a program storage area and a data storage area. The program storage area may store an operating system. The program storage area may further store one or more applications (for example, "gallery" and "contacts") and the like. The data storage area may store data (for example, a photo and a contact) and the like created during use of the electronic device 101. In addition, the internal memory 121 may include a high-speed random access memory, and may further include a non-volatile memory, for example, one or more magnetic disk storage components, a flash memory component, or a universal flash storage (universal flash storage, UFS). In some embodiments, the processor 110 may run the instructions stored in the internal memory 121 and/or the instruction stored in the memory disposed in the processor 110, and the electronic device 101 performs a page element display method provided in some embodiments of this application, and other applications and data processing. The electronic device 100 may use the audio module 170, the loudspeaker 170A, the telephone receiver 170B, the microphone 170C, the earphone jack 170D, the application processor, and the like to implement an audio function, for example, music playback and sound recording.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal to an electrical signal. In some embodiments, the pressure sensor 180A may be disposed in the display screen 194. There are many types of pressure sensors 180A, for example, a resistive pressure sensor, an inductive pressure sensor, and a capacitive pressure sensor. The capacitive pressure sensor may include at least two parallel plates with conductive materials. When a force is applied to the pressure sensor 180A, capacitance between electrodes changes. The electronic device 100 determines pressure intensity based on a change in capacitance. When a touch operation is performed on the display screen 194, the electronic device 100 detects strength of the touch operation by using the pressure sensor 180A. The electronic device 100 may also calculate a touch location based on a detection signal of the pressure sensor 180A. In some embodiments, touch operations that are performed on a same touch location but have different touch operation strength may correspond to different operation instructions. For example, when a touch operation whose touch operation strength is less than a first pressure threshold is performed on an icon of a "Message" application, an instruction for viewing a message is executed; when a touch operation whose touch operation strength is greater than or equal to the first pressure threshold is performed on the icon of the "Message" application, an instruction for creating a new message is executed.

The gyro sensor 180B may be configured to determine a motion posture of the electronic device 100. In some embodiments, angular velocities of the electronic device 100 around three axes (namely, X, Y, and Z axes) may be determined by using the gyro sensor 180B. The gyro sensor 180B may be used for image stabilization during shooting. For example, when the shutter is pressed, the gyro sensor 180B detects a shaking angle of the electronic device 100, and calculates, based on the angle, a distance for which a lens module needs to compensate, to cancel shaking of the electronic device 100 through reverse motion of the lens, thereby implementing image stabilization. The gyro sensor 180B may also be used for navigation and a motion sensing game scenario.

The acceleration sensor 180E may detect magnitudes of accelerations of the electronic device 100 in various directions (generally along three axes), may detect a magnitude and direction of gravity when the electronic device 100 is static, and may be further configured to recognize a posture of the electronic device, and be applied to applications such as screen switching between a landscape mode and a portrait mode, and a pedometer.

The ambient light sensor 180L is configured to sense ambient light intensity. The electronic device 100 may adaptively adjust brightness of the display screen 194 based on the sensed ambient light intensity. The ambient light sensor 180L may also be configured to automatically adjust white balance during photographing. The ambient light sensor 180L may further cooperate with the optical proximity sensor 180G in detecting whether the electronic device 100 is in a pocket, to prevent an accidental touch.

The fingerprint sensor 180H is configured to collect a fingerprint. The electronic device 100 may use a collected fingerprint feature to implement fingerprint unlock, application access lock, fingerprint-based photographing, fingerprint-based call answering, and the like.

The temperature sensor 180J is configured to detect a temperature. In some embodiments, the electronic device 100 executes a temperature processing policy based on a temperature detected by the temperature sensor 180J. For example, when a temperature reported by the temperature sensor 180J exceeds a threshold, the electronic device 100 lowers performance of a processor near the temperature sensor 180J, to reduce power consumption and implement thermal protection. In some other embodiments, when a temperature is less than another threshold, the electronic device 100 heats the battery 142 to avoid abnormal shutdown of the electronic device 100 caused by low temperature. In some other embodiments, when a temperature is less than still another threshold, the electronic device 100 boosts an output voltage of the battery 142 to avoid abnormal shutdown caused by low temperature.

The touch sensor 180K is also referred to as a "touch panel". The touch sensor 180K may be disposed in the display screen 194, and the touch sensor 180K and the display screen 194 constitute a touchscreen, also referred to as a "touch control screen". The touch sensor 180K is configured to detect a touch operation on or near the touchscreen. The touch sensor may transfer a detected touch operation to the application processor to determine a touch event type. A visual output related to the touch operation may be provided by using the display screen 194. In some other embodiments, the touch sensor 180K may be alternatively disposed on a surface of the electronic device 100, at a location different from that of the display screen 194.

Figure 2:
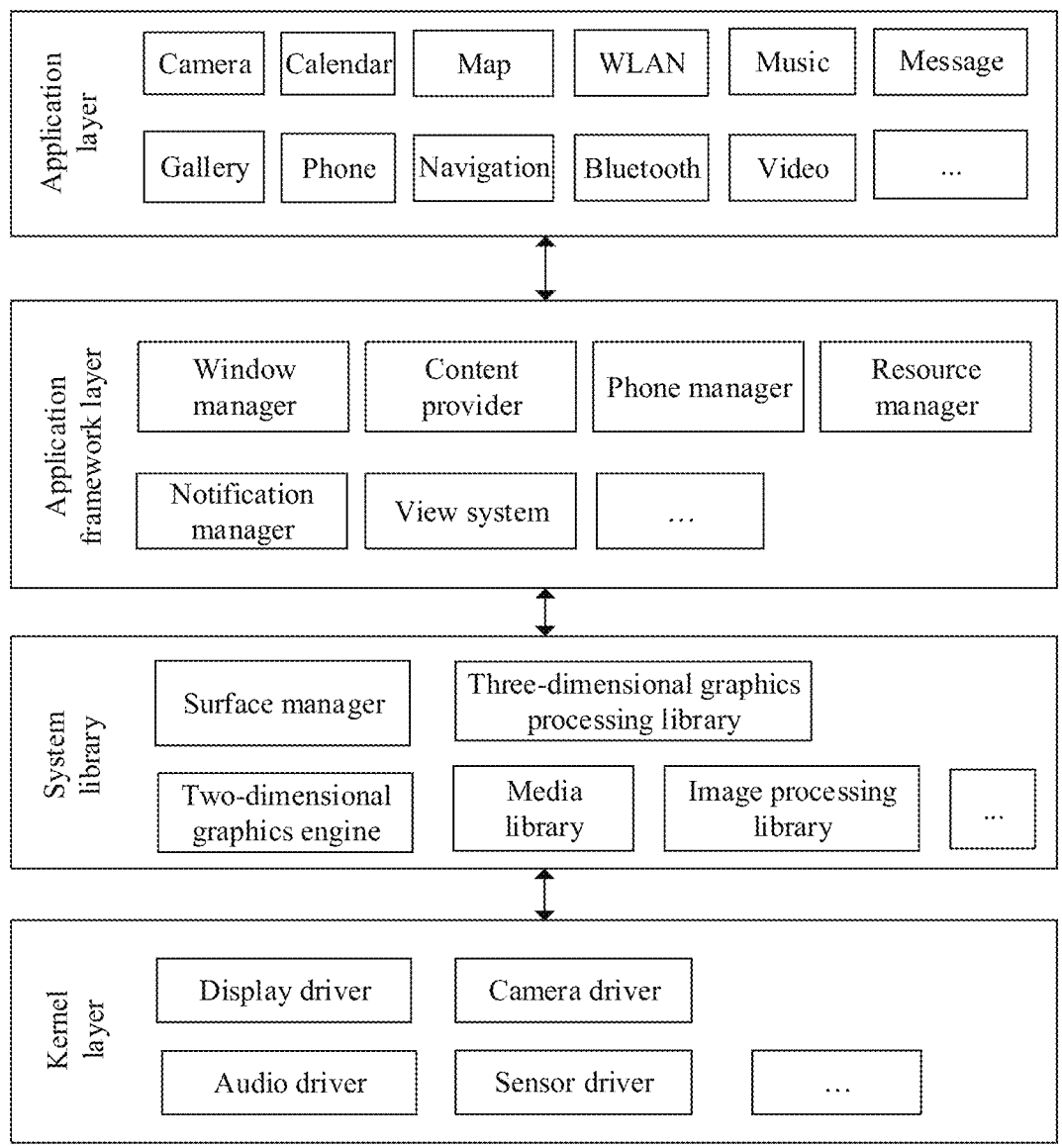
FIG. 2 is a schematic structural diagram of software of an electronic device according to an embodiment of this application.
Figure 3A:
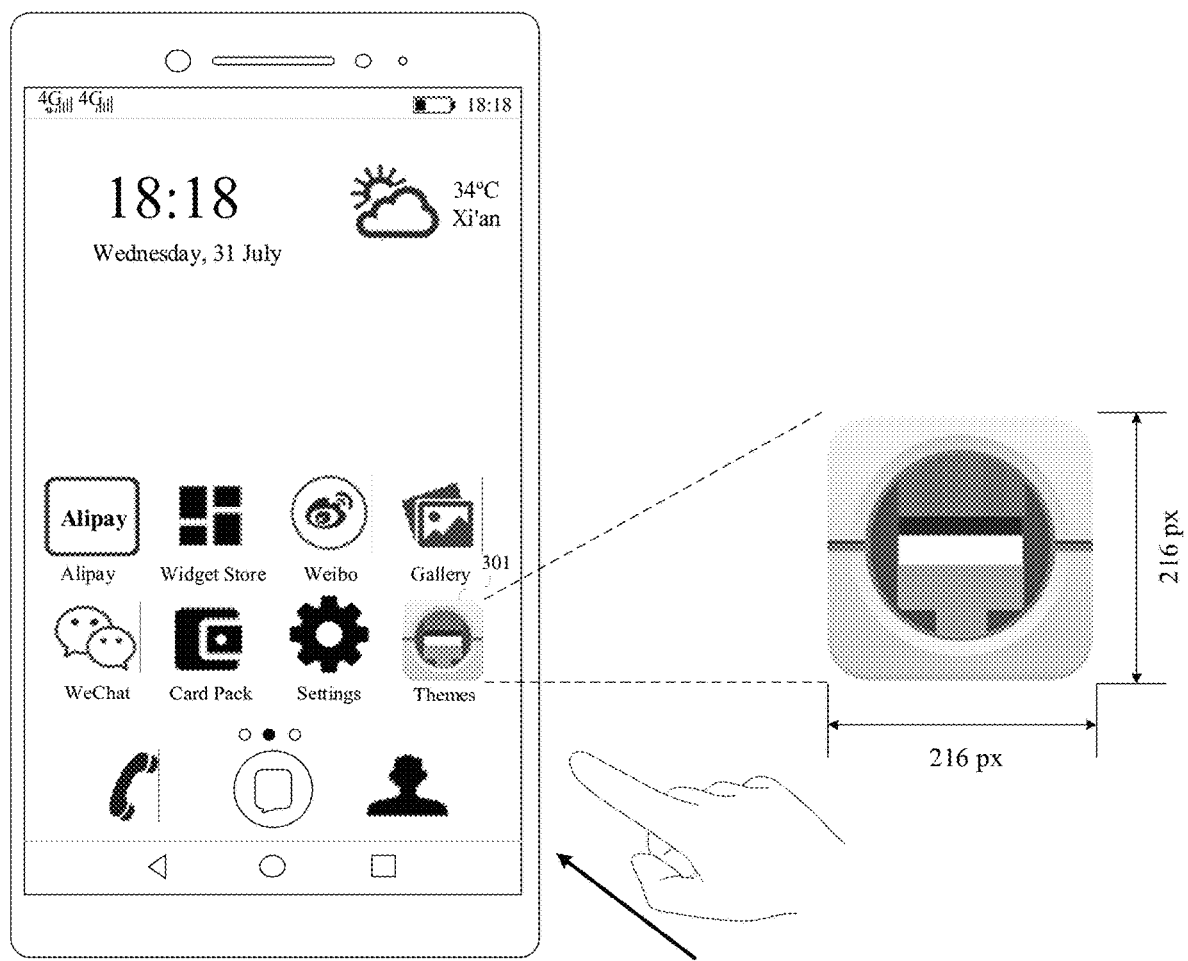
FIG. 3 is a schematic diagram of a group of GUI pages according to an embodiment of this application.
Figure 3B:
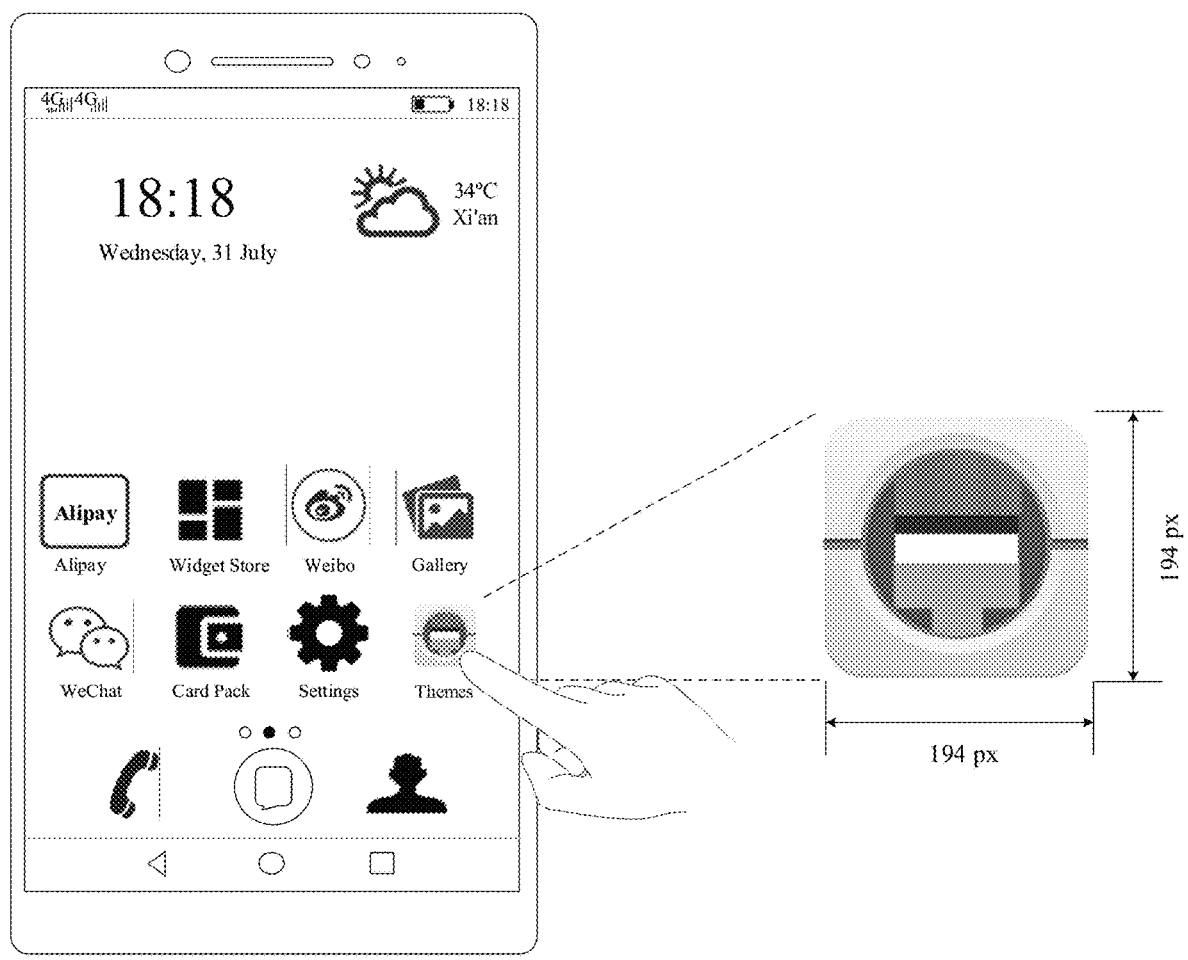
Figure 3C:
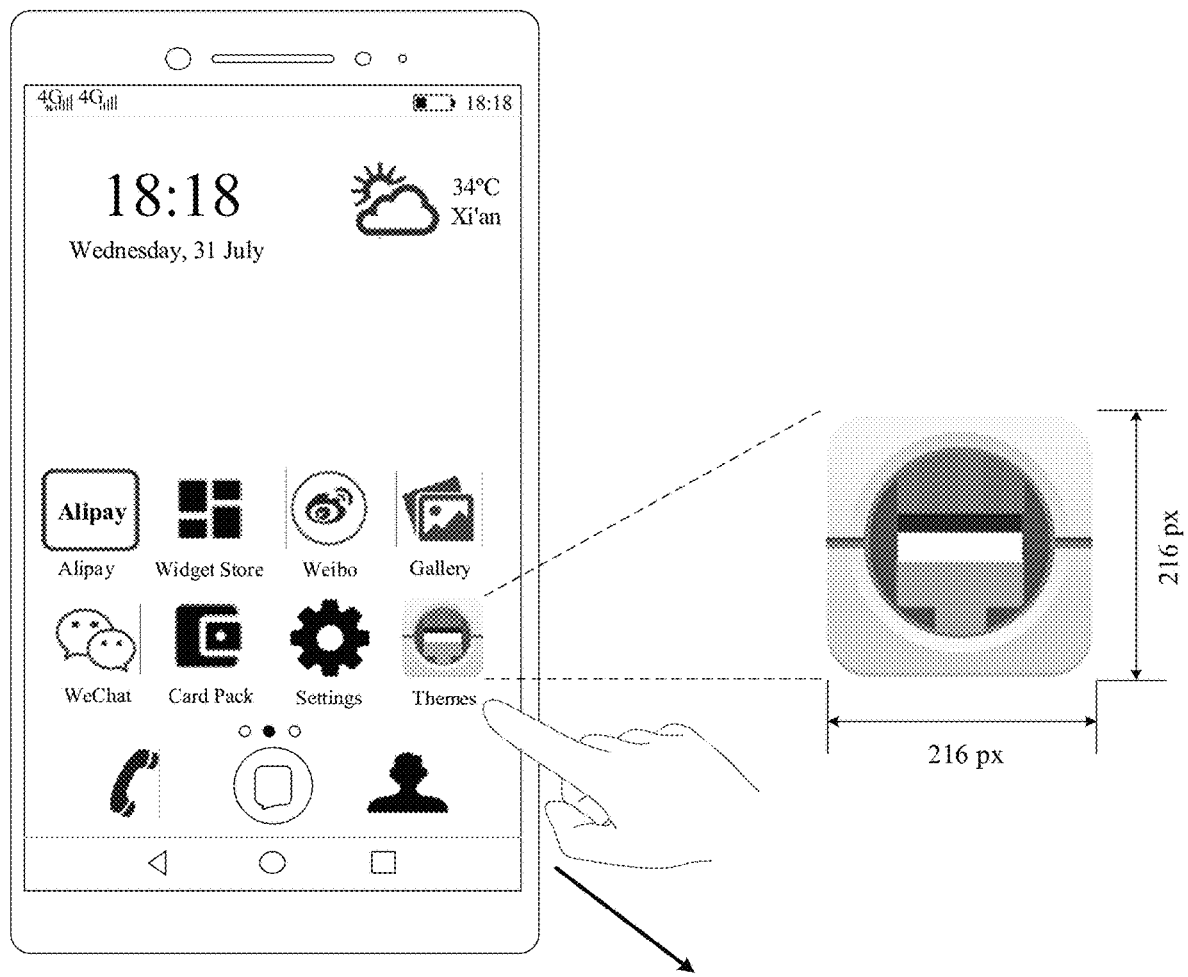
Figure 3D:
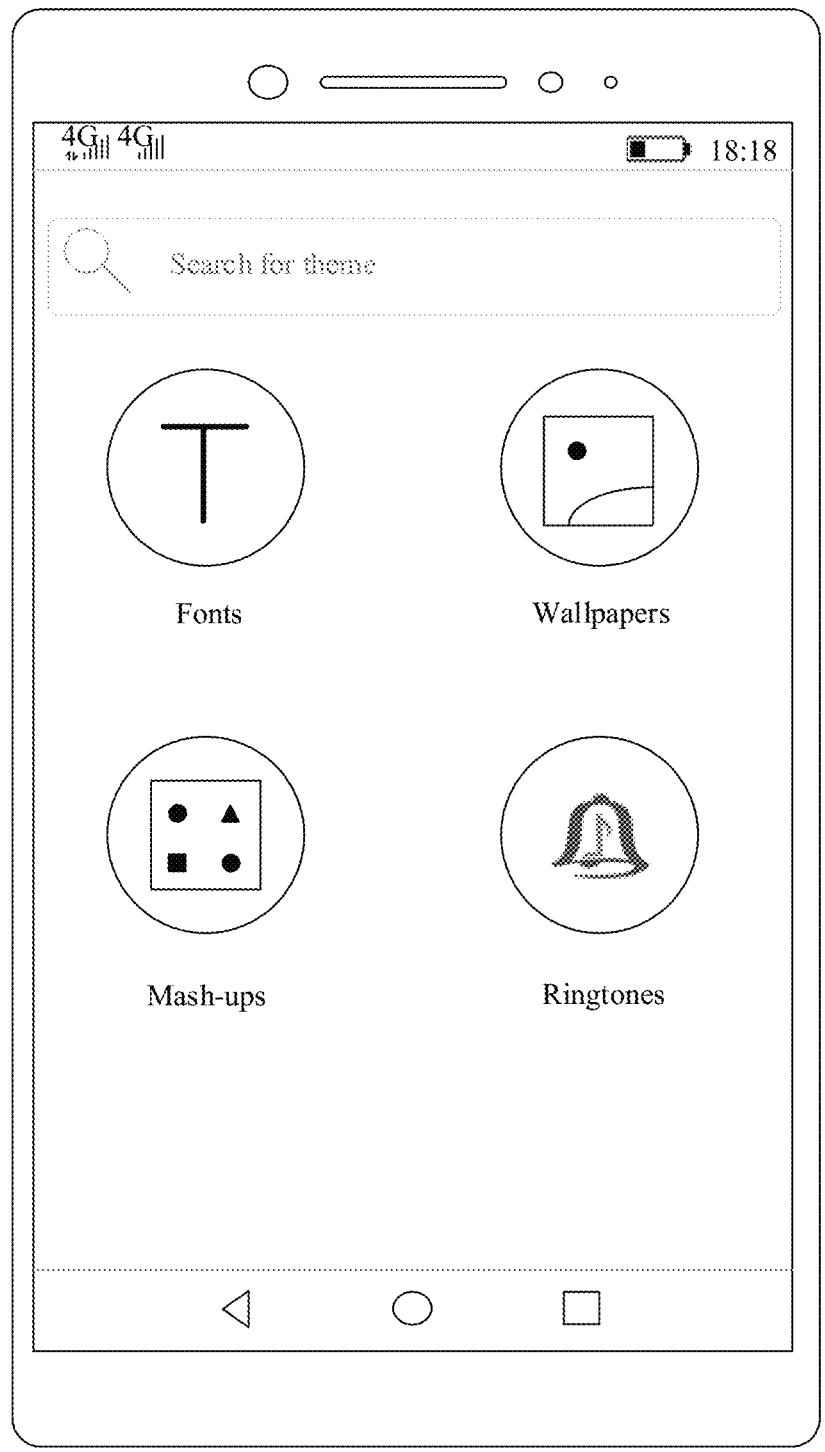
Figure 4A:
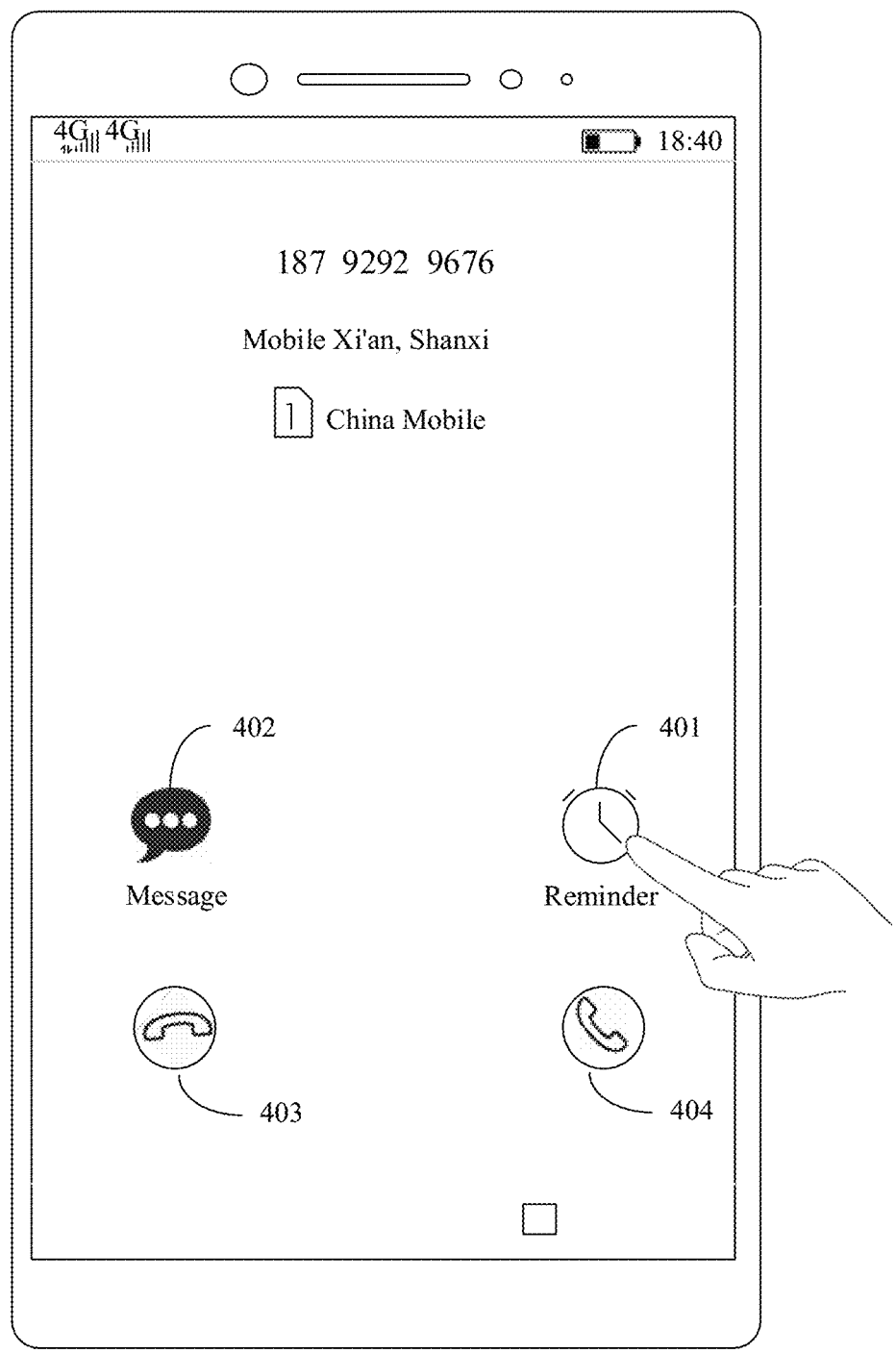
FIG. 4 is a schematic diagram of another group of GUI pages according to an embodiment of this application.
Figure 4B:
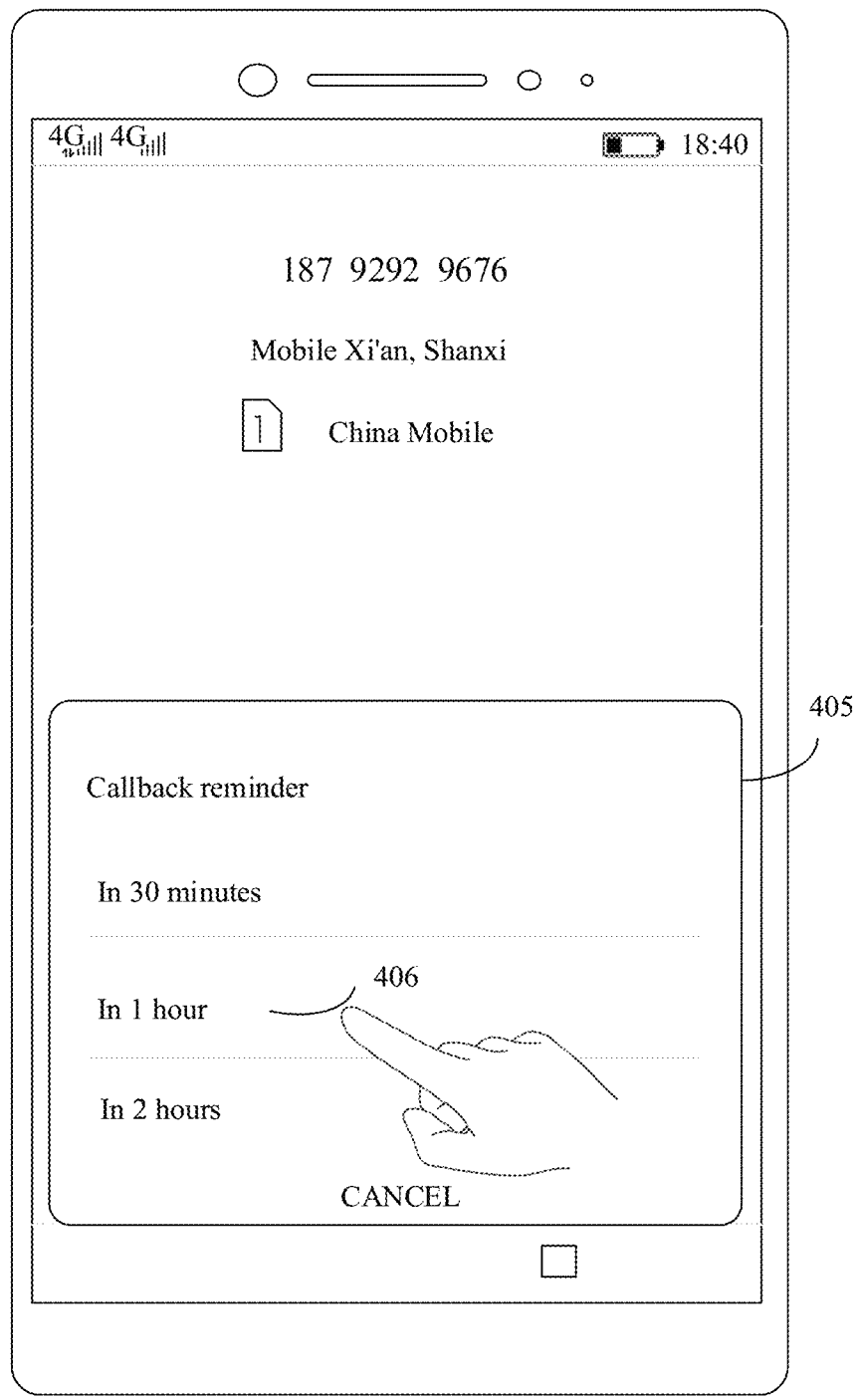
Figure 4C:
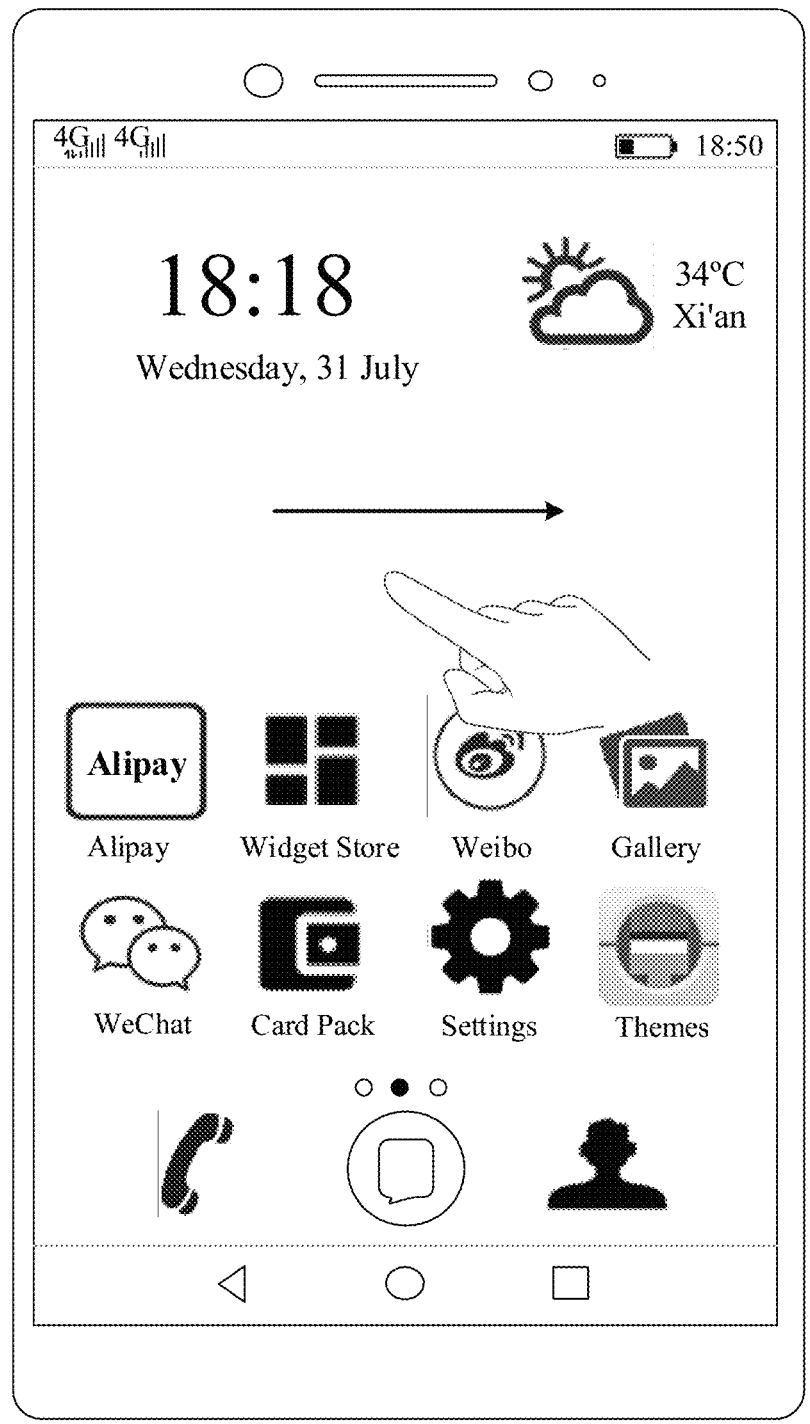
Figure 4D:
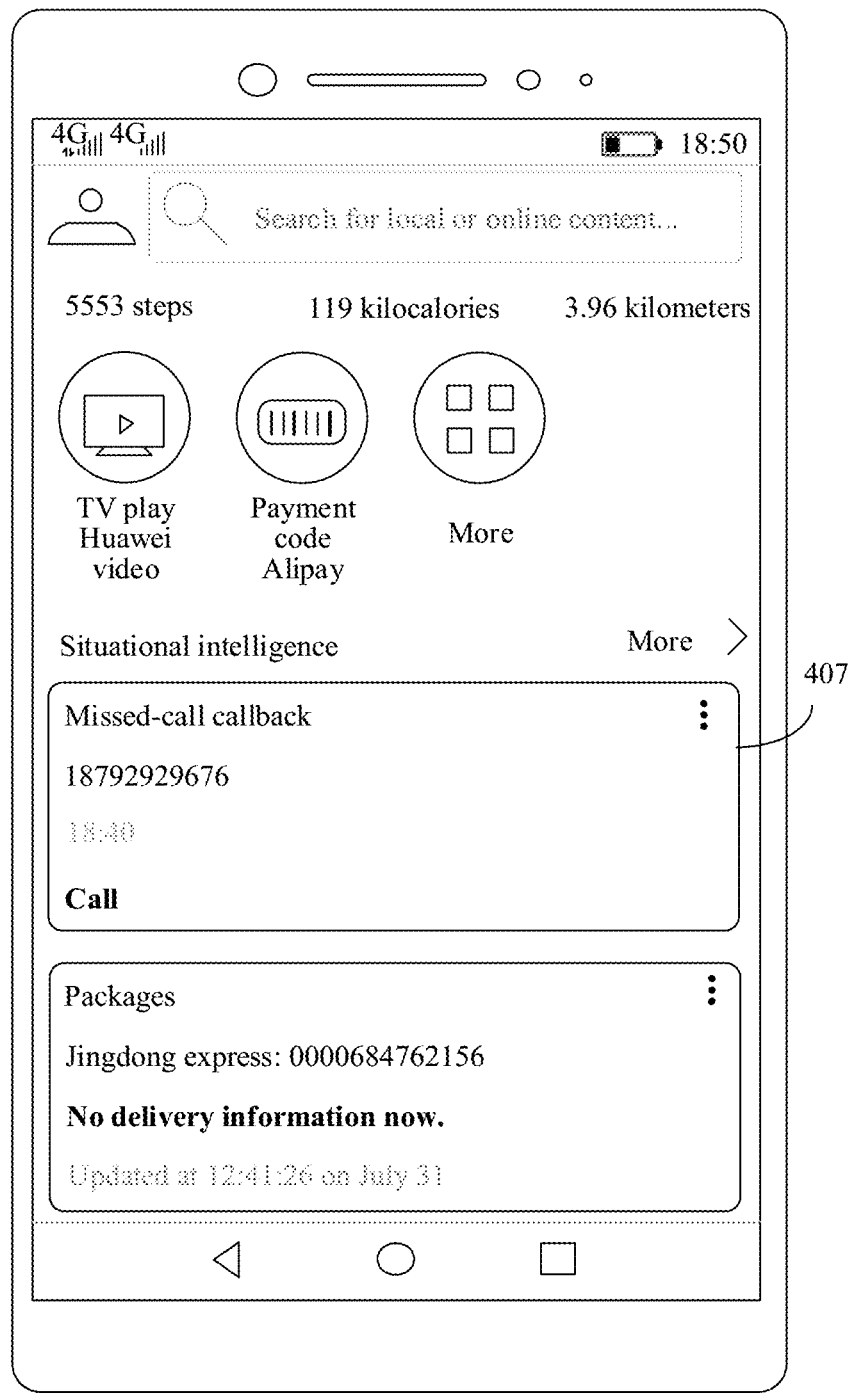
Figure 4E:
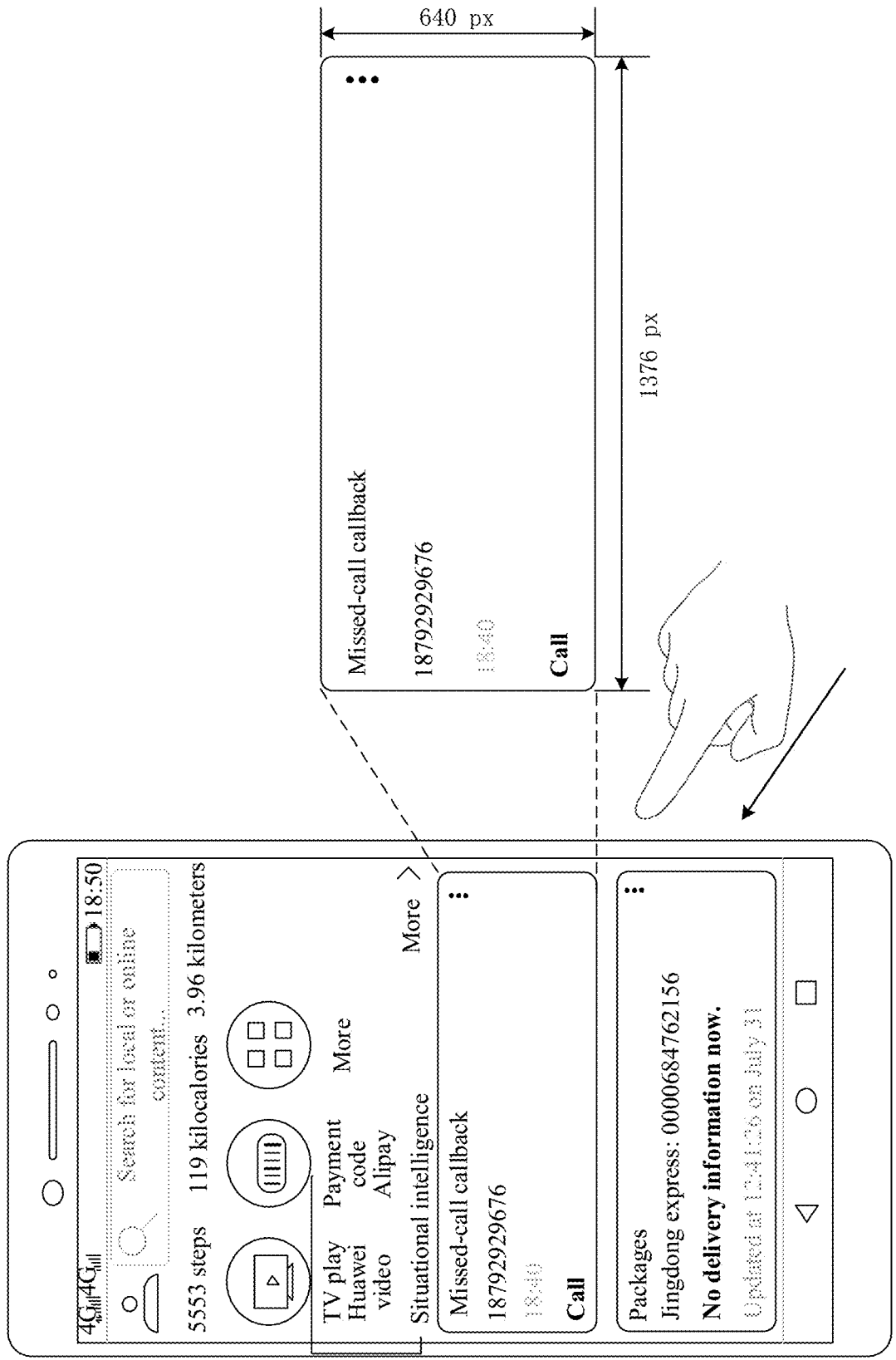
Figure 4F:
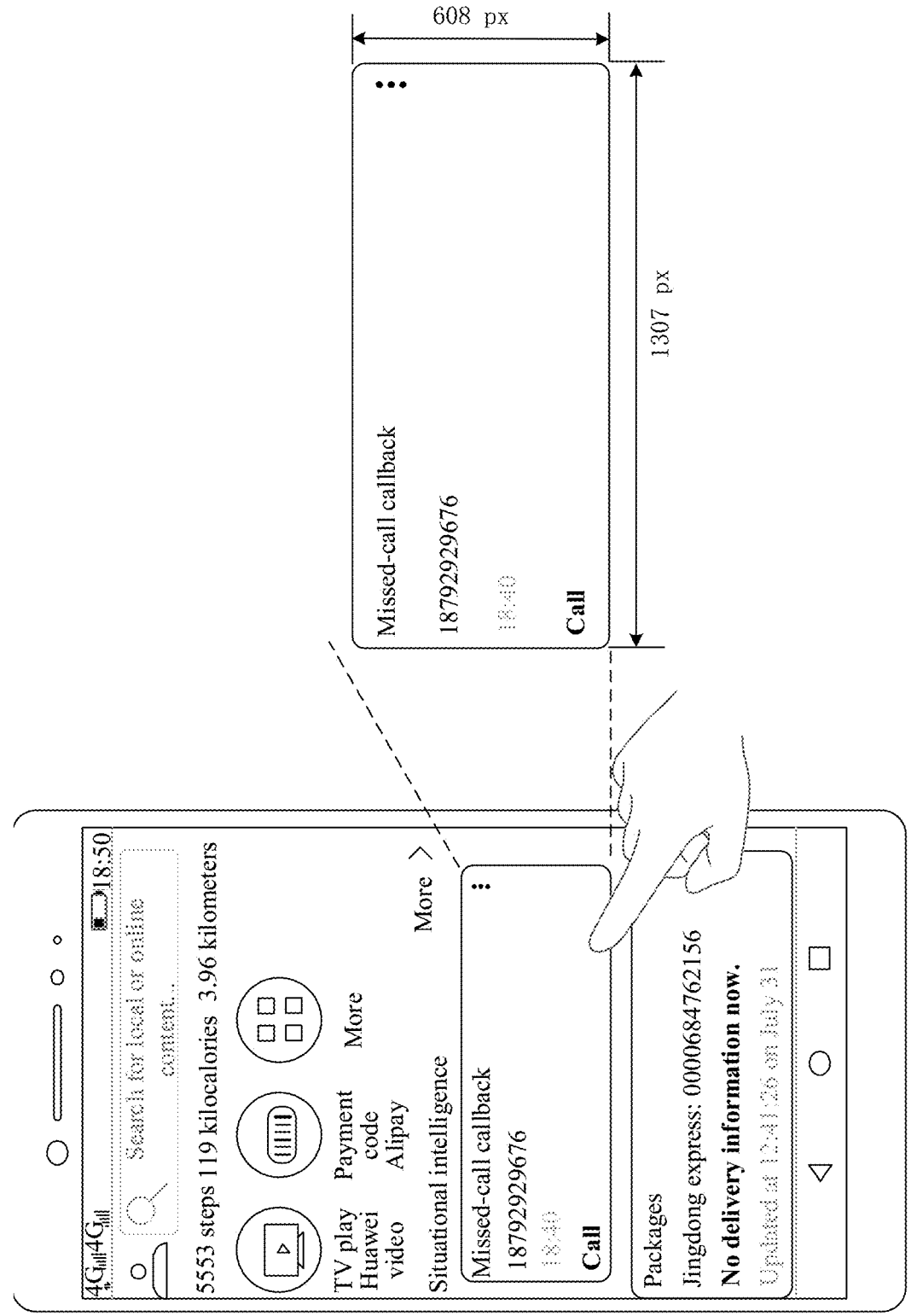
Figure 4G:
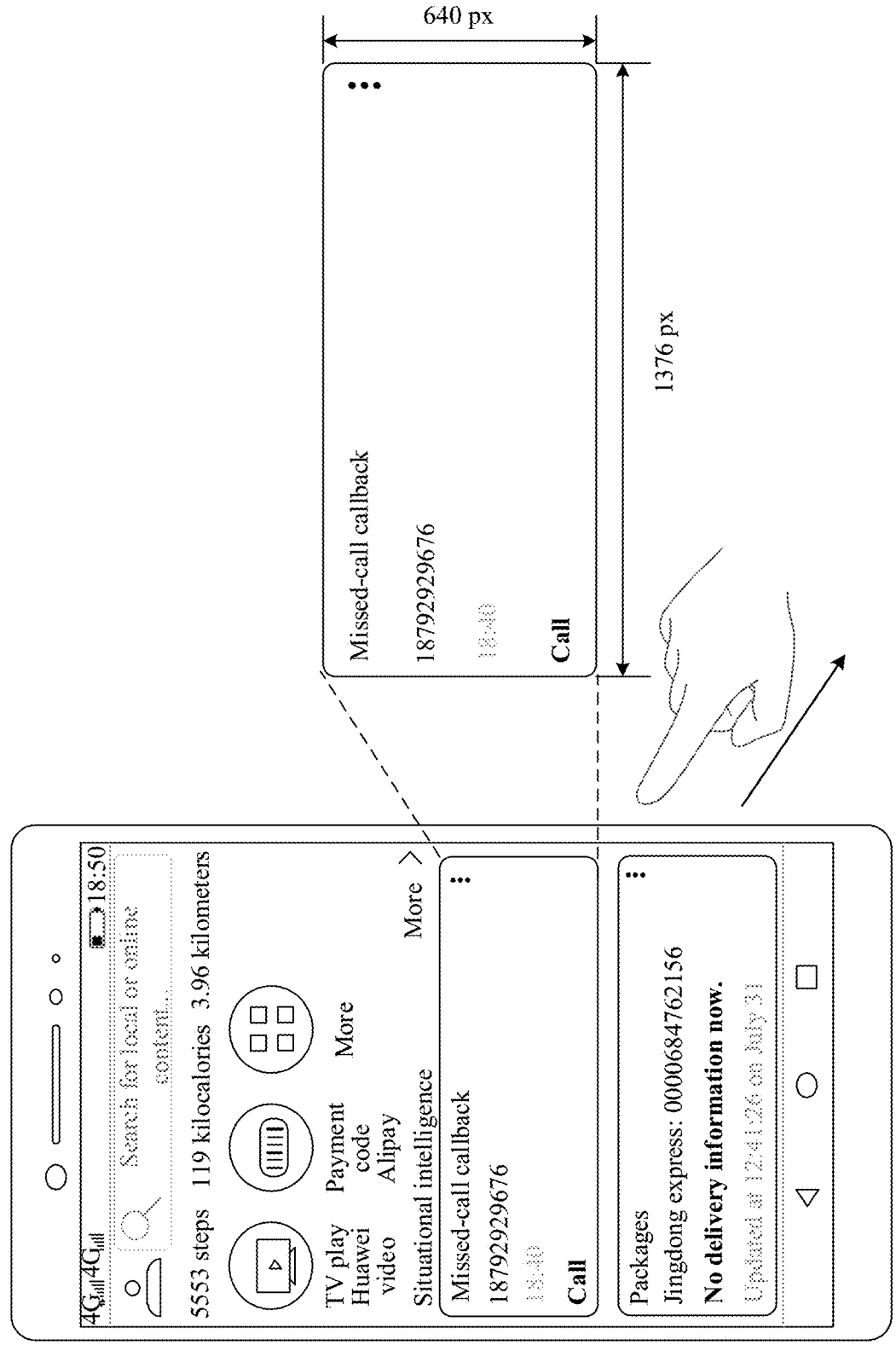
Figure 4H:
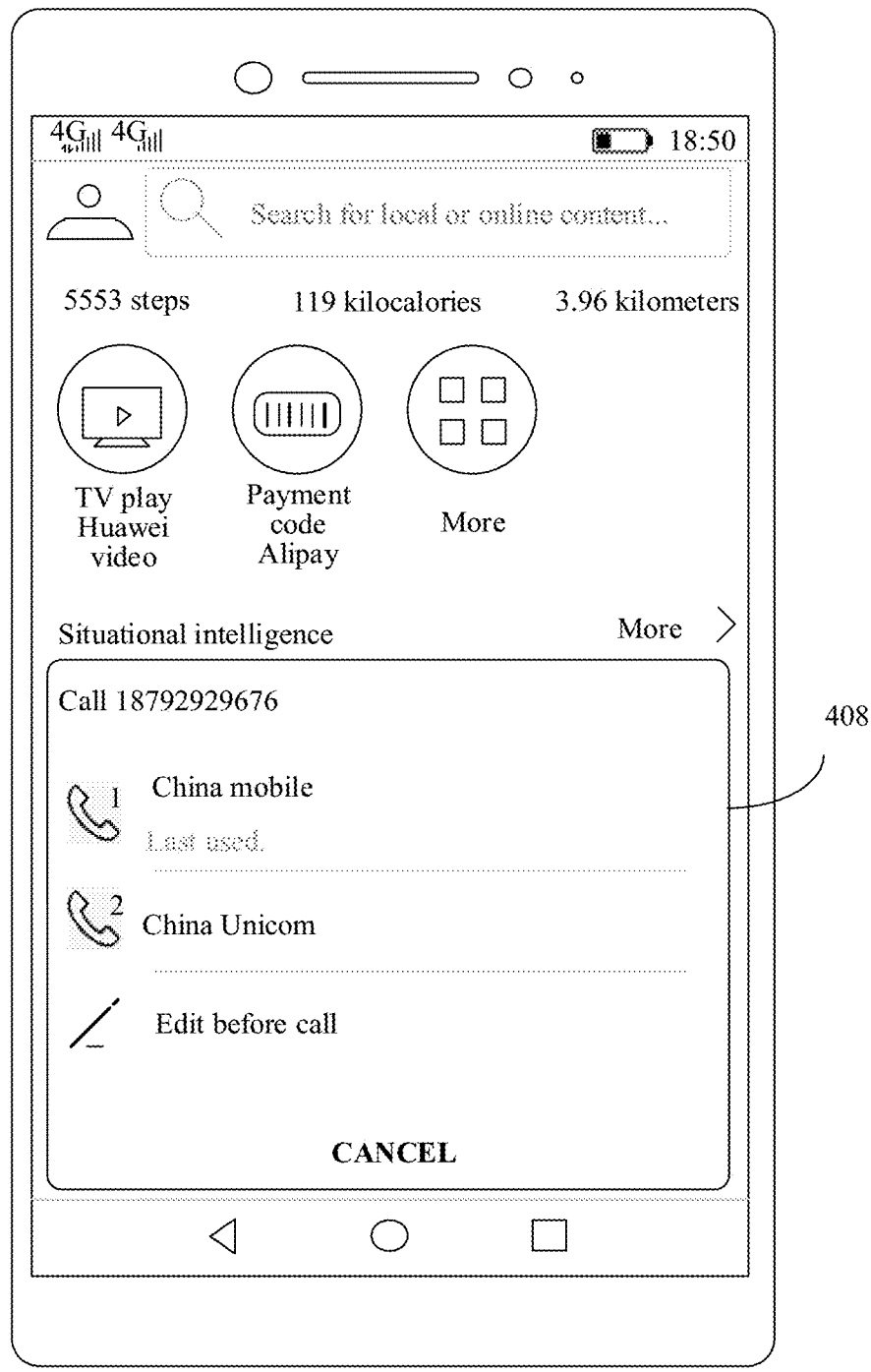
Figure 5A:
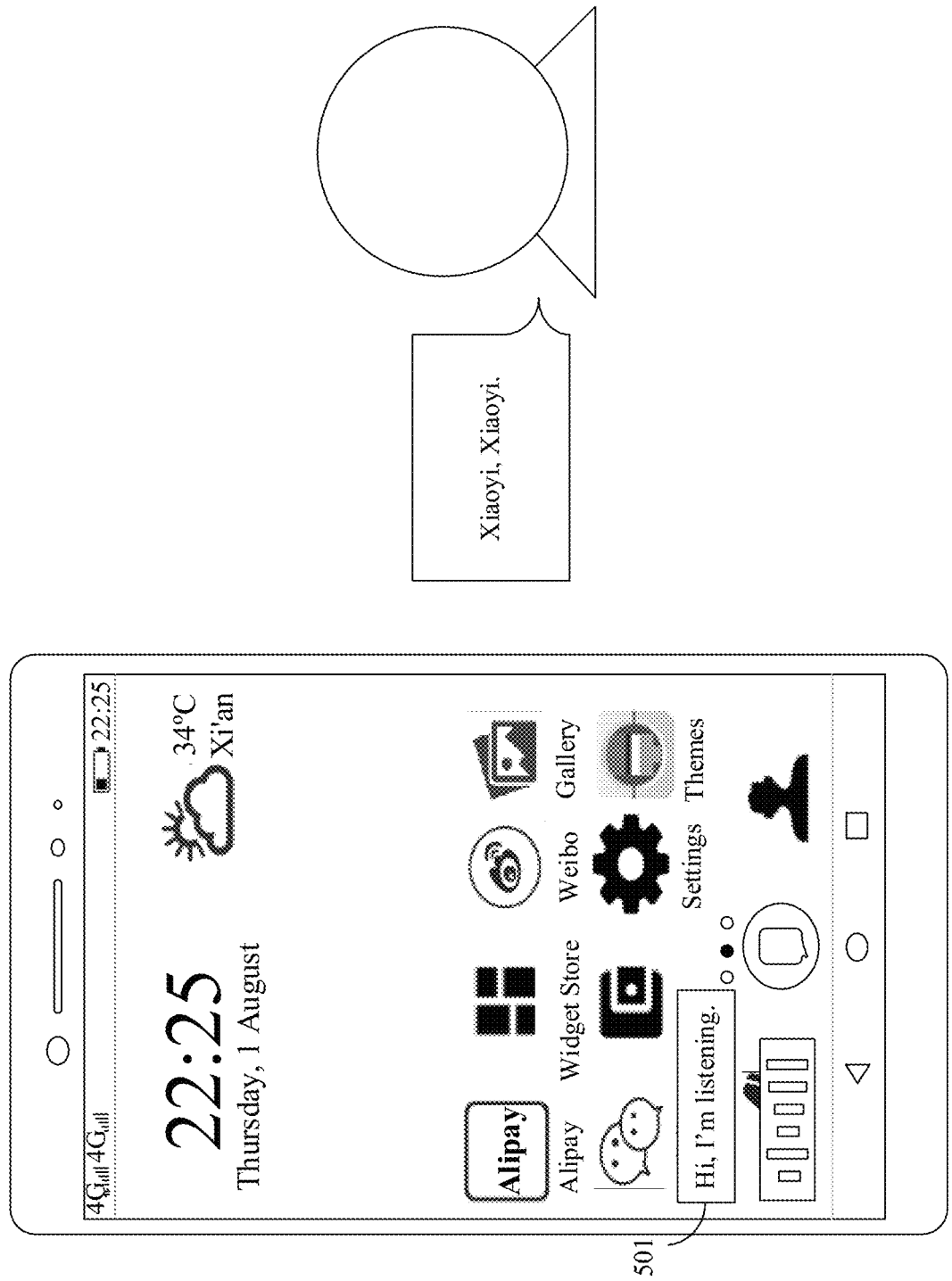
FIG. 5 is a schematic diagram of another group of GUI pages according to an embodiment of this application.
Figure 5C:
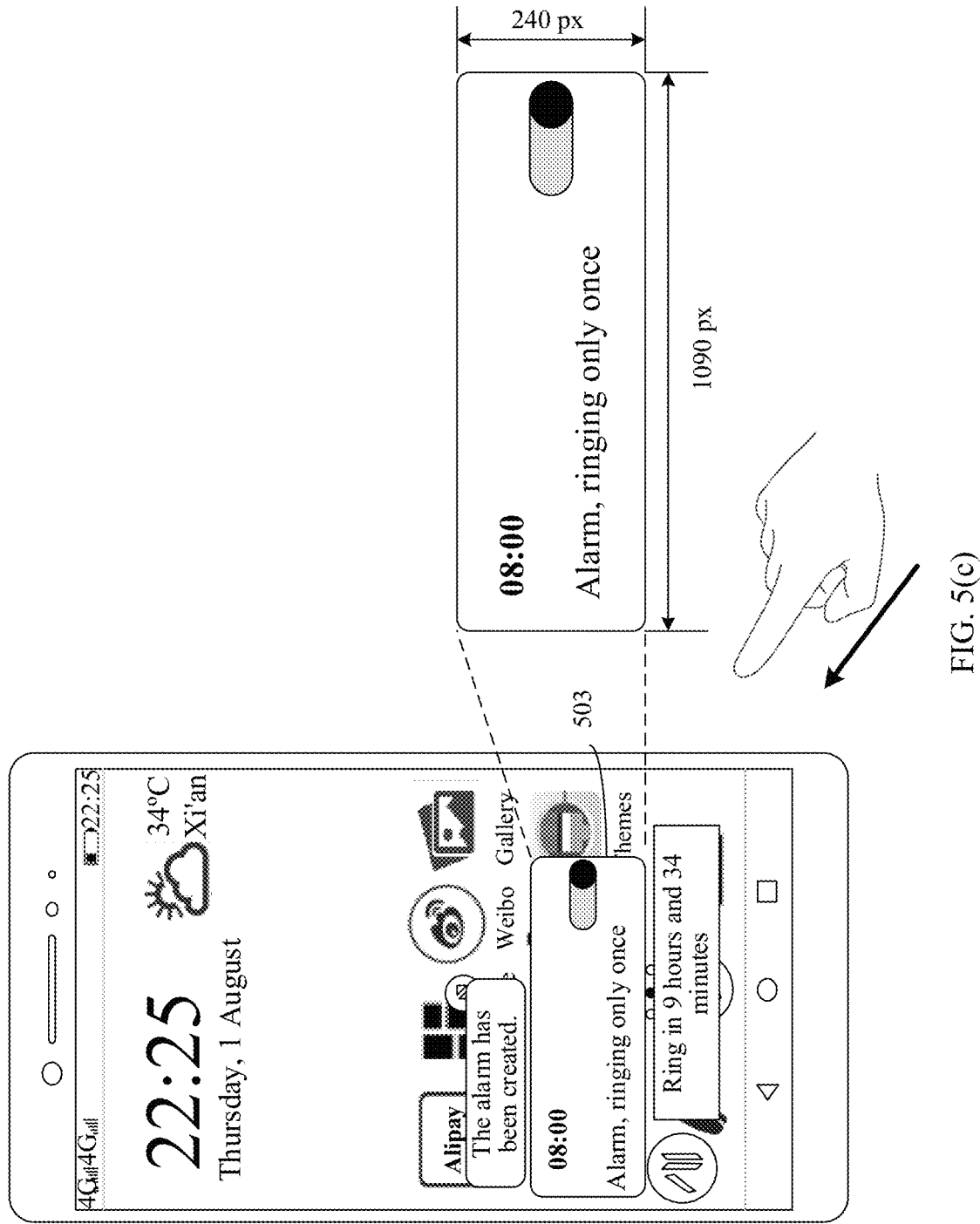
Figure 5D:
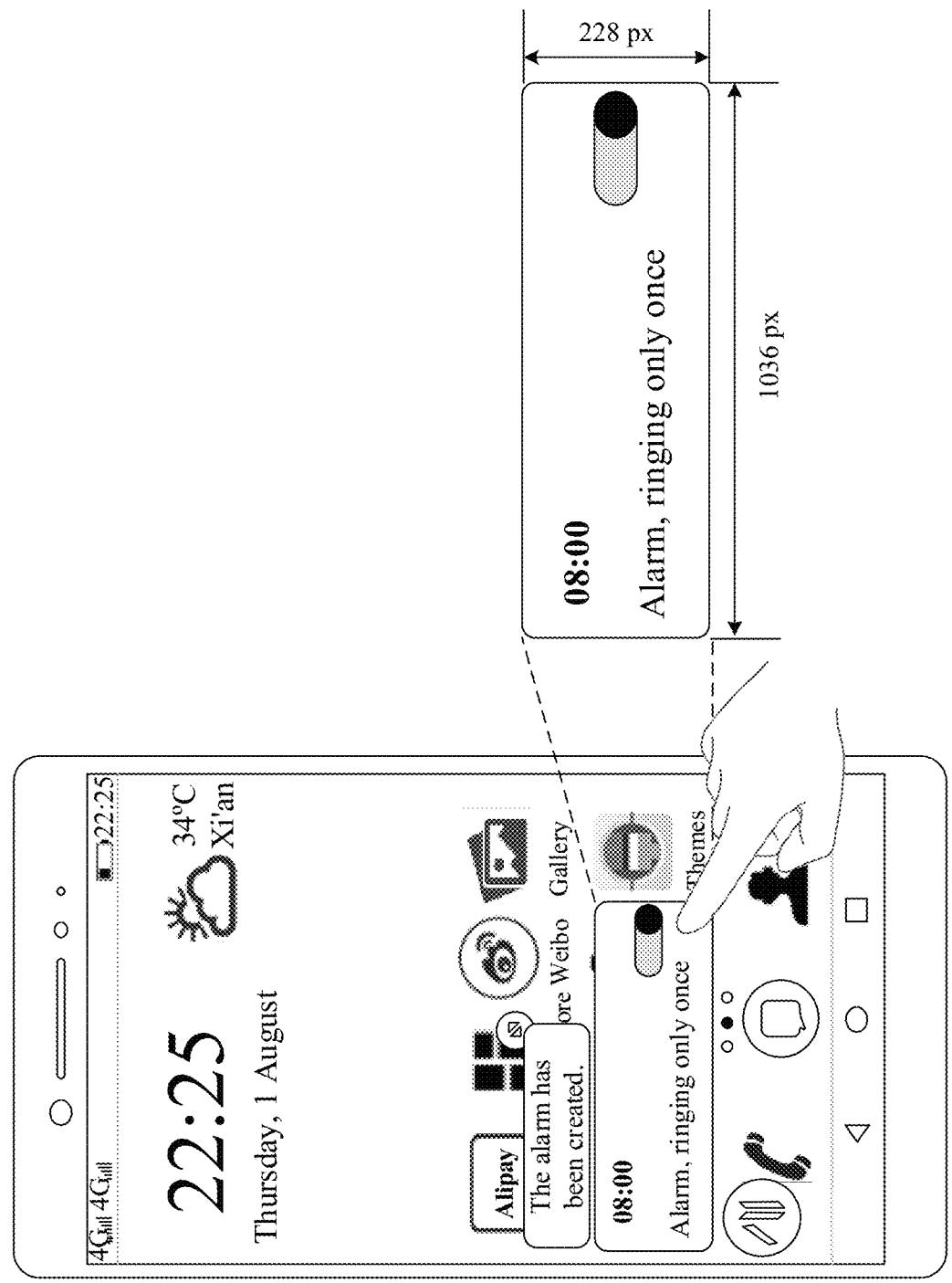
Figure 5E:
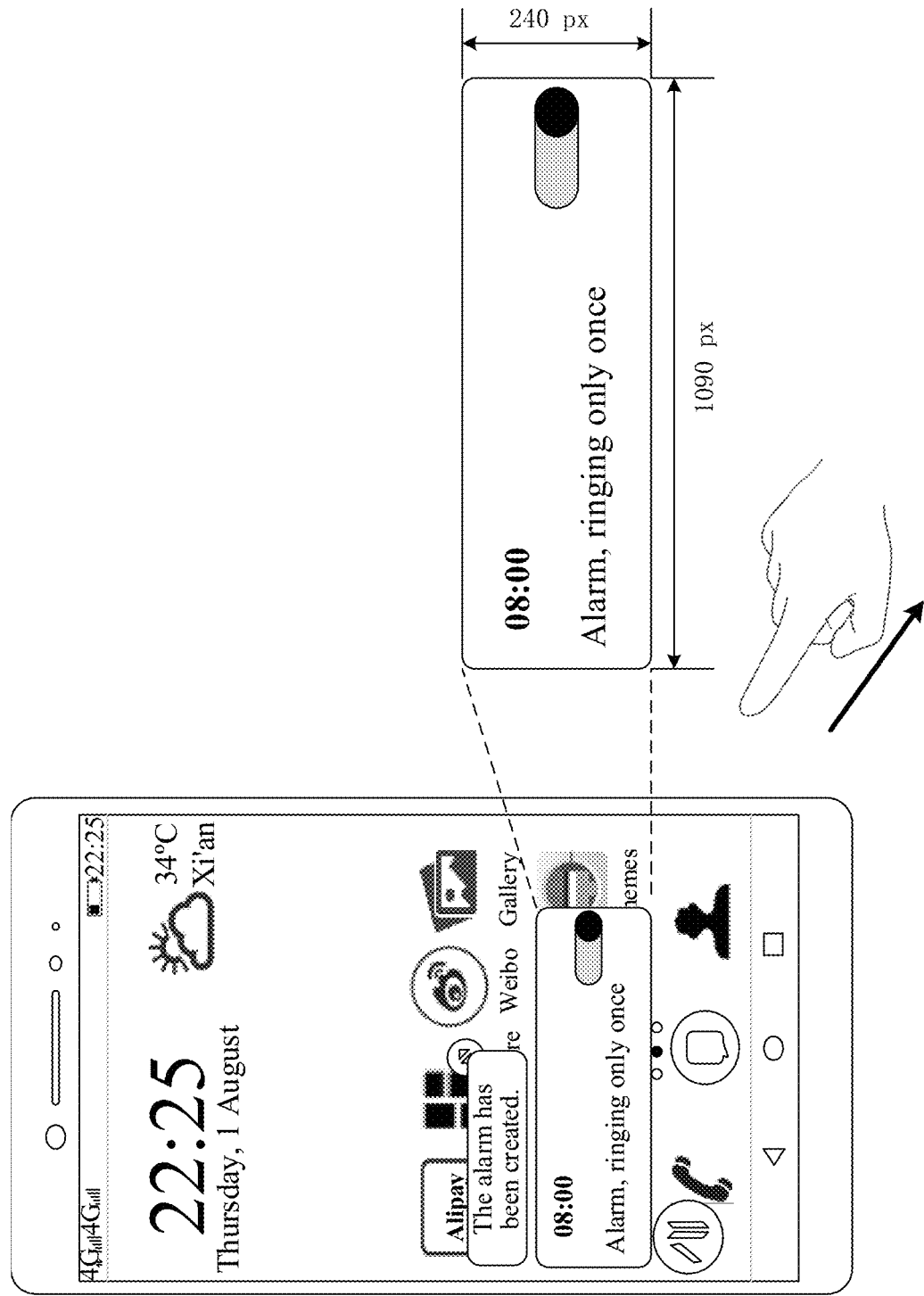
Figure 5F:
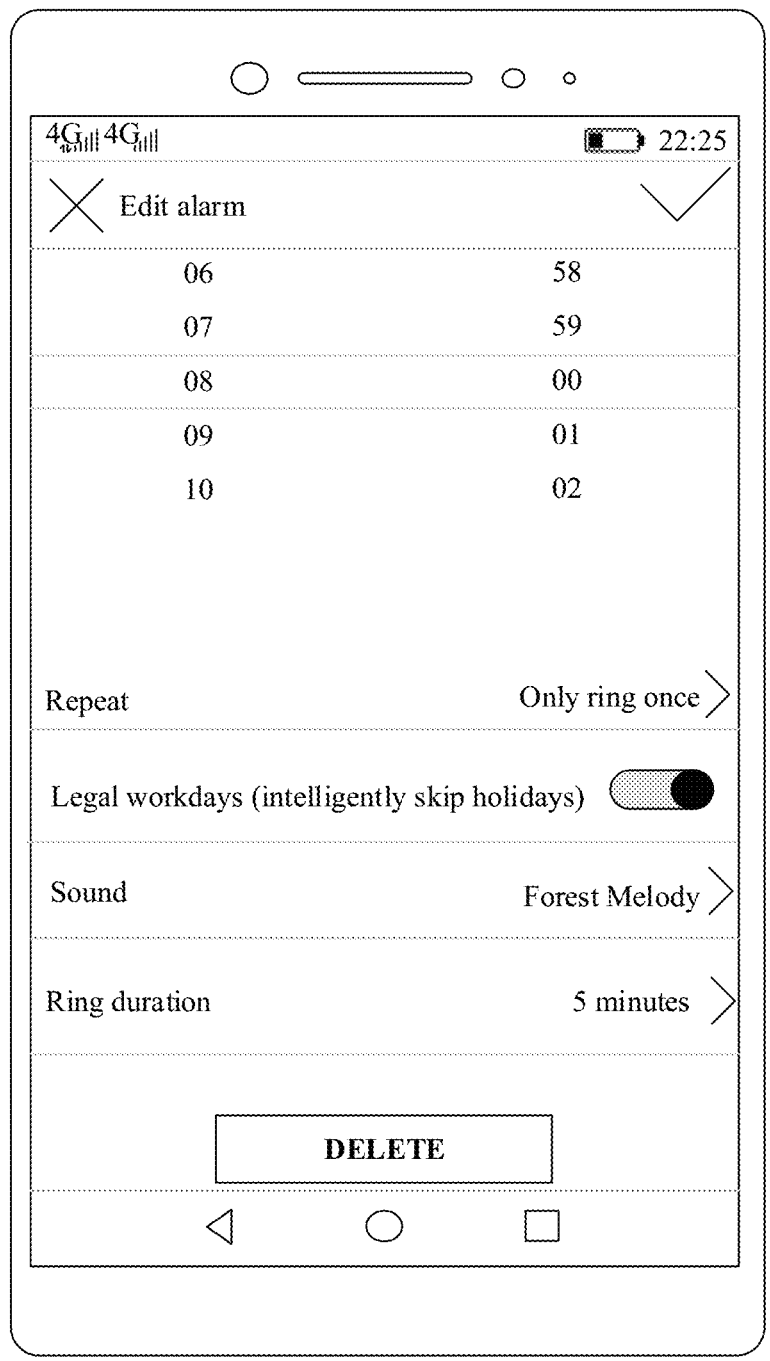
Figure 6A:
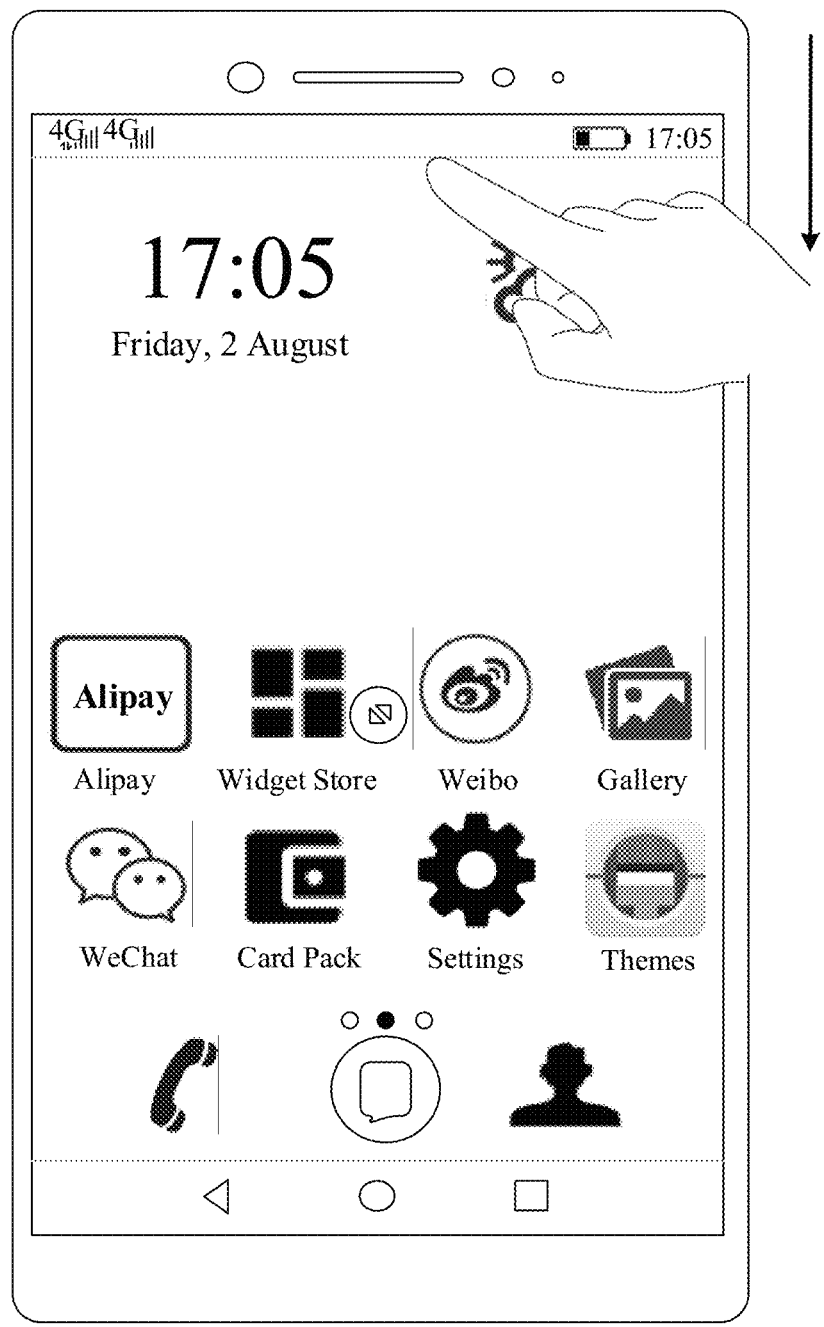
FIG. 6 is a schematic diagram of another group of GUI pages according to an embodiment of this application.
Figure 6B:
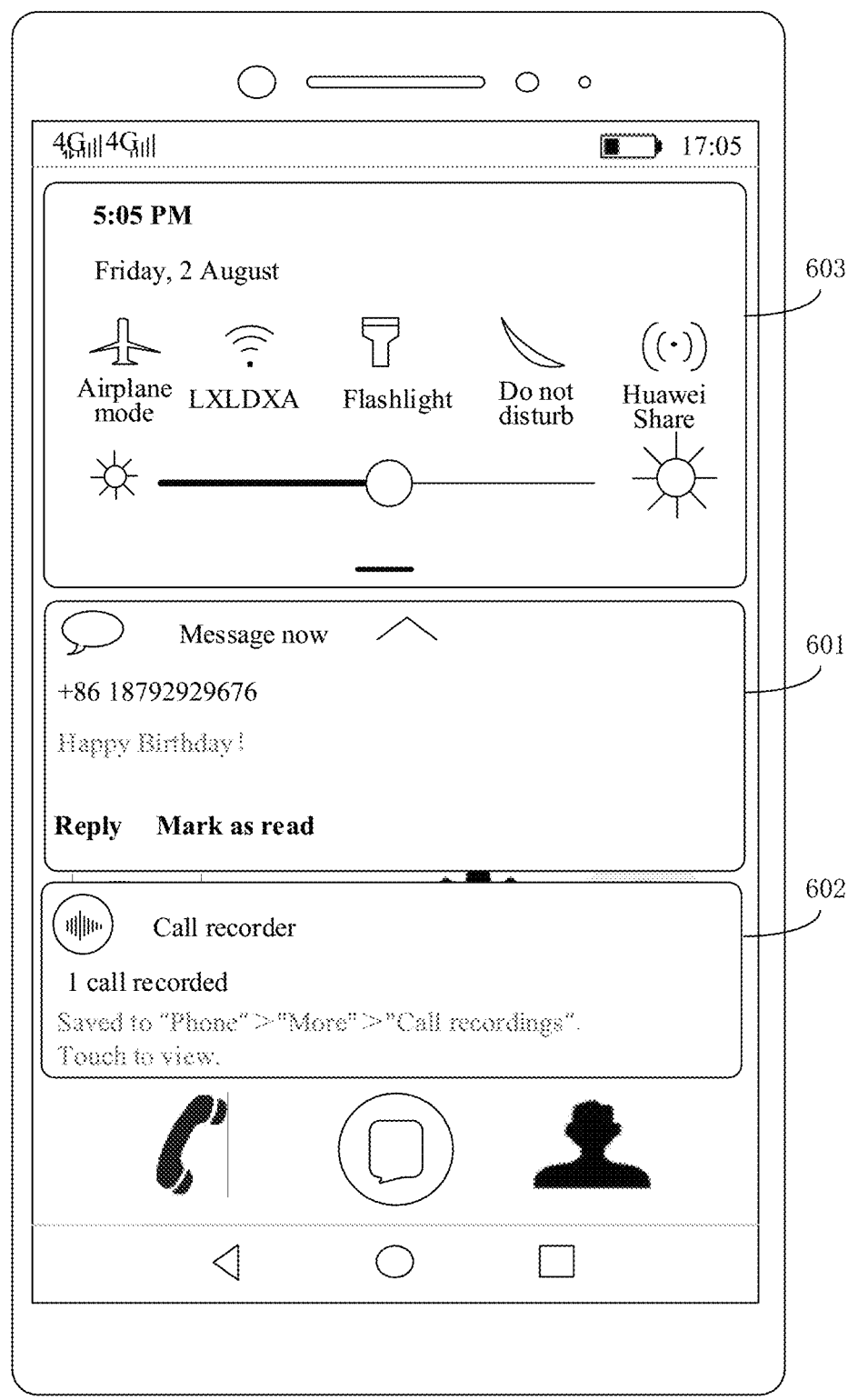
Figure 6C:
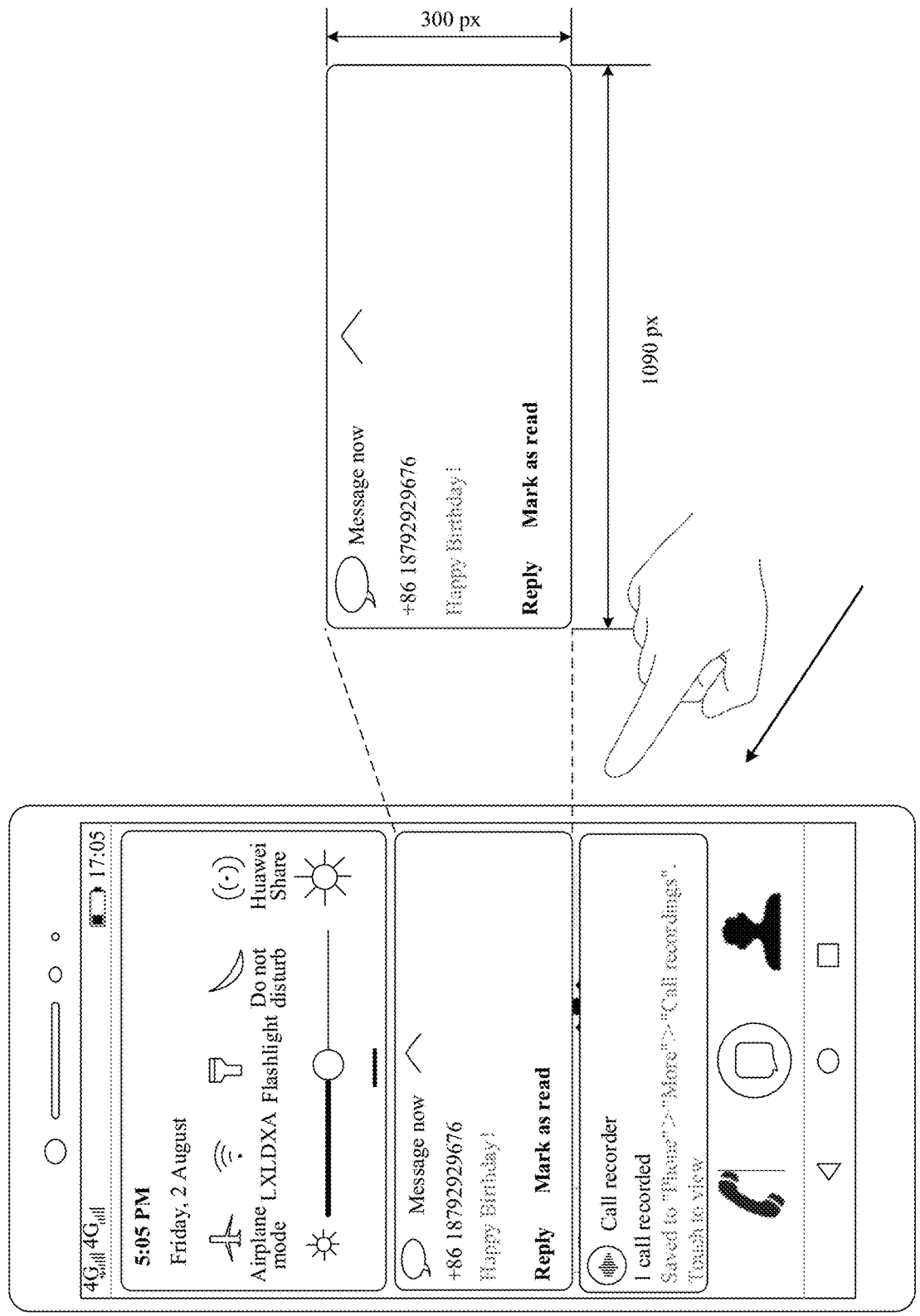
Figure 6D:
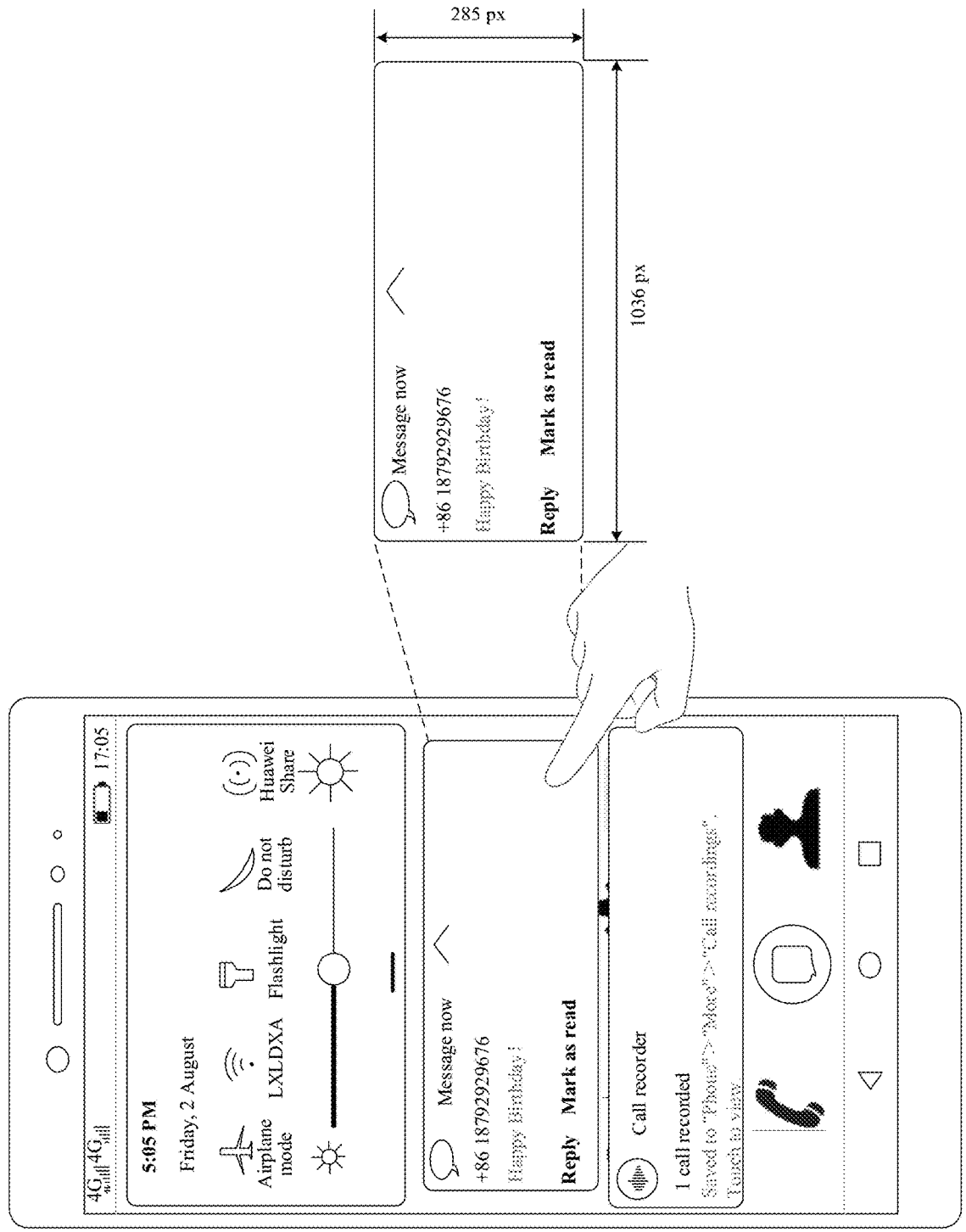
Figure 6E:
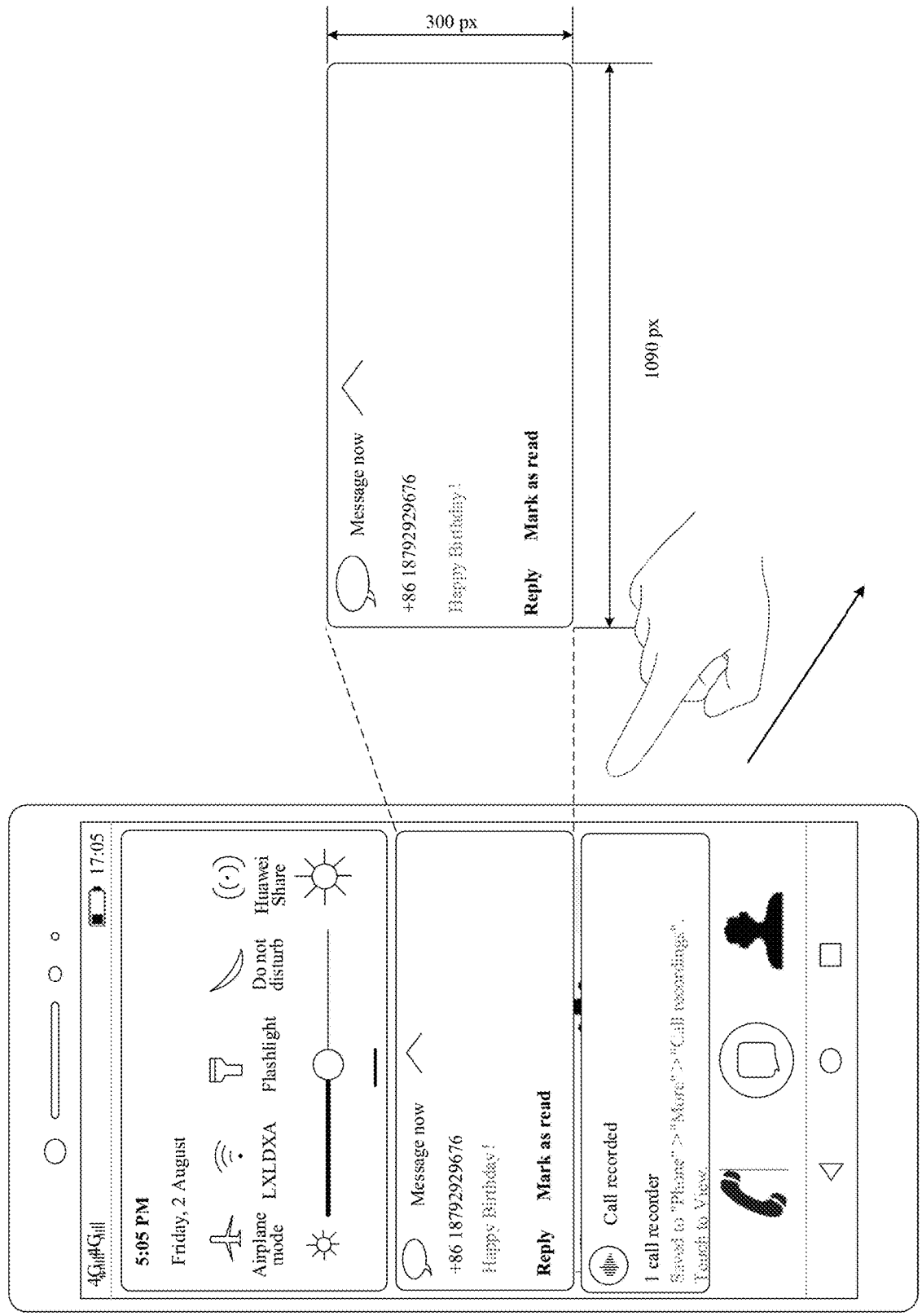
Figure 6F:
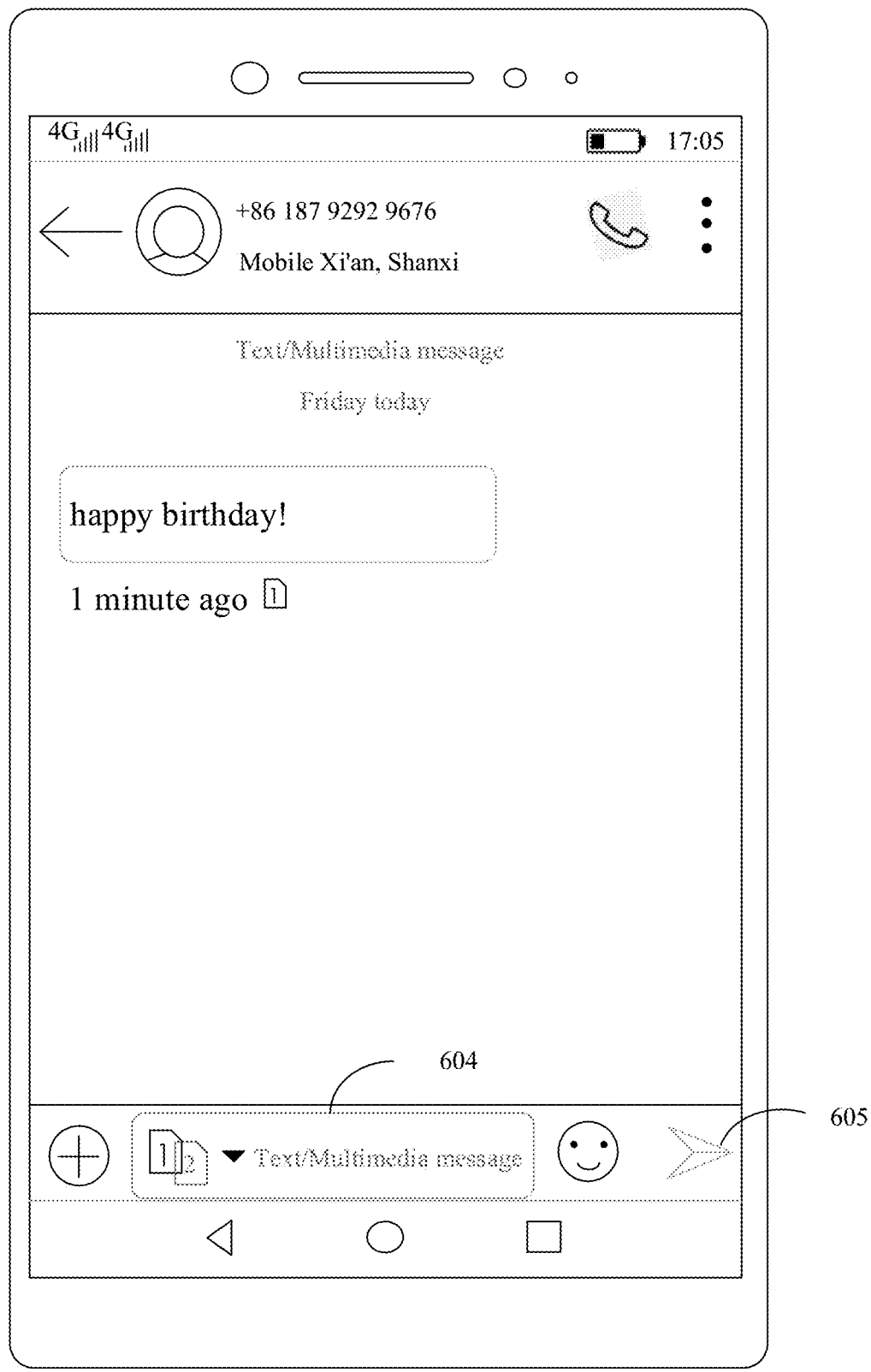
Figure 7A:
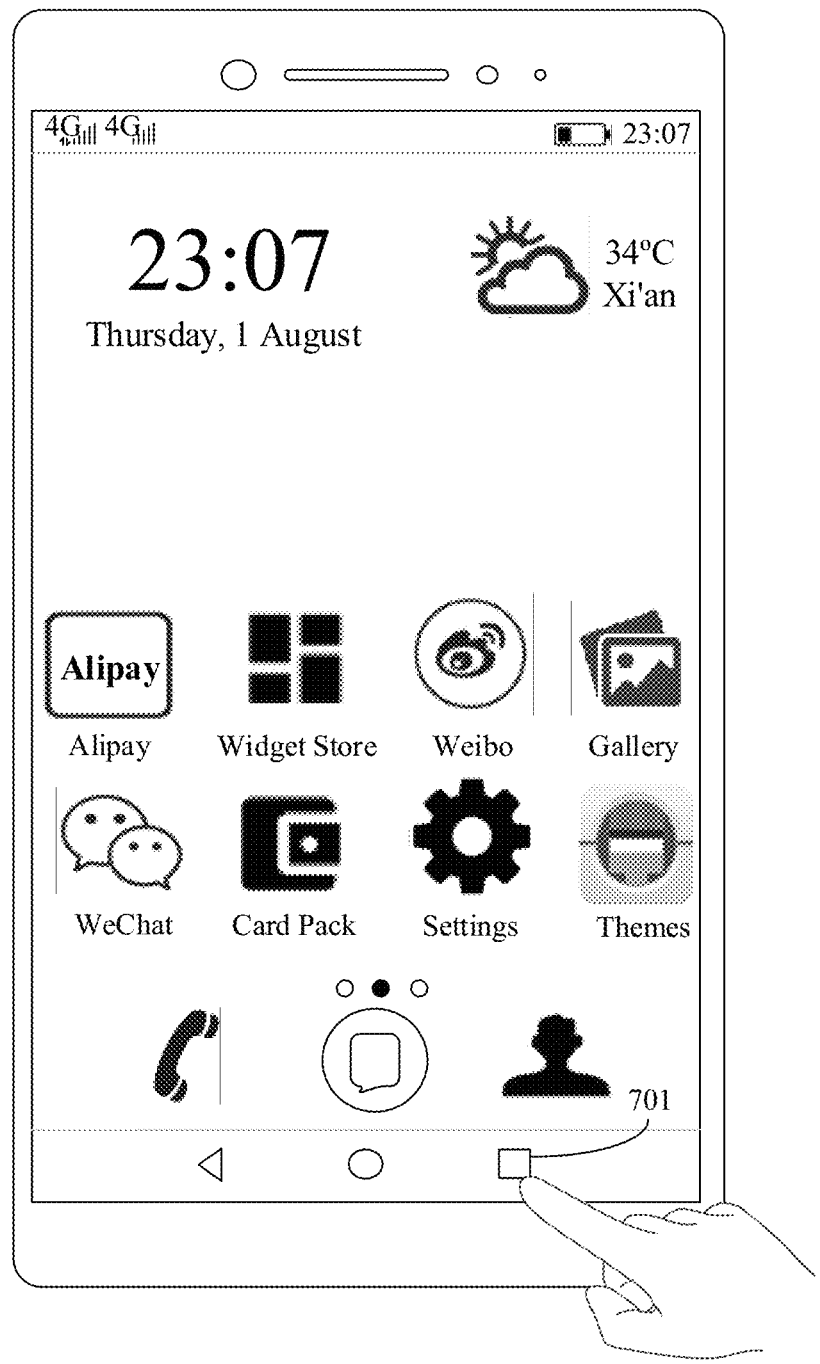
FIG. 7 is a schematic diagram of another group of GUI pages according to an embodiment of this application.
Figure 7B:
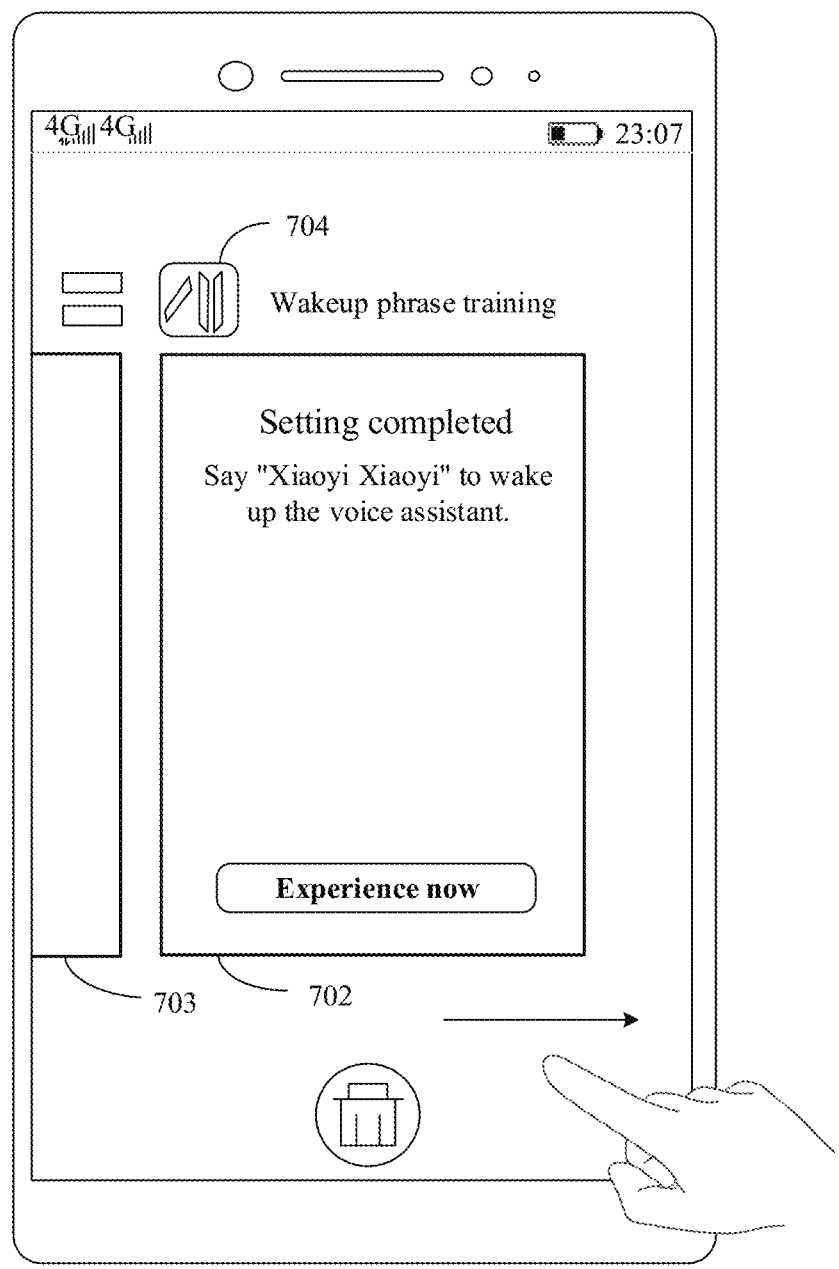
Figure 7C:
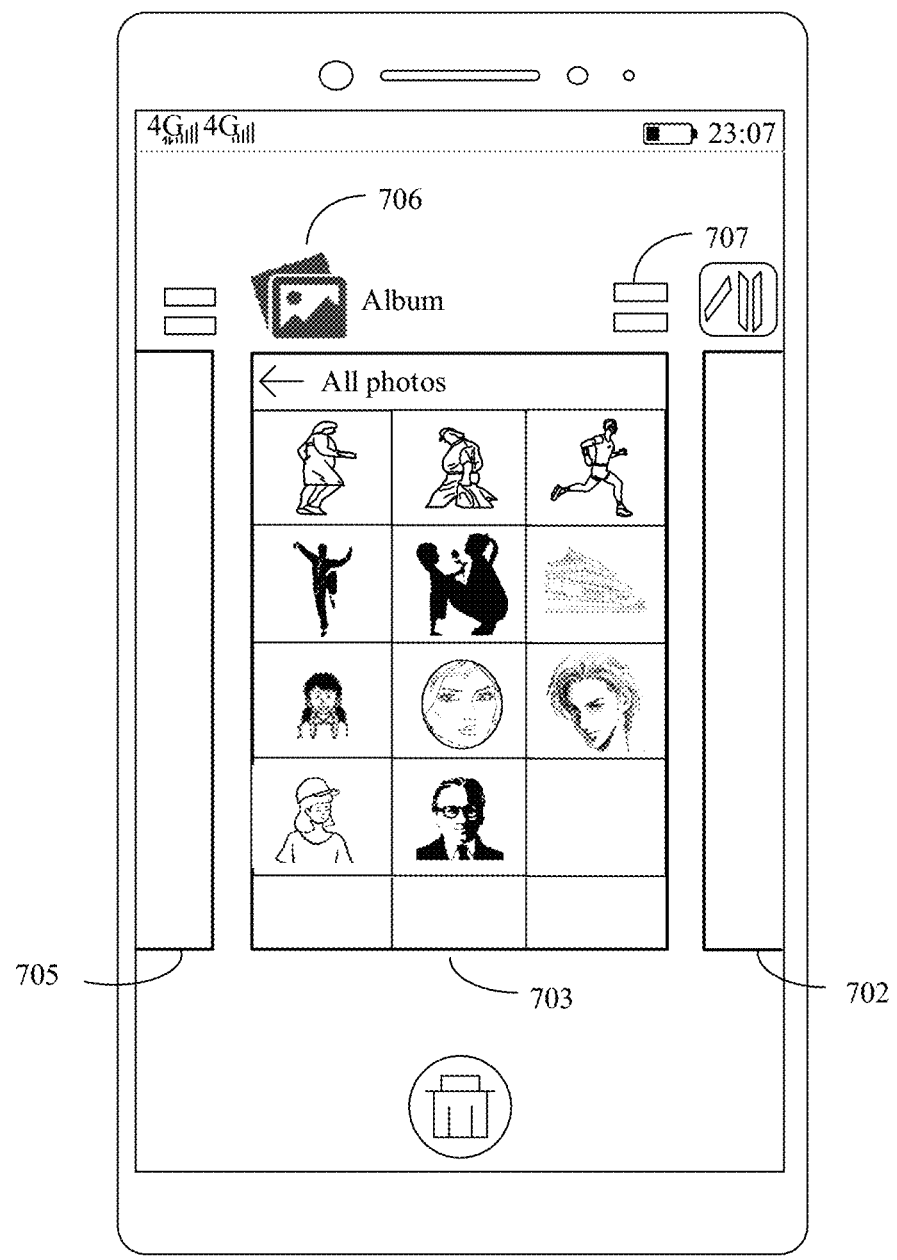
Figure 7D:
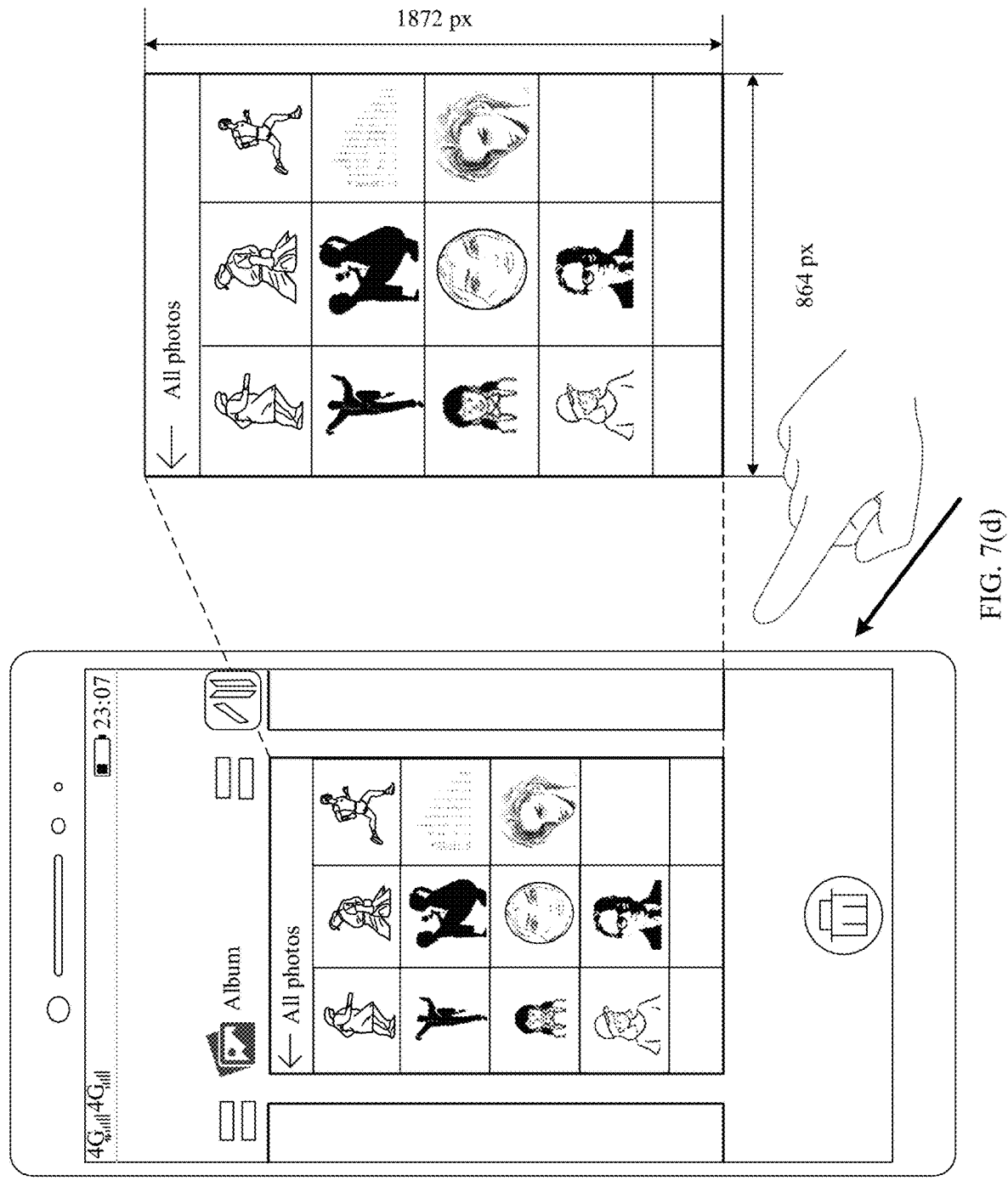
Figure 7E:
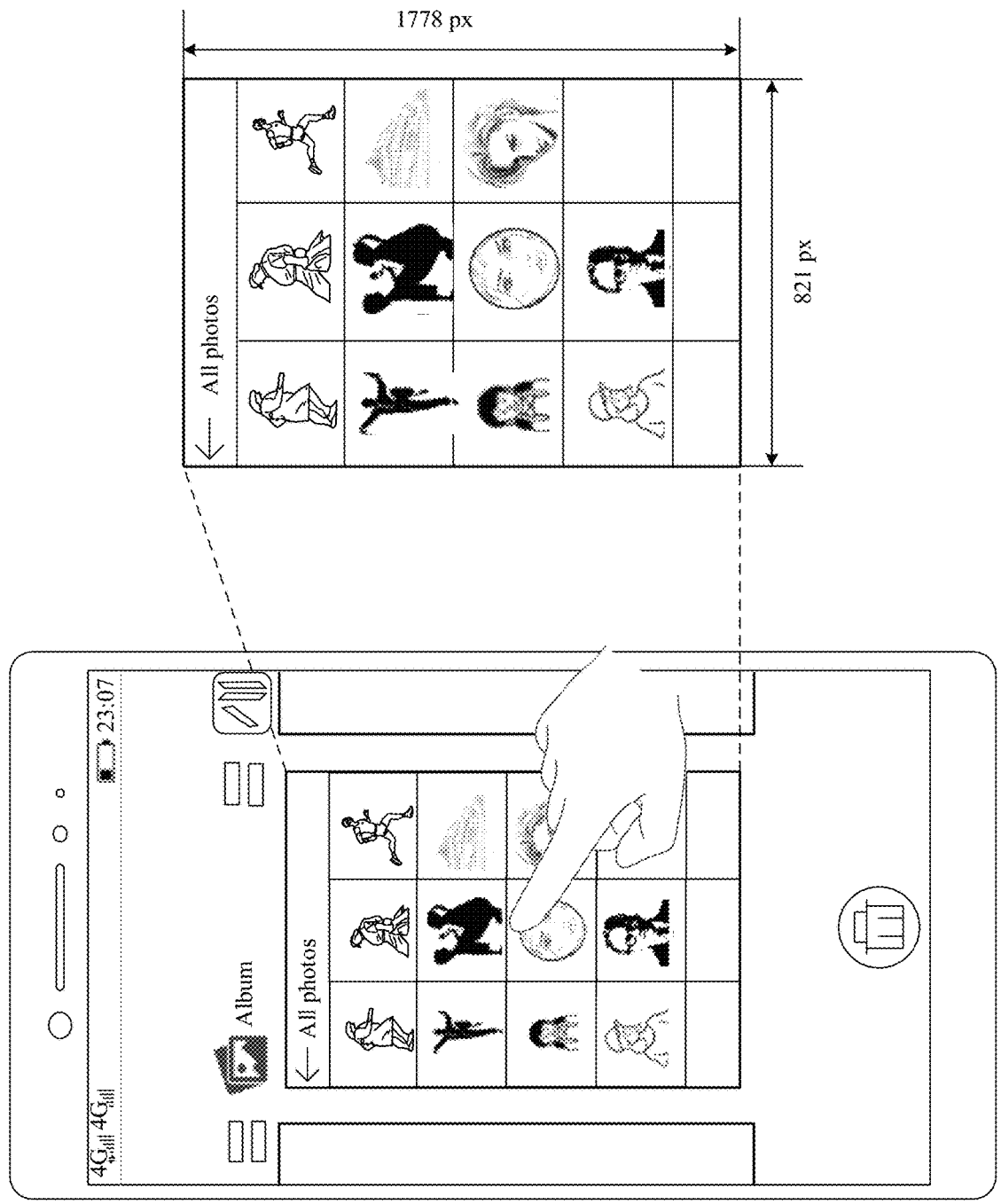
Figure 7F:
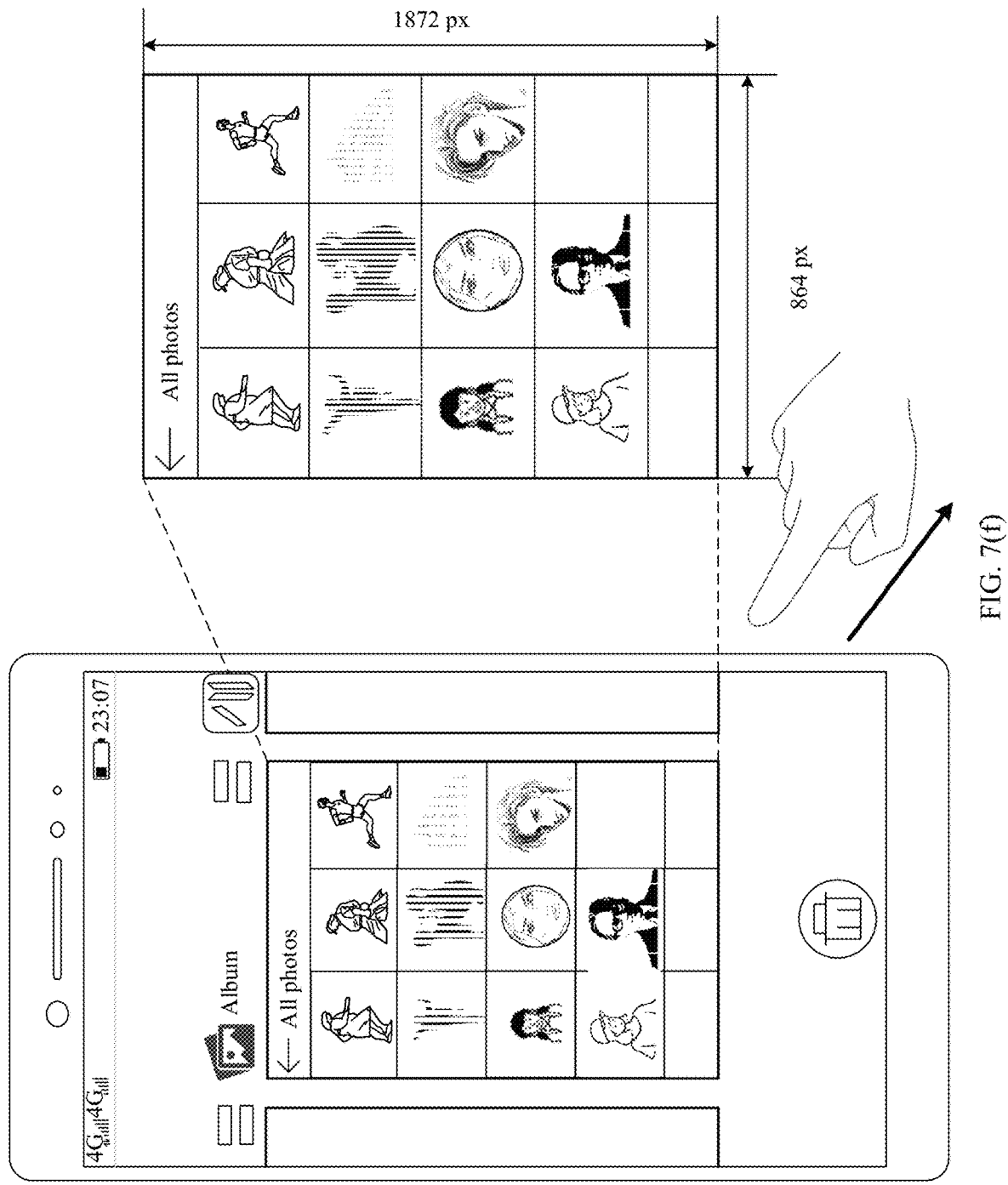
Figure 7G:
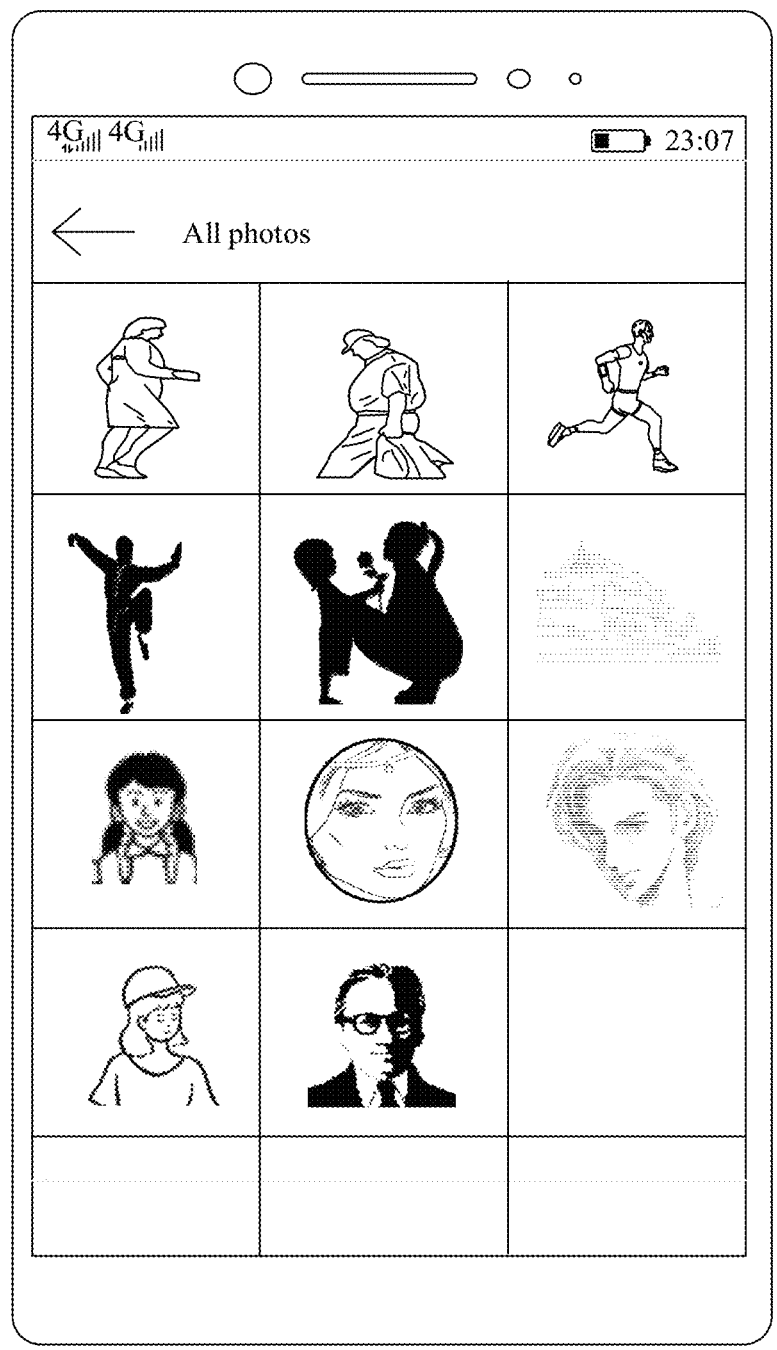
Figure 8A:
FIG. 8 is a schematic diagram of another group of GUI pages according to an embodiment of this application.
Figure 8B:
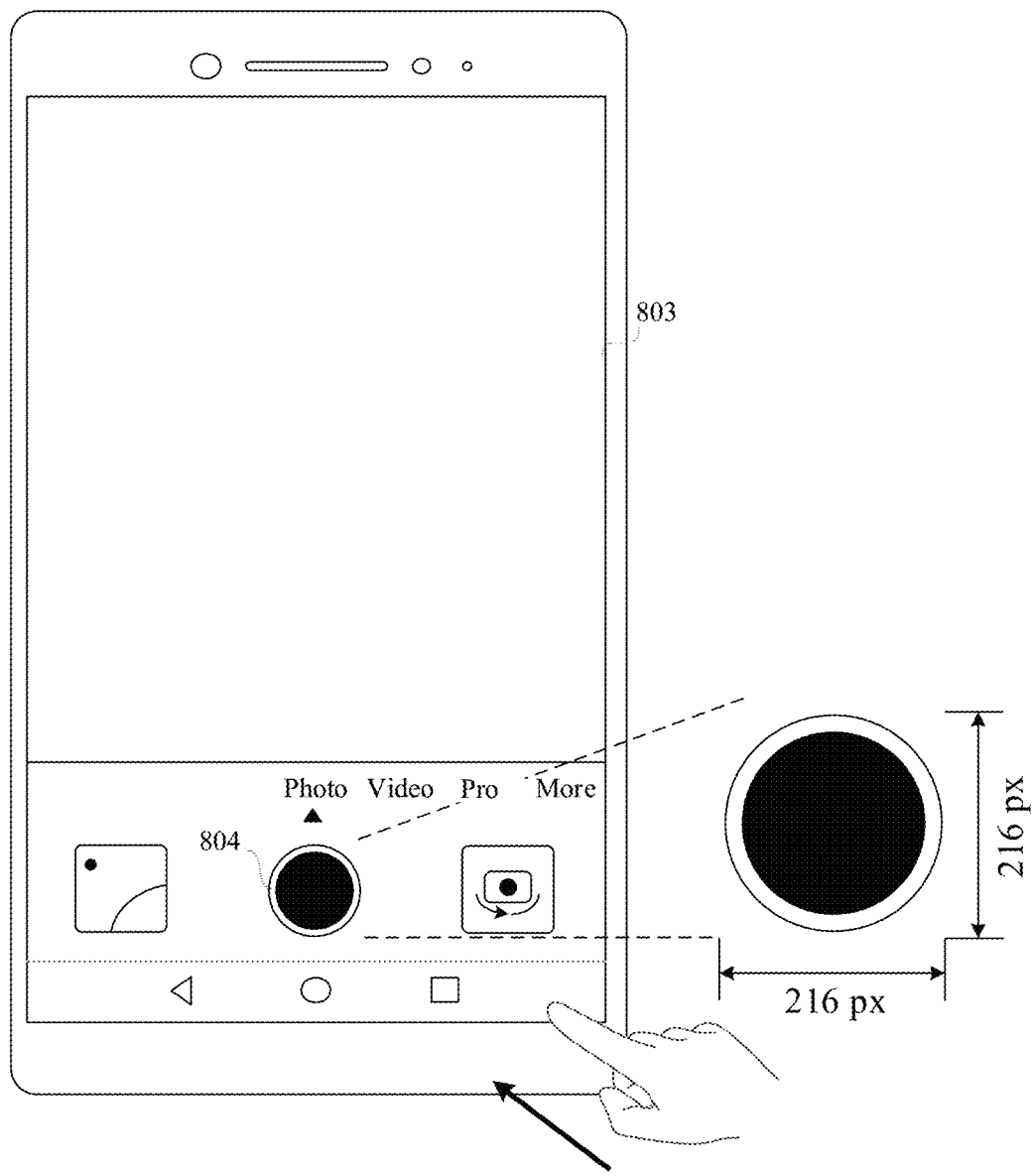
Figure 8C:
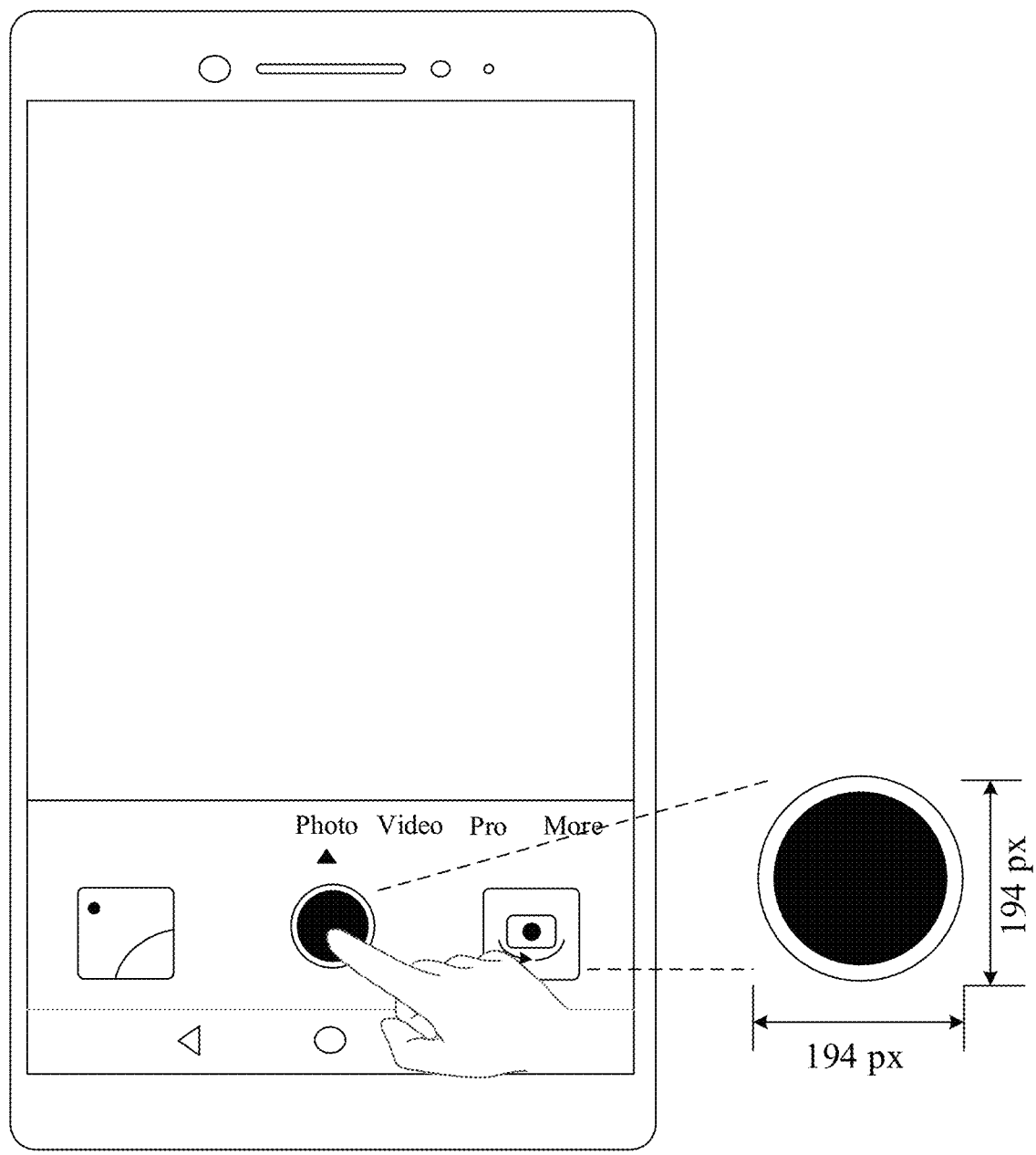
Figure 8D:
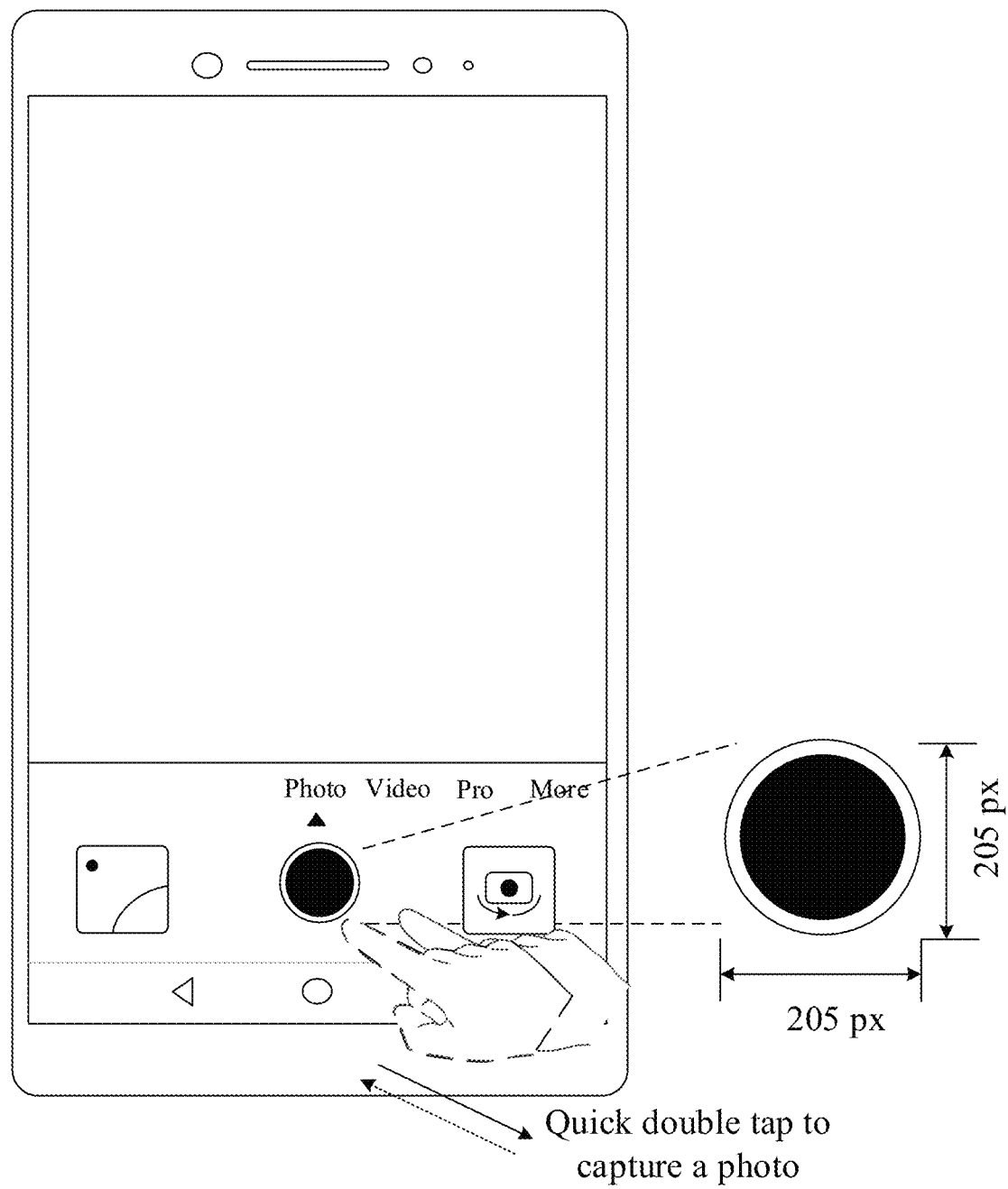
Figure 8E:
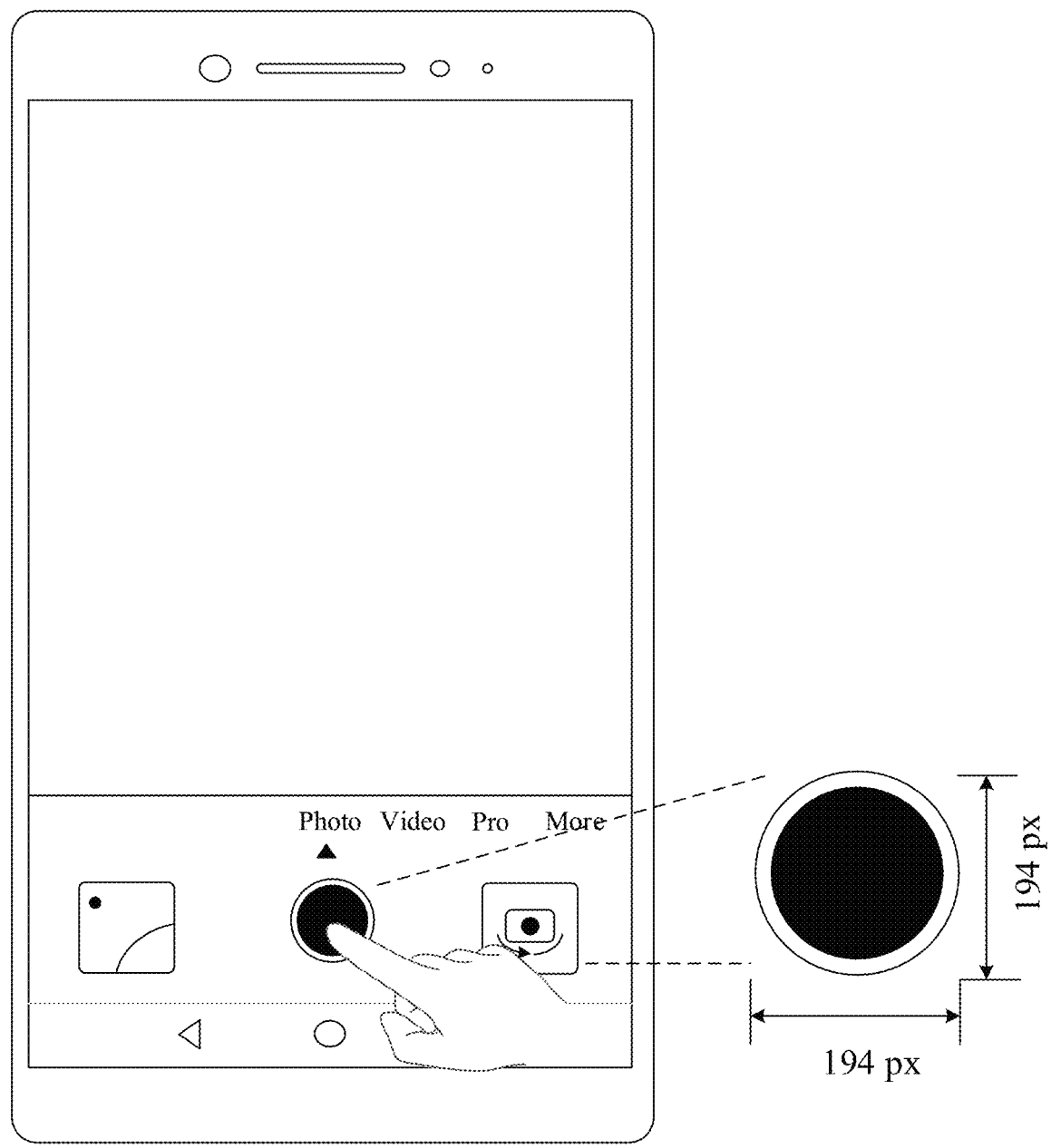
Figure 8F:
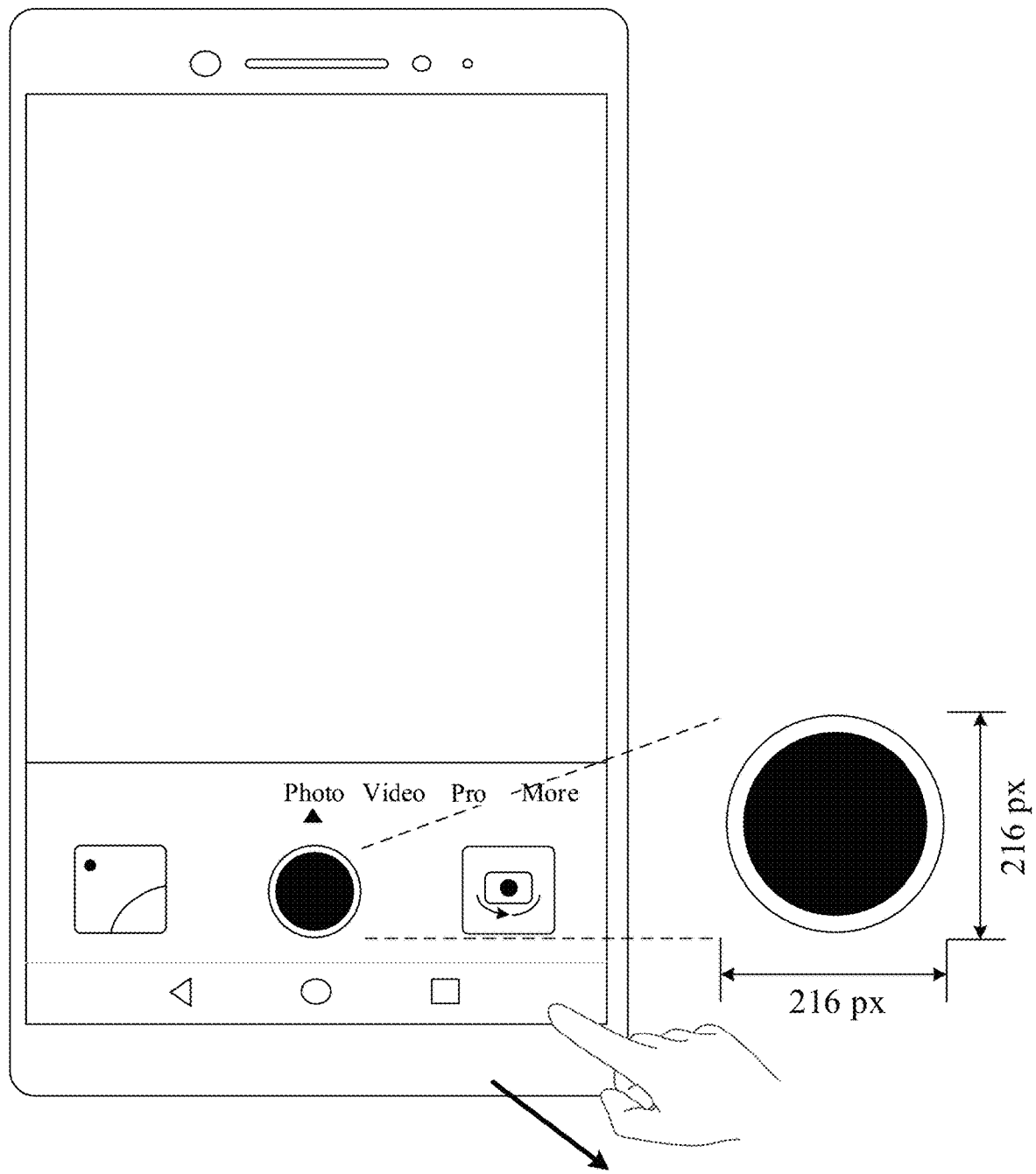

FIG. 2 is a structural block diagram of software of the electronic device 100 according to an embodiment of this application. A layered architecture divides the software into layers, and each layer has a clear role and responsibility. Inter-layer communication is implemented through a software interface. In some embodiments, an Android system is divided into four layers. From top to bottom, the four layers are: application layer, application framework layer, Android runtime (Android runtime) and system libraries, and kernel layer. The application layer may include a series of application packages.

As shown in FIG. 2, the application packages may include applications such as Camera, Gallery, Calendar, Phone, Map, Navigation, WLAN, Bluetooth, Music, Video, and Message.

The application framework layer provides application programming interfaces (application programming interface, API) and a programming framework for applications at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display screen, determine whether there is a status bar, lock a screen, capture a screen, and the like.

The content provider is configured to store and obtain data, and make the data accessible to applications. The data may include videos, pictures, audio, calls placed and received, browse history and favorites, a phone book, and the like.

The view system includes visual controls, for example, text display controls and picture display controls. The view system may be used for application construction. A display interface may include one or more views. For example, a display interface including a message notification icon may include a text display view and a picture display view.

The phone manager is configured to provide a communication function of the electronic device 100, for example, call status management (including call connection, call cutoff, and the like).

The resource manager provides, for applications, various resources such as localized character strings, icons, pictures, layout files, and video files.

The notification manager allows applications to display notification information in a status bar, and may be configured to convey notification-type messages. The displayed information may automatically disappear after a short stay, without user intervention. For example, the notification manager is configured to notify a user that downloading is completed, provide a message notification, and the like. The notification manager may alternatively provide notifications, such as a notification of an application running in the background, appearing in a form of charts or scroll bar texts in a top status bar of the system, or may provide notifications appearing in a form of dialogs on the screen. For example, notification may be implemented with text information displayed in the status bar, an alert tone played, the electronic device in vibration, or an indicator light blinking.

The system libraries may include function modules, for example, surface manager (surface manager), media libraries (media libraries), three-dimensional graphics processing library (for example, OpenGL ES), and 2D graphics engine (for example, SGL).

The surface manager is configured to manage a display subsystem, and provides blending of 2D and 3D layers for applications.

The media libraries support play and recording in common audio and video formats, still image files, and the like. The media libraries may support audio and video encoding formats, for example, MPEG-4, H.264, MP3, AAC, AMR, JPG, and PNG.

The three-dimensional graphics processing library is used to implement three-dimensional graphics drawing, image rendering, synthesis, layer processing, and the like.

The 2D graphics engine is a drawing engine for 2D drawing.

The kernel layer is a layer between hardware and software. The kernel layer includes at least a display driver, a camera driver, an audio driver, and a sensor driver.

For ease of understanding, the following embodiments of this application specifically describe an element pressing method provided in the embodiments of this application, with reference to accompanying drawings and by using, as an example, a mobile phone with the structure shown in FIG. 1 and FIG. 2.

FIG. 3 shows a group of graphical user interface (graphical user interface, GUI) pages of the mobile phone, where (a) to (d) in FIG. 3 show a process in which pixel values of an icon on a desktop change when a user taps the icon on the desktop.

Referring to a GUI page shown in (a) in FIG. 3, the GUI page is the desktop of the mobile phone. The desktop of the mobile phone includes three desktop pages, and each desktop page includes one or more application icons. Currently, the desktop of the mobile phone displays the second desktop page. This desktop page includes an Alipay icon, a Widget Store icon, a Weibo icon, a Gallery icon, a WeChat icon, a Card Pack icon, a Settings icon, and a Themes icon 301. For example, pixel (pixel, px) values of the Themes icon are 216 px in length and 216 px in width. As shown in (a) in FIG. 3, a finger of a user is to tap the Themes icon 301, and when the finger of the user approaches but is not yet in contact with (down) the Themes icon 301, the Themes icon 301 may maintain the initial pixel values in length and width.

It should be understood that, in (a) in FIG. 3, pixels of all icons on the desktop of the mobile phone may be the same.

It should be further understood that a case that the finger of the user approaches but has not yet tapped may also be considered as hover (hover) of the finger of the user.

Referring to a GUI page shown in (b) in FIG. 3, the GUI page is the desktop of the mobile phone. Currently, the desktop of the mobile phone displays the second desktop page. After the mobile phone detects, on the second desktop page, an operation of tapping the icon 301 by the finger of the user, the pixel values of the icon 301 on the second desktop page change. As shown in (c) in FIG. 3, for example, the length of the icon 301 is changed to 194 px, and the width of the icon 301 is changed to 194 px.

It should be understood that tapping the icon 301 by the finger of the user may include touching the icon 301 by the finger of the user, or a case that a distance between the finger of the user and the icon 301 is less than 0.5 mm may also be considered as touching the icon 301 by the finger of the user.

It should be further understood that, in this embodiment of this application, when the finger of the user touches a page element, a distance between the finger and the page element may also be determined by touch sensitivity of the mobile phone.

In an embodiment, a process in which the pixel values of the icon 301 are reduced from 216 px in length and 216 px in width to 194 px in length and 194 px in width may be a gradual process, and the pixel values of the icon 301 may be gradually reduced to 194 px in length and 194 px in width at a specific rate.

In an embodiment, after the pixel values of the icon 301 are reduced from 216 px in length and 216 px in width to 194 px in length and 194 px in width, the pixel values of the icon 301 may remain 194 px in length and 194 px in width, and be no longer reduced.

In an embodiment, in a process in which the pixel values of the icon 301 are changed from 216 px in length and 216 px in width to 194 px in length and 194 px in width, the mobile phone detects that the finger of the user is always in contact with the icon 301.

It should be understood that duration of the process in which the icon is changed from 216 px in length and 216 px in width to 194 px in length and 194 px in width may be 100-150 ms.

It should be further understood that the finger of the user may already leave a screen before the pixel values of the icon 301 are reduced to 194 px in length and 194 px in width; in this case, the icon may continue to zoom out to 194 px in length and 194 px in width, and then be gradually restored to 216 px in length and 216 px in width. It should be further understood that, in this embodiment of this application, tapping the icon 301 by the finger of the user may also be understood as pressing the icon 301 by the finger of the user. For example, when the mobile phone detects that a pressure value of pressing by the user is greater than or equal to a preset pressure value, the icon 301 may be reduced in size at a specific rate.

It should be further understood that, in this embodiment of this application, tapping the icon 301 by the finger of the user may also be understood as touching or contacting the icon 301 by the finger of the user. The mobile phone may scale the icon 301 when detecting that the user contacts or touches the icon 301. In other words, the mobile phone does not need to detect a value of pressure with which the user contacts or touches the icon, but merely needs to detect that the user contacts or touches the icon.

It should be further understood that the GUI pages shown in FIG. 3 are described by using an example in which the pixel values of the icon are 216 px in length and 216 px in width; the pixel values of the icon on the desktop of the mobile phone may alternatively be other values. This is not limited in this embodiment of this application.

It should be further understood that the GUI pages shown in FIG. 3 are described by using an example in which the pixel values in length and width of the icon are respectively reduced to 90% of the initial pixel value in length and 90% of the initial pixel value in width when the mobile phone detects that the finger of the user taps the icon; the pixel values may be alternatively reduced based on another proportion. This is not limited in this embodiment of this application.

Referring to a GUI page shown in (c) in FIG. 3, the GUI page is another GUI page of the desktop of the mobile phone. After the mobile phone detects that the finger of the user leaves the desktop, the pixel values of the icon 301 are restored to the initial pixel values in length and width, that is, the pixel values of the icon 301 are restored from 194 px in length and 194 px in width to the initial 194 px in length and 194 px in width.

In an embodiment, a process in which the pixel values of the icon 301 are restored from 194 px in length and 194 px in width to 216 px in length and 216 px in width may be a gradual process, and the icon 301 may be gradually restored to 216 px in length and 216 px in width at a specific rate.

In an embodiment, a rate at which the icon zooms out from the initial pixel values to 90% of the initial pixel values may be the same as a rate at which the icon is restored from 90% of the initial pixel values to the initial pixel values.

In an embodiment, when the mobile phone detects that the finger of the user leaves a touchscreen, the pixel values of the icon 301 start to be restored from 90% of the initial pixel values to the initial pixel values.

It should be understood that, in this embodiment of this application, that the finger of the user leaves the desktop may also be considered as that the finger of the user is up (up).

Referring to a GUI page shown in (d) in FIG. 3, the GUI page is a display interface of a "Themes" application. The display interface includes controls such as fonts, wallpapers, ringtones, and mash-ups. The user may locally search for a corresponding topic, or may download a corresponding topic from a server.

It should be understood that changing from (c) in FIG. 3 to (d) in FIG. 3 may be smooth transition. For example, there may be no time interval from (c) in FIG. 3 to (d) in FIG. 3, and the mobile phone may display the display interface of the "Themes" application when the icon 301 is restored to the initial pixel values. In one embodiment, there may be a time interval from (c) in FIG. 3 to (d) in FIG. 3. For example, the time interval may be 80-120 ms.

In this embodiment of this application, (c) in FIG. 3 may be changed to (d) in FIG. 3 through smooth transition, and a better feedback effect is provided for the user, and a corresponding operation is also enabled. This helps to improve user experience when the user starts an application.

It should be understood that the icon 301 in FIG. 3 may be a small-area page element on the mobile phone, and small-area page elements on the mobile phone may further include a picture thumbnail and the like. In an embodiment, when the mobile phone detects that the user taps another small-area page element, the another small-area page element may be reduced in size based on the same scaling proportion as the icon, or may be scaled based on a different scaling proportion. This is not limited in this embodiment of this application.

In an embodiment, the small-area page element may be a page element whose pixel value in length is less than or equal to a first pixel value, or the small-area page element may be a page element whose pixel value in width is less than or equal to a second pixel value, or the small-area page element may be a page element whose pixel value in length is less than or equal to a first pixel value and whose pixel value in width is less than or equal to a second pixel value.

It should be understood that the first pixel value may be the same as the second pixel value or may be different from the second pixel value.

For example, the first pixel value is 300 px, and the second pixel value is 300 px.

In another embodiment, the small-area page element may be a page element whose length is less than or equal to a first distance, or the small-area page element may be a page element whose width is less than or equal to a second distance, or the small-area page element may be a page element whose length is less than or equal to a first distance and whose width is less than or equal to a second distance.

It should be understood that the first distance may be the same as the second distance or may be different from the second distance.

In another embodiment, the small-area page element may alternatively be a page element whose area is less than or equal to a first area.

In another embodiment, the small-area page element may be a page element whose length is less than or equal to a first percentage (for example, 10%) of a length of the screen, or the small-area page element may be a page element whose width is less than or equal to a second percentage (for example, 10%) of a width of the screen, or the small-area page element may be a page element whose length is less than or equal to a first percentage of a length of the screen and whose width is less than or equal to a second percentage of a width of the screen.

In this embodiment of this application, after the mobile phone detects an operation of tapping the icon by the user, the mobile phone may control the icon to be reduced in size based on a specific proportion. Changing a shape of the page element upon detecting the user operation enhances feedback from the mobile phone for the user operation, to enhance a prompt effect of the mobile phone for the user operation.

FIG. 4 shows another group of GUI pages of the mobile phone, where (a) to (h) in FIG. 4 show a process in which pixel values of a missed-call notification widget change when a user taps the notification widget.

Referring to a GUI page shown in (a) in FIG. 4, the GUI page is an incoming-call display interface of the mobile phone. The incoming-call display interface includes controls. The plurality of controls include a control 401. After the mobile phone detects an operation of tapping the control 401 by the user, a GUI page shown in (b) in FIG. 4 is displayed.

It should be understood that the incoming-call display interface further includes a control 402, a control 403, and a control 404.

For example, when the mobile phone detects an operation of tapping the control 402 by the user, the mobile phone may automatically cut off the incoming call and reply with a message. In this case, the mobile phone may provide, for the user, suggestions of message content, for example, "I will call you back later", "Sorry, I'm unavailable now", "I'm in a meeting right now. I will contact you later", and "Just a moment. I will be right there".

For example, after the mobile phone detects an operation of tapping the control 403 by the user, the mobile phone may cut off the incoming call.

For example, after the mobile phone detects an operation of tapping the control 404 by the user, the mobile phone may connect the incoming call, and the called user can speak with a calling user.

It should be understood that the controls 401 to 404 may also be small-area page elements of the mobile phone, and when the mobile phone detects that the user taps the control 401, pixel values of the control 401 may also be reduced in size based on a specific proportion.

Referring to the GUI page shown in (b) in FIG. 4, the GUI page is another incoming-call display interface of the mobile phone. The incoming-call display interface includes a callback reminder window 405, where the mobile phone may remind the user to call back a calling party in 30 minutes, in 1 hour, or in 2 hours. After the mobile phone detects an operation of tapping a control 406 by the user, the mobile phone may automatically cut off the incoming call and display a GUI page shown in (c) in FIG. 4.

Referring to the GUI page shown in (c) in FIG. 4, the GUI page is a desktop of the mobile phone. After the mobile phone automatically cut off the incoming call, the mobile phone may generate callback reminder information for the missed call, and the user may view the information on a negative one screen. When the mobile phone detects an operation of sliding rightwards by the user at any location on the screen, the mobile phone may display a GUI page shown in (d) in FIG. 4.

It should be understood that, in this embodiment of this application, the negative one screen is an interface displayed after the user detects, on the desktop of the mobile phone (such as the desktop of the mobile phone shown in (c) in FIG. 4), an operation of sliding rightwards by the user. The desktop of the mobile phone shown in (c) in FIG. 4 may be the second desktop page on the desktop of the mobile phone, and the negative one screen may be the first desktop page on the desktop of the mobile phone, as shown in (d) in FIG. 4. The negative one screen may provide, for the user, services such as searching, application advice, a quick service, a missed-call notification widget, and situational intelligence. The negative one screen may display some apps that are frequently used by the user.

For example, for a mobile phone with an Android operating system, a desktop of the mobile phone may also include desktop pages, where the first desktop page may be a home screen of the mobile phone.

If a current desktop page is the third desktop page, the home screen may be displayed after the mobile phone detects, at the bottom of a screen, an operation of sliding upwards by a user.

In one embodiment, if a screen of the mobile phone is currently displaying an application, a desktop page (for example, the second desktop page) including an icon of the application may be displayed after the mobile phone detects, at the bottom of the screen, an operation of sliding upwards by a user; the home screen may be displayed after the mobile phone once again detects, at the bottom of the screen, an operation of sliding upwards by the user.

When the screen of the mobile phone displays the home screen, a negative-one-screen interface may be displayed after the mobile phone detects an operation of sliding rightwards by the user.

For example, for a mobile phone with an iOS operating system, a desktop of the mobile phone may also include desktop pages, where the first desktop page may also be a home screen of the mobile phone.

If a current desktop page is the third desktop page, the home screen may be displayed when the mobile phone detects an operation of pressing a home key by a user.

In one embodiment, if a screen of the mobile phone is currently displaying an application, a desktop page (for example, the second desktop page) including an icon of the application may be displayed after the mobile phone detects an operation of pressing a home key by a user; the home screen may be displayed after the mobile phone once again detects an operation of pressing the home key by the user.

When the screen of the mobile phone displays the home screen, a negative-one-screen interface may be displayed after the mobile phone detects an operation of sliding rightwards by the user.

It should be understood that the home screen may be set before delivery, or may be set by the user based on a preference of the user. This is not limited in this embodiment of this application.

Referring to the GUI page shown in (d) in FIG. 4, the GUI page is a negative-one-screen interface of the mobile phone. The negative-one-screen interface may include a notification widget 407 of missed-call callback reminder.

Referring to a GUI page shown in (e) in FIG. 4, the GUI page is a display interface, of the negative one screen, displayed when a finger of the user approaches but has not yet tapped the notification widget 407. In this case, pixel values of the notification widget 407 are initial pixel values, and the initial pixel values are 1376 px in length and 640 px in width.

Referring to a GUI page shown in (f) in FIG. 4, the GUI page is a display interface, of the negative one screen, displayed when the finger of the user taps the notification widget 407. In this case, the pixel values of the notification widget 407 are reduced to 1307 px in length and 608 px in width.

In an embodiment, a process in which the pixel values of the notification widget 407 are reduced from 1376 px in length and 640 px in width to 1307 px in length and 608 px in width may be a gradual process, and the pixel values of the notification widget 407 may be gradually reduced to 1307 px in length and 608 px in width at a specific rate.

It should be understood that duration of the process in which the notification widget is changed from 1376 px in length and 640 px in width to 1307 px in length and 608 px in width may be 150-200 ms.

In an embodiment, after the pixel values of the notification widget 407 are reduced from 1376 px in length and 640 px in width to 1307 px in length and 608 px in width, the pixel values of the notification widget 407 may remain 1307 px in length and 608 px in width, and be no longer reduced.

It should be understood that, in this embodiment of this application, tapping the notification widget 407 by the finger of the user may also be understood as pressing the notification widget 407 by the finger of the user.

It should be further understood that the GUI pages shown in FIG. 4 are described by using an example in which the pixel values of the missed-call callback notification widget are 1376 px in length and 640 px in width; the pixel values of the notification widget of the mobile phone may alternatively be other values, and different types of notification widgets may have different pixel values. This is not limited in this embodiment of this application.

Referring to a GUI page shown in (g) in FIG. 4, the GUI page is a display interface displayed when the finger of the user leaves the negative one screen. In this case, the pixel values of the notification widget 407 are restored to 1376 px in length and 640 px in width.

In an embodiment, a process in which the pixel values of the notification widget 407 are restored from 1307 px in length and 608 px in width to 1376 px in length and 640 px in width may be a gradual process, and the notification widget 407 may be gradually restored to 1376 px in length and 640 px in width at a specific rate.

Referring to a GUI page shown in (h) in FIG. 4, the GUI page is a display interface displayed after the finger of the user taps the notification widget 407. The display interface includes a call prompt window 408. The call prompt window 408 includes controls for prompting the user to call back by using a card 1 (whose operator is China Mobile), to call back by using a card 2 (whose operator is China Unicom), and to edit before calling.

It should be understood that there may be no time interval from (g) in FIG. 4 to (h) in FIG. 4, and the mobile phone may display the window 408 when the notification widget 407 is restored to the initial pixel values.

For example, after the mobile phone detects that the user taps the control for calling back by using the card 1, the mobile phone may call a user whose mobile number is 18792929676 by using the card 1.

It should be understood that the GUI pages shown in FIG. 4 are described by using an example in which the pixel values in length and width of the notification widget are respectively reduced to 95% of the initial pixel value in length and 95% of the initial pixel value in width when the mobile phone detects that the finger of the user taps the notification widget; the pixel values may be alternatively reduced based on another proportion. This is not limited in this embodiment of this application.

It should be further understood that the notification widget 407 in FIG. 4 may be a medium-area page element on the mobile phone, and medium-area page elements on the mobile phone may further include a notification widget in a drop-down list and the like. In an embodiment, when the mobile phone detects that the user taps another medium-area page element, the another medium-area page element may be reduced in size based on the same scaling proportion as the icon, or may be reduced in size based on a different scaling proportion. This is not limited in this embodiment of this application.

In an embodiment, the medium-area page element may be a page element whose pixel value in length is greater than a first pixel value and less than or equal to a third pixel value, or the medium-area page element may be a page element whose pixel value in width is greater than a second pixel value and less than or equal to a fourth pixel value, or the medium-area page element may be a page element whose pixel value in length is greater than a first pixel value and less than or equal to a third pixel value and whose pixel value in width is greater than a second pixel value and less than or equal to a fourth pixel value. The first pixel value is less than the third pixel value, and the second pixel value is less than the fourth pixel value.

It should be understood that the third pixel value may be the same as the fourth pixel value or may be different from the fourth pixel value.

For example, the third pixel value is 1800 px, and the fourth pixel value is 800 px.

In another embodiment, the medium-area page element may be a page element whose length is greater than a first distance and less than a third distance, or the medium-area page element may be a page element whose width is greater than a second distance and less than a fourth distance, or the medium-area page element may be a page element whose length is greater than a first distance and less than or equal to a third distance and whose width is greater than a second distance and less than or equal to a fourth distance. The first distance is less than the third distance, and the second distance is less than the fourth distance.

It should be understood that the third distance may be the same as the fourth distance or may be different from the fourth distance.

In another embodiment, the medium-area page element may alternatively be a page element whose area is greater than a first area and less than or equal to a second area. The first area is less than the second area.

In another embodiment, the medium-area page element may be a page element whose length is greater than a first percentage of a length of the screen and less than or equal to a third percentage (for example, 50%) of the length of the screen, or the medium-area page element may be a page element whose width is greater than a second percentage of a width of the screen and less than or equal to a fourth percentage (for example, 20%) of the width of the screen, or the medium-area page element may be a page element whose length is greater than a first percentage of a length of the screen and less than or equal to a third percentage of the length of the screen and whose width is greater than a second percentage of a width of the screen and less than or equal to a fourth percentage of the width of the screen. The third percentage is greater than the first percentage, and the fourth percentage is greater than the second percentage.

In this embodiment of this application, after the mobile phone detects an operation of tapping the notification widget by the user, the mobile phone may control the notification widget to be reduced in size based on a specific proportion. Changing a shape of the page element upon detecting the user operation enhances feedback from the mobile phone for the user operation, to enhance a prompt effect of the mobile phone for the user operation.

FIG. 5 shows another group of GUI pages of the mobile phone, where (a) to (f) in FIG. 5 show a process in which pixel values of an alarm clock widget change when a user generates the alarm clock widget by using a voice assistant and taps the generated alarm clock widget.

Referring to a GUI page shown in (a) in FIG. 5, the GUI page is a display interface displayed during interaction between the mobile phone and the user. After the mobile phone detects a voice wakeup keyword "Xiaoyi Xiaoyi" of the user, the mobile phone may display a text display window 501 of the voice assistant on a desktop, and the mobile phone may use the window 501 to show "Hi, I'm listening" to the user. It should be understood that, when notifying the user by displaying text in the window 501, the mobile phone may also play an announcement "Hi, I'm listening" to the user.

Referring to a GUI page shown in (b) in FIG. 5, the GUI page is another display interface displayed during interaction between the mobile phone and the user. When the mobile phone detects a voice instruction "I want to set an alarm" of the user, the mobile phone may display, by using a text display window 502 of the voice assistant, text information corresponding to the voice instruction of the user.

Referring to a GUI page shown in (c) in FIG. 5, the GUI page is a display interface displayed when a finger of the user approaches but has not yet tapped the alarm clock widget 503. The display interface includes the alarm clock widget 503, and the mobile phone may further notify the user that "the alarm has been created" by using text and speech. Pixel values of the alarm clock widget 503 in the display interface may be initial pixel values, and the initial pixel values of the alarm clock widget 503 are 1090 px in length and 240 px in width.

It should be understood that the mobile phone may automatically generate the corresponding alarm clock widget 503 after displaying the text information in the window 502.

It should be further understood that, after the user gives the voice instruction "I want to set an alarm", because the voice instruction includes a user intention (to set an alarm) but does not include corresponding slot information (what time to set the alarm for), the mobile phone may directly determine, for the user, the slot information corresponding to the intention, that is, the mobile phone may directly determine 8:00 a.m. by default as the slot information corresponding to the user intention. Then, the mobile phone may display the alarm clock widget 503, and notify the user that "the alarm has been created" by using text and speech.

In an embodiment, the mobile phone may determine a corresponding user intention after receiving the voice instruction "I want to set an alarm" of the user. Yet, after the mobile phone finds that the voice instruction lacks corresponding slot information, the mobile phone may send, to the user, voice information used to obtain the slot information. For example, the mobile phone may play an announcement "What time do you expect to set the alarm for?" to the user by using the voice assistant. After the mobile phone once again receives voice information from the user, the mobile phone may determine the corresponding slot information. For example, after the user gives a voice instruction "set the alarm for 9:00 am.", the mobile phone may automatically generate the alarm for 9:00 a.m.

Referring to a GUI page shown in (d) in FIG. 5, the GUI page is a display interface displayed when the finger of the user taps the alarm clock widget 503. When the mobile phone detects that the finger of the user taps the alarm clock widget 503, the pixel values of the alarm clock widget are reduced to 1036 px in length and 228 px in width.

In an embodiment, a process in which the pixel values of the alarm clock widget 503 are reduced from 1090 px in length and 240 px in width to 1036 px in length and 228 px in width may be a gradual process, and the pixel values of the alarm clock widget 503 may be gradually reduced to 1036 px in length and 228 px in width at a specific rate.

It should be understood that duration of the process in which the alarm clock widget is changed from 1376 px in length and 640 px in width to 1307 px in length and 608 px in width may be 150-200 ms.

In an embodiment, after the pixel values of the alarm clock widget 503 are reduced from 1090 px in length and 240 px in width to 1036 px in length and 228 px in width, the pixel values of the alarm clock widget 503 may remain 1036 px in length and 228 px in width, and be no longer reduced.

It should be understood that, in this embodiment of this application, tapping the alarm clock widget 503 by the finger of the user may also be understood as pressing the alarm clock widget 503 by the finger of the user.

It should be further understood that the GUI pages shown in FIG. 5 are described by using an example in which the initial pixel values of the alarm clock widget are 1090 px in length and 240 px in width; the pixel values of the alarm clock widget of the mobile phone may alternatively be other values. This is not limited in this embodiment of this application.

Referring to a GUI page shown in (e) in FIG. 5, the GUI page is a display interface displayed when the finger of the user leaves a screen. When the mobile phone detects that the finger of the user leaves the screen, the pixel values of the alarm clock widget 503 are restored from 1036 px in length and 228 px in width to 1090 px in length and 240 px in width.

In an embodiment, a process in which the pixel values of the alarm clock widget 503 are restored from 1036 px in length and 228 px in width to 1090 px in length and 240 px in width may be a gradual process, and the alarm clock widget 503 may be gradually restored to 1090 px in length and 240 px in width at a specific rate.

Referring to a GUI page shown in (f) in FIG. 5, the GUI page is an alarm editing interface. The user may edit, in the alarm editing interface, the alarm that is set by using the voice assistant.

It should be understood that the GUI pages shown in FIG. 5 are described by using an example in which the pixel values in length and width of the alarm clock widget are respectively reduced to 95% of the initial pixel value in length and 95% of the initial pixel value in width when the mobile phone detects that the finger of the user taps the alarm clock widget; the pixel values may be alternatively reduced based on another proportion. This is not limited in this embodiment of this application.

It should be further understood that the alarm clock widget may also be a medium-area page element.

In this embodiment of this application, after the mobile phone detects an operation of tapping the alarm clock widget by the user, the mobile phone may control the alarm clock widget to be reduced in size based on a specific proportion. Changing a shape of the page element upon detecting the user operation enhances feedback from the mobile phone for the user operation, to improve a prompt effect of the mobile phone for the user operation.

FIG. 6 shows another group of GUI pages of the mobile phone, where (a) to (f) in FIG. 6 show a process in which pixel values of an unread-message notification widget change when a user taps the unread-message notification widget in a drop-down list.

Referring to a GUI page shown in (a) in FIG. 6, the GUI page is a desktop of the mobile phone. The user may view an unread message by using the drop-down list. When the mobile phone detects an operation of sliding downwards by the user at a location near the top of a screen, the mobile phone may display a GUI page shown in (b) in FIG. 6.

It should be understood that, in this embodiment of this application, the user may slide downwards at a location near the top of the screen, and the mobile phone can display an interface of the drop-down list. The drop-down list includes quick entries of functions, such as an airplane mode, a Wi-Fi function, a flashlight function, a do-not-disturb function, and a file sharing ("Huawei Share") function. The user may adjust an order of the functions in the drop-down list, or may increase or decrease content in the drop-down list. The drop-down list may further include some notification widgets used to notify the user of, for example, an unread message of the user and a location at which a recent call recording of the user is saved.

Referring to (b) in FIG. 6, the GUI page is the display interface of the drop-down list of the mobile phone. The interface of the drop-down list may include an unread-message notification widget 601, a call recorder notification widget 602, and a function menu display window 603. The unread-message notification widget 601 displays content of a message that is recently received but has not been read by the user. The call recorder notification widget 602 displays a location at which a recent call recording of the user is saved. The function menu display window 603 includes function options. The plurality of function options include an airplane mode selection function, a Wi-Fi on/off function, a flashlight on/off function, a do-not-disturb mode on/off function, and a Huawei share (Huawei Share) on/off function. The function menu display window 603 further includes a function used to adjust brightness of the screen.

Referring to a GUI page shown in (c) in FIG. 6, the GUI page is a display interface, of the drop-down list, displayed when a finger of the user approaches but has not yet tapped the unread-message notification widget 601. Pixel values of the unread-message notification widget 601 in the display interface may be initial pixel values, and the initial pixel values of the unread-message notification widget 601 are 1090 px in length and 300 px in width.

Referring to a GUI page shown in (d) in FIG. 6, the GUI page is a display interface, of the drop-down list, displayed when the finger of the user taps the unread-message notification widget 601. When the mobile phone detects that the finger of the user taps the unread-message notification widget 601, the pixel values of the unread-message notification widget are reduced to 1036 px in length and 285 px in width.

In an embodiment, a process in which the pixel values of the unread-message notification widget 601 are reduced from 1090 px in length and 300 px in width to 1036 px in length and 285 px in width may be a gradual process, and the pixel values of the unread-message notification widget 601 may be gradually reduced to 1036 px in length and 285 px in width at a specific rate.

It should be understood that duration of the process in which the unread-message notification widget is changed from 1090 px in length and 300 px in width to 1036 px in length and 285 px in width may be 150-200 ms.

In an embodiment, after the pixel values of the unread-message notification widget 601 are reduced from 1090 px in length and 300 px in width to 1036 px in length and 285 px in width, the pixel values of the unread-message notification widget 601 may remain 1036 px in length and 285 px in width, and be no longer reduced.

It should be understood that, in this embodiment of this application, tapping the unread-message notification widget 601 by the finger of the user may also be understood as pressing the unread-message notification widget 601 by the finger of the user.

Referring to a GUI page shown in (e) in FIG. 6, the GUI page is a display interface, of the drop-down list, displayed when the mobile phone detects that the finger of the user leaves the screen. When the mobile phone detects that the finger of the user leaves the screen, the pixel values of the unread-message notification widget 601 are restored from 1036 px in length and 285 px in width to 1090 px in length and 300 px in width.

In an embodiment, a process in which the pixel values of the unread-message notification widget 601 are restored from 1036 px in length and 285 px in width to 1090 px in length and 300 px in width may be a gradual process, and the unread-message notification widget 601 may be gradually restored to 1090 px in length and 300 px in width at a specific rate.

Referring to a GUI page shown in (f) in FIG. 6, the GUI page is a display interface of a "Message" application. The display interface includes a text input window 604. The user may enter, in the text input window 604, information that is to be sent as a reply, and taps a control 605 to send the reply information to a user whose mobile number is 18792929676.

It should be understood that the GUI pages shown in FIG. 6 are described by using an example in which the initial pixel values of the unread-message notification widget are 1090 px in length and 300 px in width; the pixel values of the unread-message notification widget of the mobile phone may alternatively be other values. This is not limited in this embodiment of this application.

It should be further understood that the unread-message notification widget may also be a medium-area page element.

The foregoing describes, with reference to FIG. 4 to FIG. 6, a change of the page element in a process in which the user taps the medium-area page element in this application. After the mobile phone detects an operation of tapping the medium-area page element by the user, the mobile phone may control the medium-area page element to be reduced in size based on a specific proportion. Changing a shape of the medium-area page element upon detecting the user operation helps to enhance feedback from the mobile phone for the user operation, to improve a prompt effect of the mobile phone for the user operation.

FIG. 7 shows another group of GUI pages of the mobile phone, where (a) to (g) in FIG. 7 show a process in which pixel values of a task widget change when a user taps one of task widgets to enter a corresponding application.

Referring to a GUI page shown in (a) in FIG. 7, the GUI page is a desktop of the mobile phone. After the mobile phone detects an operation of tapping a control 701 by the user, a GUI page shown in (b) in FIG. 7 is displayed.

Referring to the GUI page shown in (b) in FIG. 7, the GUI page is a display interface of the plurality of task widgets of the mobile phone. The plurality of task widgets may include a thumbnail of one or more application processes. The user may select, by sliding leftwards or rightwards, an application that needs to be displayed. After the mobile phone detects, in the display interface of the plurality of task widgets, an operation of sliding rightwards by the user, a GUI page shown in (c) in FIG. 7 may be displayed.

It should be understood that, in this embodiment of this application, there may be entries for the display interface of the plurality of task widgets. After the mobile phone detects an operation of tapping the control 701 by the user, the mobile phone may display the display interface of the plurality of task widgets. In one embodiment, after detecting an operation of sliding upwards by the user at the bottom of a screen, the mobile phone may display the display interface of the plurality of task widgets.

It should be further understood that, as shown in (b) in FIG. 7, thumbnails of all applications in the plurality of task widgets may be arranged in order of time at which the user switches the corresponding applications to the background, and a thumbnail of the last application switched to the background by the user may be displayed in the first position. For example, referring to a task widget 702 shown in (b) in FIG. 7, an application corresponding to the task widget 702 is a wakeup keyword training application, and an icon 704 is an icon of the wakeup keyword training application. The display interface may further include a task widget 703, and the user may slide rightwards in the interface to display the corresponding task widget 703.

Referring to a GUI page shown in (c) in FIG. 7, the GUI page is another display interface of the plurality of task widgets of the mobile phone. The display interface includes the task widget 702, the task widget 703, and a task widget 704. An icon 706 is an icon of a Gallery application corresponding to the task widget 703. The display interface further includes a control 707. After the mobile phone detects an operation of tapping the control 707 by the user, the mobile phone may perform a screen split operation, for example, display the Gallery application on an upper half of the screen of the mobile phone, and display the desktop of the mobile phone on a lower half of the screen of the mobile phone.

Referring to a GUI page shown in (d) in FIG. 7, the GUI page is a display interface displayed when a finger of the user is about to tap but is not yet in contact with the task widget 703. Pixel values of the task widget 703 in the display interface may be initial pixel values, and the initial pixel values of the task widget 703 are 1872 px in length and 864 px in width.

Referring to a GUI page shown in (e) in FIG. 7, the GUI page is a display interface displayed when the finger of the user taps the task widget 703. When the mobile phone detects that the finger of the user taps the task widget 703, the pixel values of the task widget 703 are reduced to 1778 px in length and 821 px in width.

In an embodiment, a process in which the pixel values of the task widget 703 are reduced from 1872 px in length and 864 px in width to 1778 px in length and 821 px in width may be a gradual process, and the pixel values of the task widget 703 may be gradually reduced to 1778 px in length and 821 px in width at a specific rate.

It should be understood that duration of the process in which the task widget is changed from 1872 px in length and 864 px in width to 1778 px in length and 821 px in width may be 200-250 ms.

In an embodiment, after the pixel values of the task widget 703 are reduced from 1872 px in length and 864 px in width to 1778 px in length and 821 px in width, the pixel values of the task widget 703 may remain 1778 px in length and 864 px in width, and be no longer reduced.

It should be understood that, in this embodiment of this application, tapping the task widget 703 by the finger of the user may be understood as pressing the task widget 703 by the finger of the user.

Referring to a GUI page shown in (f) in FIG. 7, the GUI page is a display interface, of the plurality of task widgets, displayed when the mobile phone detects that the finger of the user leaves the screen. When the mobile phone detects that the finger of the user leaves the screen, the pixel values of the task widget 703 are restored from 1778 px in length and 821 px in width to 1872 px in length and 864 px in width.

In an embodiment, a process in which the pixel values of the task widget 703 are restored from 1778 px in length and 821 px in width to 1872 px in length and 864 px in width may be a gradual process, and the task widget 703 may be gradually restored to 1872 px in length and 864 px in width at a specific rate.

Referring to a GUI page shown in (g) in FIG. 7, the GUI page is a display interface of the Gallery application. After the mobile phone detects an operation of tapping the task widget 703 by the user, the mobile phone may display the interface of the Gallery application.

It should be understood that the interface of the Gallery application may be a display interface, of the Gallery application, displayed when the user previously exits the Gallery application.

It should be further understood that the task widget may be a large-area page element on the electronic device.

In an embodiment, the large-area page element may be a page element whose pixel value in length is greater than a third pixel value, or the large-area page element may be a page element whose pixel value in width is greater than a fourth pixel value, or the large-area page element may be a page element whose pixel value in length is greater than a third pixel value and whose pixel value in width is greater than a fourth pixel value.

In another embodiment, the large-area page element may be a page element whose length is greater than a third distance, or the large-area page element may be a page element whose width is greater than a fourth distance, or the large-area page element may be a page element whose length is greater than a third distance and whose width is greater than a fourth distance.

In another embodiment, the large-area page element may alternatively be a page element whose area is greater than a second area.

In another embodiment, the large-area page element may be a page element whose length is greater than a third percentage of a length of the screen, or the large-area page element may be a page element whose width is greater than a fourth percentage of a width of the screen, or the large-area page element may be a page element whose length is greater than a third percentage of a length of the screen and whose width is greater than a fourth percentage of a width of the screen.

In this embodiment of this application, after the mobile phone detects an operation of tapping the task widget by the user, the mobile phone may control the task widget to be reduced in size based on a specific proportion. Changing a shape of the page element upon detecting the user operation enhances feedback from the mobile phone for the user operation, to improve a prompt effect of the mobile phone for the user operation.

FIG. 8 shows another group of GUI pages according to an embodiment of this application, where (a) to (f) in FIG. 8 show a process in which pixel values of a camera control change when a user double taps to take a candid photo in a Gallery application.

Referring to a GUI page shown in (a) in FIG. 8, the GUI page is a desktop 801 of the mobile phone. After detecting an operation of tapping an icon 802 of the Gallery application on the desktop 801 by the user, the mobile phone may start the Gallery application, and display a GUI page shown in (b) in FIG. 8, where the GUI page may be referred to as a camera interface. The camera interface may include a viewfinder frame 803. In a preview state, a preview image may be displayed in real time in the viewfinder frame 803. After the mobile phone detects that the user taps a camera control 804, the mobile phone performs a photographing operation, and saves a shot photo. When a finger of the user is about to tap but is not yet in contact with the control 804, the control 804 may maintain initial pixel values, and the initial pixel values are 216 px in length and 216 px in width.

It should be understood that the camera interface may further include a Gallery icon 805. After detecting that the user taps the Gallery icon 805, the mobile phone may display a shot photo, video, or the like on a screen. The camera interface may further include a switching control 806 of a front-facing camera and a rear-facing camera. The user may switch between the front-facing camera and the rear-facing camera by tapping the control 806.

It should be further understood that the pixel values of the camera control 804 may be the same as pixel values of the icon on the desktop, or may be different from pixel values of the icon on the desktop. This is not limited in this embodiment of this application.

Referring to a GUI page shown in (c) in FIG. 8, the GUI page is a camera interface displayed when the mobile phone detects that the user taps the control 804. In this case, the pixel values of the camera control 804 are reduced to 194 px in length and 194 px in width.

In an embodiment, a process in which the pixel values of the camera control 804 are reduced from 216 px in length and 216 px in width to 194 px in length and 194 px in width may be a gradual process, and the pixel values of the task widget 703 may be gradually reduced to 194 px in length and 194 px in width at a specific rate.

In an embodiment, when the pixel values of the camera control 804 are reduced from 216 px in length and 216 px in width to 194 px in length and 194 px in width, the pixel values of the camera control 804 may remain 194 px in length and 194 px in width, and be no longer reduced.

Referring to a GUI page shown in (d) in FIG. 8, the GUI is a camera interface displayed when the mobile phone detects that the finger of the user leaves the control 804. When the mobile phone detects that the finger of the user leaves the camera control 804, the camera control 804 is gradually restored from 194 px in length and 194 px in width to the initial pixel values. When the pixel values of the camera control are restored to 205 px in length and 205 px in width (that is, the pixel values are not yet restored to the initial pixel values), the mobile phone once again detects an operation of tapping the control 804 by the user. It should be understood that this process may be a process in which the user takes a candid photo by using the finger.

Referring to a GUI page shown in (e) in FIG. 8, the GUI page is a camera interface displayed when the mobile phone detects, for the second time in a short period of time, that the user taps the control 804. In this case, the camera control 804 once again zoom out to 194 px in length and 194 px in width from the pixel values (205 px in length and 205 px in width) that are obtained when it is detected that the finger of the user taps the camera control for the second time.

Referring to a GUI page shown in (f) in FIG. 8, the GUI page is a camera interface displayed when the mobile phone detects that the finger of the user leaves the control. The pixel values of the camera control 804 may be gradually restored from 194 px in length and 194 px in width to the initial pixel values. It should be understood that, in a process in which the pixel values of the camera control 804 are gradually restored from 194 px in length and 194 px in width to the initial pixel values, the mobile phone detects no operation of tapping the control 804 by the finger of the user.

In this embodiment of this application, after the mobile phone detects an operation of tapping the control by the user, the mobile phone may control the control to be reduced in size based on a specific proportion. Changing a shape of the page element upon detecting the user operation enhances feedback from the mobile phone for the user operation, to improve a prompt effect of the mobile phone for the user operation. In addition, when the mobile phone detects that the finger of the user leaves the control, the pixel values of the control may be gradually restored. In a restoration process, when the mobile phone once again detects an operation of tapping the control by the user, the mobile phone may control the control to be reduced in size again. Such a process may be referred to as an interruptible mechanism. Through the interruptible mechanism, consistency between mind and eye of the user can be achieved, and an expectation of the user for the operation is met.

The foregoing describes several groups of GUI pages in the embodiments of this application with reference to FIG. 3 to FIG. 8. In descriptions of the several groups of GUI pages, when the user taps a corresponding page element, the page element may change correspondingly, to enhance feedback from the electronic device to the user, to improve a prompt effect of the electronic device for a user operation.

When tapping the icon shown in (b) in FIG. 3 and the camera control shown in (c) in FIG. 8, the user may feel that the icon bounces more lightly. When tapping the missed-call notification widget shown in (f) in FIG. 4, the alarm clock widget shown in (d) in FIG. 5, and the unread-message notification widget shown in (d) in FIG. 6, the user may feel that the notification widget or the alarm clock widget bounces more heavily. When tapping the task widget shown in (e) in FIG. 7, the user may feel that the task widget bounces more heavily than the notification widget or the alarm clock widget.

The following describes a page element change process in the embodiments of this application.

Figure 9:
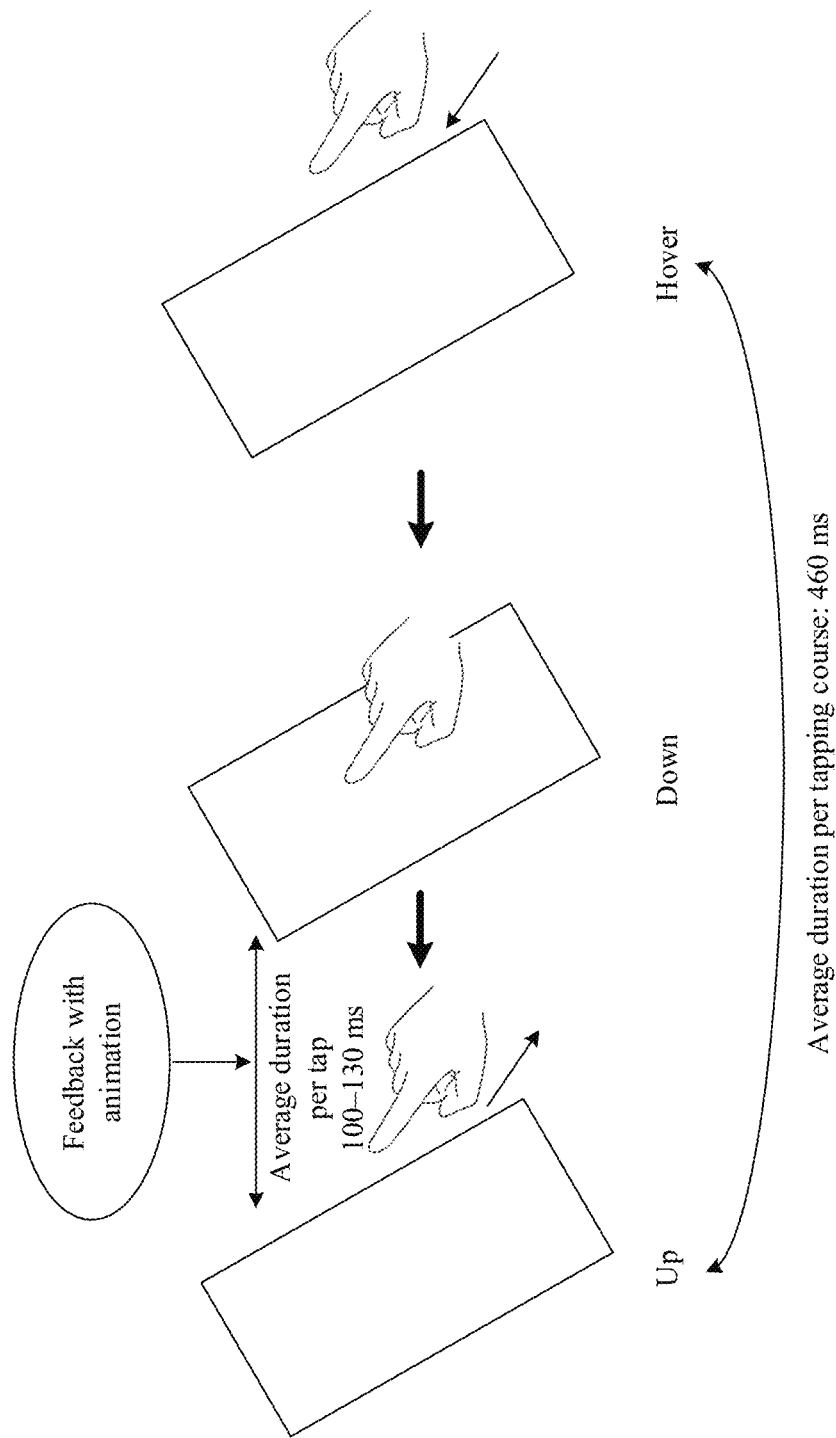
FIG. 9 is a schematic diagram of a process in which a user taps a page element.

FIG. 9 is a schematic diagram of a process in which a user taps a page element. The process in which the user taps the page element may be divided into three processes: finger hover (hover), finger down (down), and finger up (up). Average duration of the tapping process may be 460 ms, and a time interval from finger down to finger up may be approximately 100-130 ms. In this embodiment of this application, feedback with animation (animation) is mainly provided for the user in the 100-130 ms from finger down to finger up. In this embodiment of this application, an electronic device may perform, in the time interval from finger down to finger up, feedback in the form of animation for an operation of tapping the page element by the user. This helps to improve a prompt effect of the mobile phone for the user operation.

Figure 10:
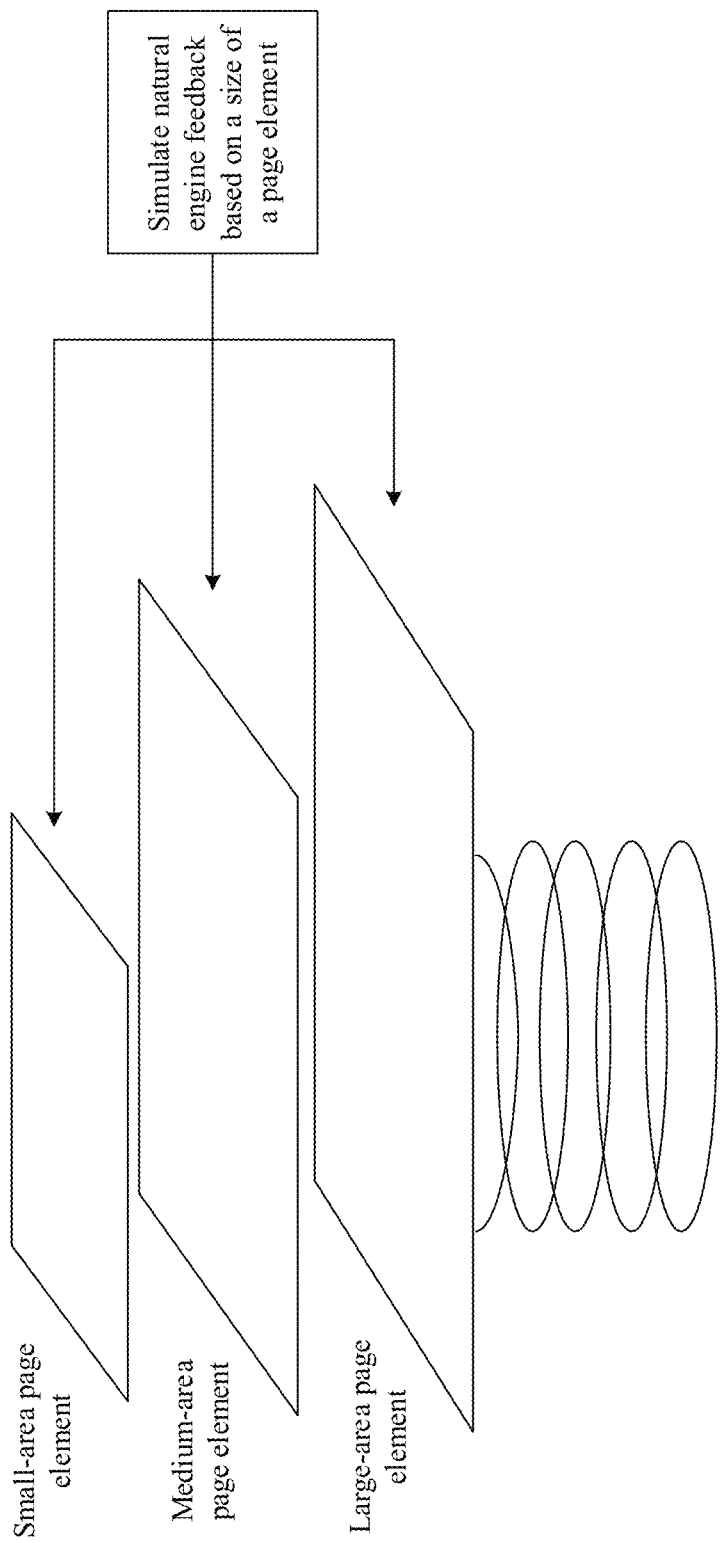
FIG. 10 is a schematic diagram of simulating spring mechanics when different page elements are pressed according to an embodiment of this application.

FIG. 10 is a schematic diagram of simulating spring mechanics when different page elements are pressed according to an embodiment of this application. In this embodiment of this application, an electronic device may mold different bounce effects based on areas of page elements of different sizes. Feedback effects of tapping page elements that have different areas are adjusted by increasing an initial velocity, a stiffness value, and a damping value of a tap spring, to bring different feelings to a user. A feeling of lightness is brought for pressing a small-area page element. A feeling of firmness is brought for pressing a medium-area page element. A feeling of heaviness is brought for pressing a large-area page element.

For example, Table 1 shows application scenarios corresponding to page elements with different areas in the electronic device.

TABLE 1

| Page element type | Application scenario |
| --- | --- |
| Small-area page element | Desktop icon, photo thumbnail, control, and the like |
| Medium-area page element | Alarm clock widget, notification widget, negative-one-screen widget, and the like |
| Large-area page element | Multi-task widget and the like |

For page elements with different areas, different spring mechanics parameters may be simulated.

For example, Table 2 shows spring mechanics parameters corresponding to page elements with different areas.

TABLE 2

| Page element type | Parameter | | | |
| --- | --- | --- | --- | --- |
| | Stiffness (stiffness) | Damping (damping) | Initial velocity | Recommended scaling proportion |
| Small-area page element | 410 | 38 | 1 | 90% |
| Medium-area page element | 350 | 35 | 0.5 | 95% |
| Large-area page element | 340 | 28 | 0 | 95% |

It should be understood that, for the parameters shown in Table 2, mass springs corresponding to the small-area page element, the medium-area page element, and the large-area page element may have a same mass.

A differential equation during motion of a damping system is a formula (1):

$$-kx - g\frac{dx}{dt} = m\frac{d^2x}{dt^2} \quad (1)$$

Herein, k represents an elastic coefficient, g represents a friction coefficient, m represents a mass of a mass spring, x represents a distance between the mass spring and an equilibrium position, $$\frac{dx}{dt}$$

represents a velocity of the mass spring, and $$\frac{d^2x}{dt^2}$$

represents an acceleration of the mass spring.

Figure 11:
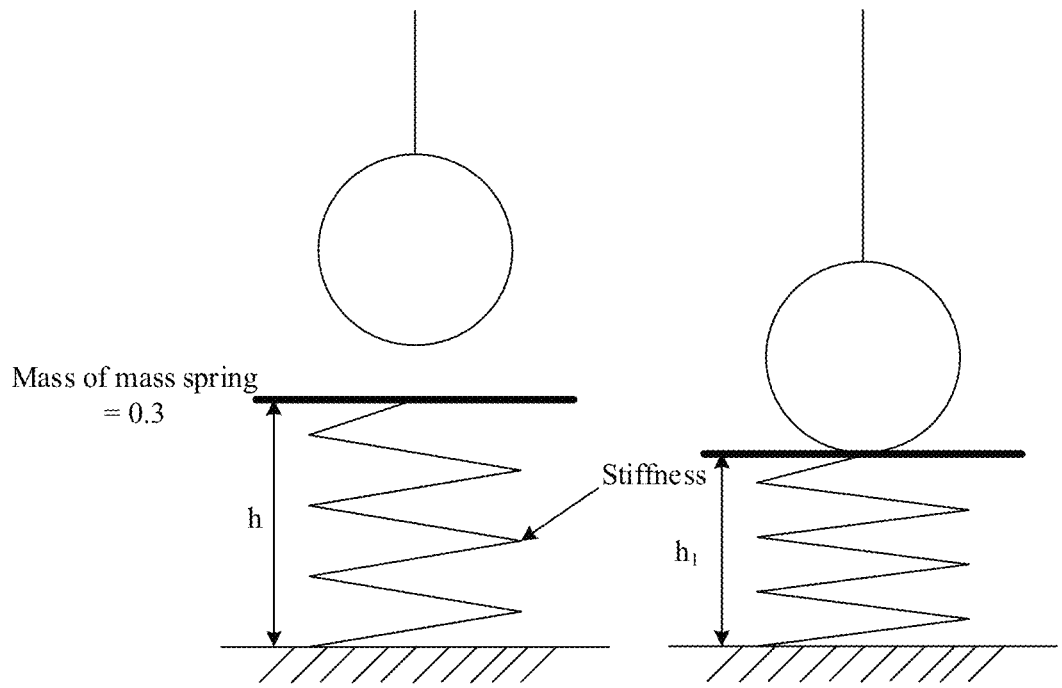
FIG. 11 is a schematic change diagram of a simulated spring when a small-area page element is pressed according to an embodiment of this application.

FIG. 11 is a schematic change diagram of a simulated spring when a small-area page element is pressed. A mass of a mass spring corresponding to the small-area page element, a mass of a mass spring corresponding to a medium-area page element, and a mass of a mass spring corresponding to a large-area page element may be different. The mass of the mass spring corresponding to the small-area page element may be 0.3 kg, where B represents a distance h between the mass spring and an equilibrium position, and C represents stiffness of the mass spring. When the spring is pressed by an external force, a value of B is changed to $h_1$.

Figure 12:
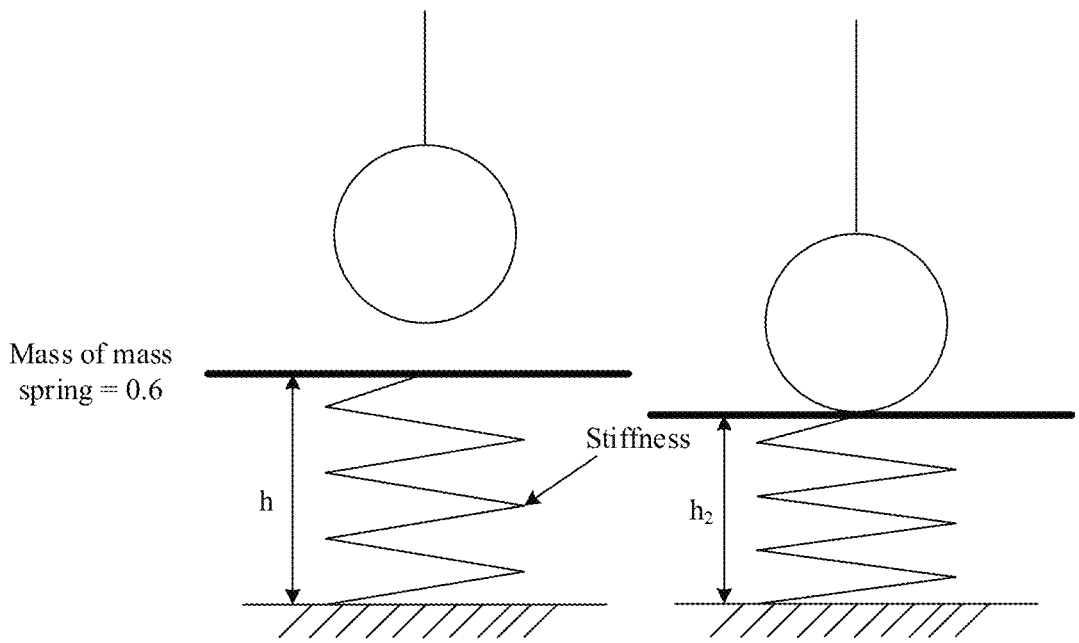
FIG. 12 is a schematic change diagram of a simulated spring when a medium-area page element is pressed according to an embodiment of this application.

FIG. 12 is a schematic change diagram of a simulated spring when a medium-area page element is pressed. When the spring is pressed by an external force, a value of B is changed to $h_2$.

Figure 13:
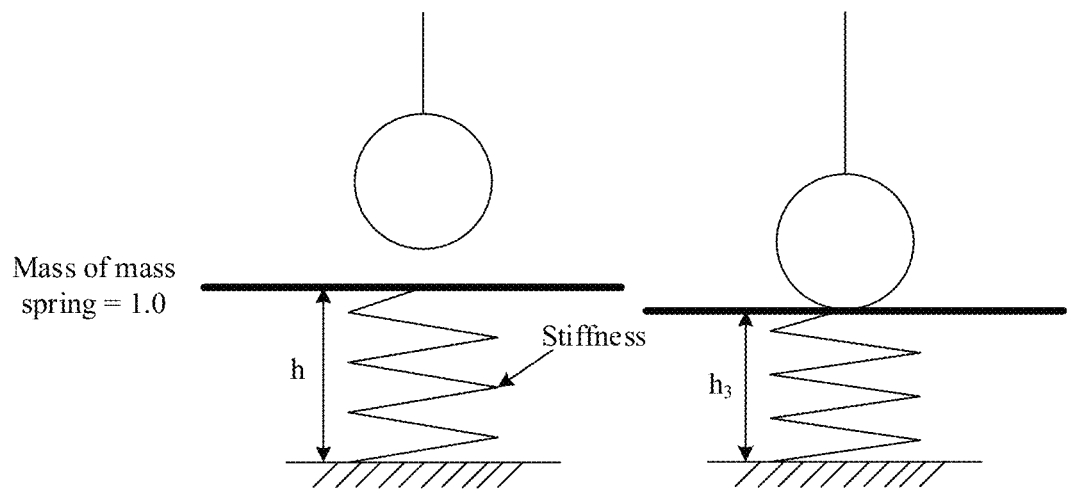
FIG. 13 is a schematic change diagram of a simulated spring when a large-area page element is pressed according to an embodiment of this application.

FIG. 13 is a schematic change diagram of a simulated spring when a large-area page element is pressed. When the spring is pressed by an external force, a value of B is changed to $h_3$.

Herein, $h_1 < h_2 < h_3$.

It should be understood that Table 2 is merely an example. Spring mechanics parameters corresponding to page elements with different areas may be alternatively shown in Table 3, where mass springs corresponding to a small-area page element, a medium-area page element, and a large-area page element may have a same mass and same stiffness.

TABLE 3

| Page element type | Parameter | |
| --- | --- | --- |
| | Damping | Initial velocity |
| Small-area page element | 28 | 1 |
| Medium-area page element | 35 | 0.5 |
| Large-area page element | 38 | 0 |

It should be further understood that the parameter values in Table 2 and Table 3 are merely examples. This is not limited in this embodiment of this application.

Figure 14:
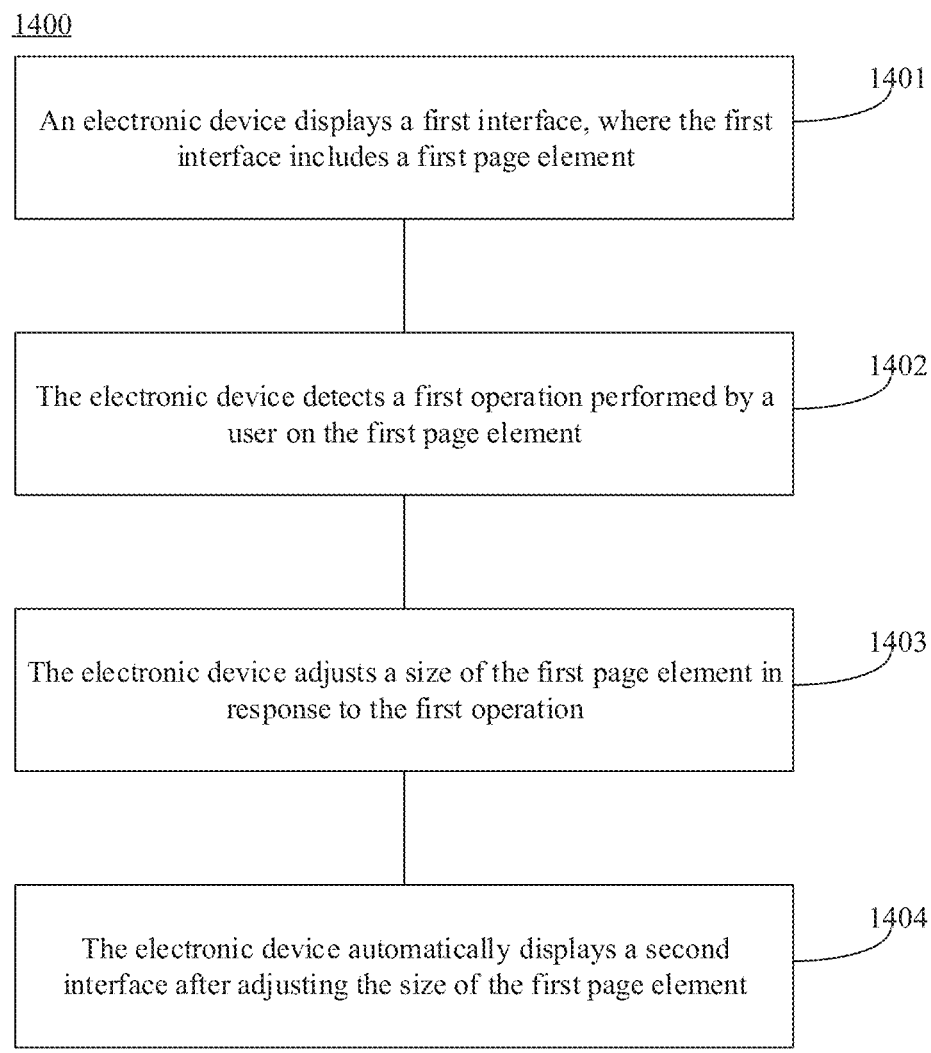
FIG. 14 is a schematic flowchart of a page element display method according to an embodiment of this application.

With reference to the foregoing embodiments and related accompanying drawings, an embodiment of this application provides a page element display method. The method may be implemented in the electronic device (for example, a mobile phone or a tablet computer), with the touchscreen, shown in FIG. 1 and FIG. 2. As shown in FIG. 14, the method may include the following steps.

S1401: An electronic device displays a first interface, where the first interface includes a first page element, and a size of the first page element is a first size.

For example, as shown in (a) in FIG. 3, the first interface is the desktop of the mobile phone, the first page element is the icon 301 of the "Themes" application, and the pixel values of the icon 301 are 216 px in length and 216 px in width.

For example, as shown in (e) in FIG. 4, the first interface is the negative-one-screen interface of the mobile phone, the first page element is the missed-call notification widget 407, and the pixel values of the missed-call notification widget 407 are 1376 px in length and 640 px in width.

For example, as shown in (c) in FIG. 5, the first interface is the desktop of the mobile phone, the first page element is the alarm clock widget 503, and the pixel values of the alarm clock widget 503 are 1090 px in length and 240 px in width.

For example, as shown in (c) in FIG. 6, the first interface is the display interface of the drop-down list of the mobile phone, the first page element is the unread-message notification widget 601, and the pixel values of the unread-message notification widget 601 are 1090 px in length and 300 px in width.

For example, as shown in (d) in FIG. 7, the first interface is the display interface of the plurality of task widgets, the first page element is the task widget 703, and the pixel values of the task widget 703 are 1872 px in length and 864 px in width.

For example, as shown in (b) in FIG. 8, the first interface is the camera interface of the mobile phone, the first page element is the camera control 804, and the pixel values of the camera control 804 are 216 px in length and 216 px in width.

S1402: The electronic device detects a first operation performed by a user on the first page element.

For example, as shown in (b) in FIG. 3, the first operation is an operation of tapping the icon 301 by the user.

For example, as shown in (f) in FIG. 4, the first operation is an operation of tapping the missed-call notification widget 407 by the user.

For example, as shown in (d) in FIG. 5, the first operation is an operation of tapping the alarm clock widget 503 by the user.

For example, as shown in (d) in FIG. 6, the first operation is an operation of tapping the unread-message notification widget 601 by the user.

For example, as shown in (e) in FIG. 7, the first operation is an operation of tapping the task widget 703 by the user.

S1403: The electronic device adjusts the size of the first page element in response to the first operation.

In an embodiment, the adjusting, by the electronic device, the size of the first page element includes: The electronic device reduces the size of the first page element from the first size to a second size, and restores the first page element from the second size to the first size.

For example, as shown in (a) to (c) in FIG. 3, the electronic device controls the icon 301 to zoom out from 216 px in length and 216 px in width to 194 px in length and 194 px in width and restored from 194 px in length and 194 px in width to 216 px in length and 216 px in width.

For example, as shown in (e) to (g) in FIG. 4, the electronic device controls the missed-call notification widget 407 to zoom out from 1376 px in length and 640 px in width to 1307 px in length and 608 px in width and restored from 1307 px in length and 608 px in width to 1376 px in length and 640 px in width.

For example, as shown in (c) to (e) in FIG. 5, the electronic device controls the alarm clock widget 503 to zoom out from 1090 px in length and 240 px in width to 1036 px in length and 228 px in width and restored from 1036 px in length and 228 px in width to 1090 px in length and 240 px in width.

For example, as shown in (c) to (e) in FIG. 6, the electronic device controls the unread-message notification widget 601 to zoom out from 1090 px in length and 300 px in width to 1036 px in length and 285 px in width and restored from 1036 px in length and 285 px in width to 1090 px in length and 300 px in width.

For example, as shown in (d) to (f) in FIG. 7, the electronic device controls the task widget 703 to zoom out from 1872 px in length and 864 px in width to 1778 px in length and 821 px in width and restored from 1778 px in length and 821 px in width to 1872 px in length and 864 px in width.

In an embodiment, the adjusting, by the electronic device, the size of the first page element includes: The electronic device zooms out the first page element from the first size to a second size.

In an embodiment, the adjusting, by the electronic device, the size of the first page element includes: The electronic device first increases the size of the first page element, and then zooms out the first page element to the first size.

S1404: The electronic device automatically displays a second interface after adjusting the size of the first page element, where the second interface is associated with the first page element.

For example, as shown in (d) in FIG. 3, the second interface is the display interface of the "Themes" application. After detecting an operation of tapping the icon 301 by the user, the electronic device may first adjust a size of the icon 301, then open the "Themes" application, and display the display interface of the "Themes" application.

In this embodiment of this application, when the first page element is an application icon, that the second interface is associated with the first page element may be understood as that the second interface is a display interface of an application corresponding to the icon.

For example, as shown in (h) in FIG. 4, the second interface is the another display interface of the negative one screen. The another display interface includes the prompt window 408. After detecting an operation of tapping the missed-call notification widget 407 by the user, the electronic device may first adjust a size of the missed-call notification widget 407, and then display the window 408 in the negative-one-screen interface.

For example, as shown in (f) in FIG. 5, the second interface is the alarm editing interface. After detecting an operation of tapping the alarm clock widget 503 by the user, the electronic device may first adjust a size of the alarm clock widget 503, and then open the alarm editing interface. The user may edit an alarm in the editing interface.

For example, as shown in (f) in FIG. 6, the second interface is the display interface of the "Message" application. After detecting an operation of tapping the unread-message notification widget 601 by the user, the electronic device may first adjust a size of the unread-message notification widget 601, and then open the "Message" application. The user may reply to a message in the interface of the "Message" application.

In this embodiment of this application, when the first page element is a notification widget, that the second interface is associated with the first page element may be understood as that the second interface is a display interface of an application corresponding to the notification widget; or the second interface includes a page element that is added to the first interface in response to the first operation, and the user may perform, on the added page element, an operation related to the notification widget.

For example, as shown in (g) in FIG. 7, the second interface is the interface of the Gallery application. After detecting an operation of tapping the task widget 703 by the user, the electronic device may first adjust a size of the task widget 703, and then open the Gallery application. It should be understood that the interface displayed when the electronic device opens the Gallery application may be a display interface displayed when the user previously exits the Gallery application.

In this embodiment of this application, when the first page element is a task widget, that the second interface is associated with the first page element may be understood as that the second interface is a display interface of an application corresponding to the task widget. The display interface may be a display interface displayed when the user previously exits the application.

In this embodiment of this application, after the electronic device detects an operation of tapping a page element by the user, the electronic device may change a size of the page element upon detecting the user operation. This helps to enhance feedback from the electronic device for the user operation, to enhance a prompt effect of the electronic device for the user operation.

In one embodiment, the first page element includes any one of an application icon, a notification widget, and a task widget.

In one embodiment, the notification widget includes either of a notification widget in a drop-down list and a notification widget on a negative one screen.

In one embodiment, the zooming out the first page element from the first size to a second size, and restoring the first page element from the second size to the first size includes: by simulating a spring, zooming out the first page element from the first size to the second size, and restoring the first page element from the second size to the first size.

For example, as shown in FIG. 10, the electronic device may simulate springs to zoom out and restore page elements that have different areas.

In this embodiment of this application, when detecting the first operation performed by the user on the first page element, the electronic device may simulate spring characteristics. Natural mechanics may be simulated for the first operation (for example, pressing), thereby helping to strengthen a sense of naturalness for the user.

In one embodiment, a first mass spring is simulated when the first page element is an application icon; or a second mass spring is simulated when the first page element is a notification widget; or a third mass spring is simulated when the first page element is a task widget; where the first mass spring, the second mass spring, and the third mass spring have a same mass, and are in descending order of stiffness and in descending order of damping.

In this embodiment of this application, for different page elements, springs with different mechanics parameters may be simulated.

For example, when tapping the icon shown in (b) in FIG. 3 and the camera control shown in (c) in FIG. 8, the user may feel that the icon bounces more lightly.

For example, when tapping the missed-call notification widget shown in (f) in FIG. 4, the alarm clock widget shown in (d) in FIG. 5, and the unread-message notification widget shown in (d) in FIG. 6, the user may feel that the notification widget or the alarm clock widget bounces more heavily.

For example, when tapping the task widget shown in (e) in FIG. 7, the user may feel that the task widget bounces more heavily than the notification widget or the alarm clock widget.

In this embodiment of this application, the electronic device simulates natural mechanics, and defines different tapping effects for different page elements. This helps to strengthen a sense of naturalness for the user and enhance feedback from the electronic device for the user operation, to enhance a prompt effect of the electronic device for the user operation.

In one embodiment, the second size is K times the first size when the first page element is an icon; or the second size is L times the first size when the first page element is a notification widget; or the second size is M times the first size when the first page element is a task widget, where $0<K\leq L\leq M<1$.

For example, for icons and controls, the second size is 90% of the first size.

For example, for notification widgets, the second size is 95% of the first size.

For example, for task widgets, the second size is 95% of the first size.

In this embodiment of this application, after the electronic device detects an operation of tapping a page element by the user, the electronic device may control different page elements to be reduced in size based on different proportions, and different page elements provide different visual experience for the user. This helps to enhance feedback from the electronic device for the user operation, to enhance a prompt effect of the electronic device for the user operation.

In one embodiment, when the first page element is an icon, duration for zooming out the first page element from the first size to the second size is first duration N; when the first page element is a notification widget, duration for zooming out the first page element from the first size to the second size is second duration P; or when the first page element is a task widget, duration for zooming out the first page element from the first size to the second size is third duration Q, where $100\ ms \leq N \leq P \leq Q \leq 250\ ms$.

For example, for icons and controls, N is 100-150 ms.
For example, for notification widgets, P is 150-200 ms.
For example, for task widgets, Q is 200-250 ms.

In this embodiment of this application, after the electronic device detects an operation of tapping a page element by the user, the electronic device may control different page elements to zoom out to the second size in different lengths of time, and different page elements provide different visual experience for the user. This helps to enhance feedback from the electronic device for the user operation, to enhance a prompt effect of the electronic device for the user operation.

In one embodiment, the automatically displaying a second interface includes: when the first page element is restored from the second size to the first size, smoothly transiting a display interface of the electronic device from the first interface to the second interface.

In this embodiment of this application, when the first page element is restored to the initial size, the electronic device smoothly transits the display interface from the first interface to the second interface. In this way, not only a prompt effect of the electronic device for the user operation is enhanced, but also visual experience of the user can be improved.

In one embodiment, the smoothly transiting a display interface of the electronic device from the first interface to the second interface includes: When the first page element is restored from the second size to the first size, the electronic device displays the second interface; or when the first page element is restored from the second size to the first size, after a first time period, the electronic device displays the second interface.

For example, the first time period is 80-120 ms.

In one embodiment, the first operation is an operation of touching the first page element by a finger of the user, and the zooming out the first page element from the first size to a second size includes: when detecting that the finger of the user touches the first page element, starting to zoom out the first page element from the first size to the second size; or when detecting that the finger of the user leaves the first page element, starting to zoom out the first page element from the first size to the second size.

In one embodiment, the in response to the first operation, zooming out, by the electronic device, the first page element from the first size to a second size, and restoring the first page element from the second size to the first size includes: In response to the first operation, the electronic device zooms out the first page element from the first size to the second size; when the first page element is restored from the second size to a third size, the electronic device detects a second operation performed by the user on the first page element, where the third size is greater than the second size and less than the first size; and in response to the second operation, the electronic device zooms out the first page element from the third size to the second size, and restores the first page element from the second size to the first size.

For example, as shown in (c) in FIG. 8, when the mobile phone detects an operation of tapping the control 804 by the user, the mobile phone may control a size of the control 804 to be reduced from 216 px in length and 216 px in width to 194 px in length and 194 px in width; as shown in (d) and (e) in FIG. 8, when the mobile phone controls the size of the control 804 to be restored from 194 px in length and 194 px in width to 205 px in length and 205 px in width, and the mobile phone detects an operation of tapping the control 804 by the user for the second time, the mobile phone controls the size of the control 804 to be reduced from 205 px in length and 205 px in width to 194 px in length and 194 px in width; as shown in (f) in FIG. 8, when the mobile phone detects that the finger of the user is up, the mobile phone controls the size of the control 804 to be restored from 194 px in length and 194 px in width to 216 px in length and 216 px in width.

In this embodiment of this application, for operations quickly performed by the user on the first page element, the electronic device can quickly respond to the user operations. This reduces a waiting delay of the user for the operations, and enhances a prompt effect of the electronic device for the user operations. In addition, as the electronic device responds quickly, consistency between mind and hand of the user can be achieved, and an expectation of the user for the operations is met.

It can be understood that, to implement the foregoing functions, the electronic device includes corresponding hardware and/or software modules for performing each function. With reference to algorithm steps in the examples described in the embodiments disclosed in this specification, this application can be implemented by hardware or a combination of hardware and computer software. Whether a function is performed by hardware or by driving hardware by computer software depends on particular applications and design constraints of the solutions. The embodiments, different methods to implement the described functions for each particular application, but it should not be considered that the implementation goes beyond the scope of this application.

In the embodiments, the electronic device may be divided into function modules based on the foregoing method examples. For example, the function modules may be obtained through division in one-to-one correspondence with the functions, or two or more functions may be integrated into one processing module. The integrated module may be implemented in a form of hardware. It should be noted that division into the modules in the embodiments is an example and is merely a logical function division. Another division manner may be used during actual implementation.

Figure 15:
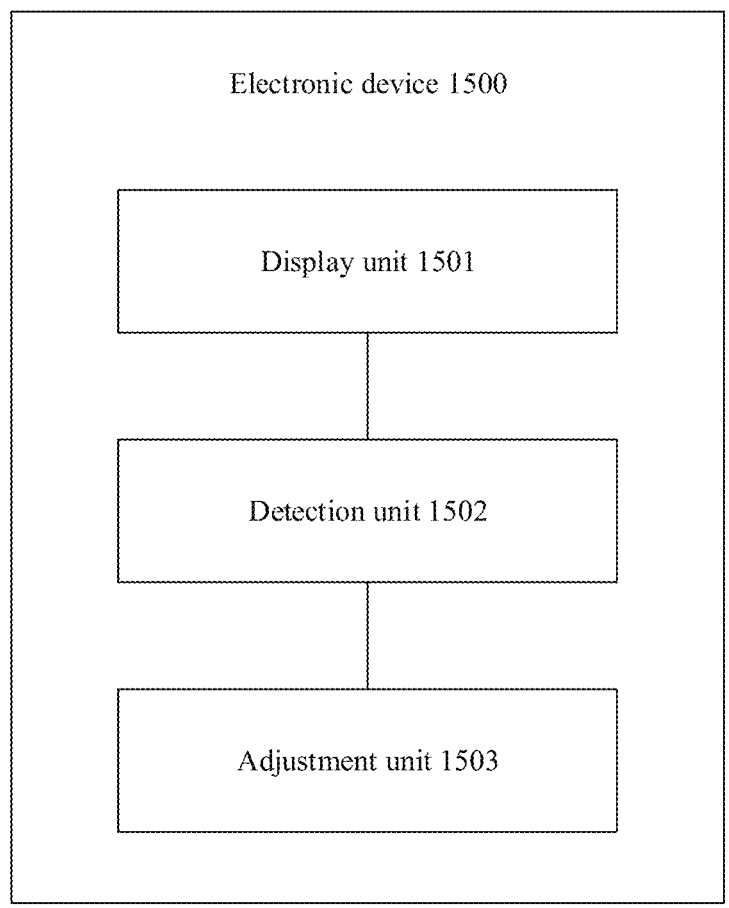
FIG. 15 is a schematic block diagram of an electronic device according to an embodiment of this application.

For a case in which function modules are obtained through division in one-to-one correspondence with functions, FIG. 15 is a possible schematic composition diagram of an electronic device 1500 related to the foregoing embodiments. As shown in FIG. 15, the electronic device 1500 may include a display unit 1501, a detection unit 1502, and an adjustment unit 1503.

The display unit 1501 may be configured to support the electronic device 1500 in performing step 1401, step 1404, and the like, and/or be used for another process in the technique described in this specification.

The detection unit 1502 may be configured to support the electronic device 1500 in performing step 1402 and the like, and/or be used for another process in the technique described in this specification.

The adjustment unit 1503 may be configured to support the electronic device 1500 in zooming out and/or restoring the page element in step 1403 and the like, and/or be used for another process in the technique described in this specification.

It should be noted that all related content of the steps in the foregoing method embodiments may be cited in function descriptions of corresponding function modules, and details are not described herein again.

The electronic device provided in this embodiment is configured to perform the foregoing page element display method, and therefore can achieve the same effects as the foregoing implementation method.

In a case that an integrated unit is used, the electronic device may include a processing module, a storage module, and a communications module. The processing module may be configured to control and manage actions of the electronic device, for example, may be configured to support the electronic device in performing steps performed by the foregoing units. The storage module may be configured to support the electronic device in storing program code, data, and the like. The communications module may be configured to support the electronic device in communicating with another device.

The processing module may be a processor or a controller. The processing module can implement or perform various logical blocks, modules, and circuits described as examples with reference to content disclosed in this application. The processor may alternatively be a combination for implementing a computing function, for example, a combination including one or more microprocessors or a combination of a digital signal processor (digital signal processor, DSP) and a microprocessor. The storage module may be a memory. The communications module may be specifically a device such as a radio frequency circuit, a Bluetooth chip, or a Wi-Fi chip for interacting with another electronic device.

In an embodiment, when the processing module is the processor and the storage module is the memory, the electronic device in this embodiment may be a device with the structure shown in FIG. 1.

The embodiments further provide a computer storage medium. The computer storage medium stores computer instructions. When being run on an electronic device, the computer instructions cause the electronic device to perform the foregoing related method steps to implement the page element display method in the foregoing embodiments.

The embodiments further provide a computer program product. When being run on a computer, the computer program product causes the electronic device to perform the foregoing related steps to implement the page element display method in the foregoing embodiments.

In addition, the embodiments of this application further provide an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, and the chip performs the page element display method in the foregoing method embodiments.

The electronic device, computer storage medium, computer program product, and chip provided in the embodiments are all configured to perform the corresponding method provided above. Therefore, for beneficial effects that can be achieved by the electronic device, computer storage medium, computer program product, and chip, refer to the beneficial effects of the corresponding method provided above. Details are not described herein again.

From the descriptions of the foregoing implementations, for ease and brevity of description, only division into the foregoing function modules is used as an example for description; in actual application, the foregoing functions may be allocated, depending on a requirement, to different function modules for implementation, that is, an internal structure of the apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into the modules or units is merely a logical function division, and another division manner may be used during actual implementation. For example, units or components may be combined, or may be integrated into another apparatus, or some features may be ignored or not performed. In addition, the displayed or discussed mutual couplings or direct couplings or communications connections may be implemented by using some interfaces. The indirect couplings or communications connections between apparatuses or units may be implemented in electrical, mechanical, or other forms.

Units described as separate components may or may not be physically separate. A component displayed as a unit may be one or more physical units, and may be located in one place, or may be distributed in places. Some or all of the units may be selected based on an actual requirement, to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

If the integrated unit is implemented in the form of a software function unit and is sold or used as an independent product, the integrated unit may be stored in a readable storage medium. Based on such an understanding, the solutions in the embodiments of this application essentially, or the part contributing to the prior art, or all or some of the solutions may be implemented in a form of a software product. The software product is stored in a storage medium, and includes several instructions for instructing a device (which may be a single-chip microcomputer, a chip, or the like) or a processor (processor) to perform all or some of the steps of the method described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing content is merely specific implementations of this application, but is not intended to limit the protection scope of this application. Any variation or replacement readily determine within the scope disclosed in this application shall fall within the protection scope of this application. Therefore, the protection scope of this application shall be subject to the protection scope of the claims.

What is claimed is:

1. An electronic device, comprising:
one or more processors; and
one or more memory devices, wherein
the one or more memory devices store one or more computer programs, the one or more computer programs comprise instructions, and when being executed by the one or more processors, the instructions cause the electronic device to perform the following steps:
displaying a first interface, wherein the first interface comprises a first page element, and a size of the first page element is a first size;
detecting a first operation performed by a user on the first page element;
in response to the first operation, zooming out the first page element from the first size to a second size, and restoring the first page element from the second size to the first size; and
automatically displaying a second interface after the first page element is restored from the second size to the first size, wherein the second interface is associated with the first page element;
wherein when the first interface and the second interface are interfaces of a camera application, and the first page element is a camera control, the instructions further cause the electronic device to perform the following steps:
in response to the first operation, performing a photographing operation and saving a first photo;
in response to an operation performed by the user on a gallery icon, displaying the first photo, wherein the gallery icon is displayed on the second interface;
detecting a second operation performed by the user on the first page element;
in response to the second operation, zooming out the first page element from the first size to the second size;
when the first page element is restored from the second size to a third size, detecting a third operation performed by the user on the first page element, wherein the third size is greater than the second size and less than the first size; and
in response to the third operation, zooming out the first page element from the third size to the second size, and restoring the first page element from the second size to the first size.

2. The electronic device according to claim 1, wherein when being executed by the one or more processors, the instructions cause the electronic device to perform the following step:
when the first page element is restored from the second size to the first size, smoothly transiting a display interface of the electronic device from the first interface to the second interface.

3. The electronic device according to claim 1, wherein when being executed by the one or more processors, the instructions cause the electronic device further to perform the following steps:
in response to the second operation, performing a photographing operation, and saving a second photo; and
in response to the third operation, performing a photographing operation, and saving a third photo.

4. The electronic device according to claim 3, wherein when being executed by the one or more processors, the instructions cause the electronic device further to perform the following step:
wherein after saving the third photo, in response to an operation performed by the user on the Gallery icon, displaying the third photo.

5. The electronic device according to claim 1, wherein when the first interface is an interface of a camera application, and the first page element is a switching control,
the first interface comprises a viewfinder frame, and the second interface comprises a viewfinder frame,
wherein the viewfinder frame of the first interface and the viewfinder frame of the second interface are configured to display a preview image in real time, the viewfinder frame of the first interface comprises a preview image of a front-facing camera, and the viewfinder of the second interface comprises a preview image of the rear-facing camera.

6. The electronic device according to claim 1, wherein when the first page element is an application icon, the second interface is a display interface of an application corresponding to the application icon;
when the first page element is a notification widget, the second interface is a display interface of an application corresponding to the notification widget, or the second interface includes a page element that is added to the first interface in response to the first operation, and an operation performed on the added page element is related to the notification widget; and
when the first page element is a task widget, the second interface is a display interface of an application corresponding to the task widget.

7. The electronic device according to claim 6, wherein the notification widget comprises either of a notification widget in a drop-down list and a notification widget on a negative one screen.

8. The electronic device according to claim 7, wherein the notification widget in the drop-down list comprises an unread-message notification widget or a call recorder notification widget.

9. The electronic device according to claim 6, wherein the second size is K times the first size when the first page element is an icon or a control;
the second size is L times the first size when the first page element is a notification widget; and
the second size is M times the first size when the first page element is a task widget wherein 0<K≤L<1, or 0<K≤M<1.

10. The electronic device according to claim 6, wherein when the first page element is an icon or a control, duration for zooming out the first page element from the first size to the second size is first duration N;
when the first page element is a notification widget, duration for zooming out the first page element from the first size to the second size is second duration P; and
when the first page element is a task widget, duration for zooming out the first page element from the first size to the second size is third duration Q, wherein 100 ms≤N≤P≤250 ms, or 100 ms≤N≤Q≤250 ms.

11. The electronic device according to claim 1, wherein the application corresponding to the icon comprises at least one of the following: Gallery application, Settings, Themes, and phone.

12. The electronic device according to claim 1, wherein when a task widget comprises the task widget of a Gallery application, the second interface is a display interface of the Gallery application, and the second interface comprises a picture thumbnail.

13. The electronic device according to claim 12, wherein a size of the picture thumbnail is a fourth size,
wherein when being executed by the one or more processors, the instructions cause the electronic device further to perform the following steps:
detecting an operation performed by a user on the picture thumbnail; and
in response to the operation performed by a user on the picture thumbnail, zooming out the picture thumbnail from the fourth size to a fifth size, and restoring the picture thumbnail from the fifth size to the fourth size.

14. The electronic device according to claim 1, wherein when being executed by the one or more processors, the instructions cause the electronic device to perform the following steps:
in response to a first user operation, displaying a text display window of the voice assistant; and
when displaying the text display window, in response to a second user operation, displaying the first interface.

15. The electronic device according to claim 14, wherein the first user operation comprises a voice wakeup keyword.

16. A page element display method, wherein the method is applied to an electronic device and comprises:
displaying, by the electronic device, a first interface, wherein the first interface comprises a first page element, and a size of the first page element is a first size;
detecting, by the electronic device, a first operation performed by a user on the first page element;
in response to the first operation, zooming out, by the electronic device, the first page element from the first size to a second size, and restoring the first page element from the second size to the first size; and
automatically displaying, by the electronic device, a second interface after the first page element is restored from the second size to the first size, wherein the second interface is associated with the first page element
wherein the first interface is an interface of a camera application, and the first page element is a camera control, further comprises the following steps:
in response to the first operation, performing a photographing operation and saving a first photo;
in response to an operation performed by the user on a gallery icon, displaying the first photo, wherein the gallery icon is displayed on the second interface;
detecting a second operation performed by the user on the first page element in response to the second operation, zooming out the first page element from the first size to the second size;
when the first page element is restored from the second size to a third size, detecting a third operation performed by the user on the first page element, wherein the third size is greater than the second size and less than the first size; and
in response to the third operation, zooming out the first page element from the third size to the second size, and restoring the first page element from the second size to the first size.

17. A computer storage medium, comprising computer instructions, wherein when being run on the electronic device, the computer instructions cause the electronic device to perform the page element display method according to claim 16.

18. The method according to claim 16, further comprises the following steps:
in response to the second operation, performing a photographing operation, and saving a second photo; and
in response to the third operation, performing a photographing operation, and saving a third photo.

19. The method according to claim 18, further comprises the following step:
   wherein after saving the third photo, in response to an operation performed by the user on the Gallery icon, displaying the third photo.

\* \* \* \* \*